US012693999B2

(12) United States Patent
Madan

(10) Patent No.: US 12,693,999 B2
(45) Date of Patent: Jul. 28, 2026

(54) AUTONOMOUS DATABASE MANAGEMENT SYSTEM

(71) Applicant: Nutanix, Inc., San Jose, CA (US)

(72) Inventor: Anil Madan, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/083,214

(22) Filed: Dec. 16, 2022

(65) Prior Publication Data

US 2023/0195700 A1 Jun. 22, 2023

Related U.S. Application Data

(60) Provisional application No. 63/292,846, filed on Dec. 22, 2021.

(51) Int. Cl.
G06F 16/21 (2019.01)
G06F 9/50 (2006.01)

(52) U.S. Cl.
CPC ............ G06F 16/21 (2019.01); G06F 9/5027 (2013.01); G06F 2209/501 (2013.01); G06F 2209/502 (2013.01); G06F 2209/505 (2013.01)

(58) Field of Classification Search
None
See application file for complete search history.

(56) References Cited

U.S. PATENT DOCUMENTS

| | | |
|---|---|---|
| 625,315 A | 5/1899 | Bradford |
| 749,117 A | 1/1904 | Wagner |

| | | |
|---|---|---|
| 4,742,482 A | 5/1988 | Inskeep et al. |
| 5,594,859 A | 1/1997 | Palmer et al. |
| 6,064,975 A | 5/2000 | Moon et al. |
| 6,243,715 B1 | 6/2001 | Bogantz et al. |
| 6,542,893 B1 | 4/2003 | Quernemoen |
| 6,766,477 B2 | 7/2004 | Grucci et al. |
| D508,248 S | 8/2005 | Ording |
| D521,521 S | 5/2006 | Jewitt et al. |
| 7,046,134 B2 | 5/2006 | Hansen |

(Continued)

FOREIGN PATENT DOCUMENTS

| | | |
|---|---|---|
| CN | 104408071 A | 3/2015 |
| CN | 105446828 A | 3/2016 |

(Continued)

OTHER PUBLICATIONS

Bailey, Chris, et al. "IBM joins the Crossplane community" IBM Developer Blog. Dec. 15, 2020. Retrieved from https://developer. ibm.com/blogs/ibm-joins-the-crossplane-community/ (accessed Sep. 28, 2023).

(Continued)

*Primary Examiner* — Kavita Stanley
*Assistant Examiner* — Cao D Vuong
(74) *Attorney, Agent, or Firm* — Foley & Lardner LLP

(57) ABSTRACT

A database management system receives a user request for provisioning a database, autonomously selects a datacenter for provisioning the database based at least on a first pre-defined rule, autonomously selects at least one cluster in the datacenter based at least on a second pre-defined rule, determines a network location of each of the at least one cluster, and provisions the database on each of the at least one cluster using the network location of each of the at least one cluster.

48 Claims, 6 Drawing Sheets

(56) References Cited

U.S. PATENT DOCUMENTS

| | | | |
|---|---|---|---|
| 7,136,865 B1 | 11/2006 | Ra et al. |
| 7,225,189 B1 | 5/2007 | Mccormack et al. |
| 7,331,000 B2 | 2/2008 | Ohno et al. |
| 7,389,300 B1 | 6/2008 | Shah et al. |
| 7,634,679 B2 | 12/2009 | Quintiliano |
| 7,725,671 B2 | 5/2010 | Prahlad et al. |
| D625,315 S | 10/2010 | Jewitt et al. |
| 7,814,057 B2 | 10/2010 | Kathuria et al. |
| 7,840,533 B2 | 11/2010 | Prahlad et al. |
| 7,873,610 B2 | 1/2011 | Poulsen |
| 7,873,684 B2 | 1/2011 | Souder et al. |
| 7,941,470 B2 | 5/2011 | Le et al. |
| 7,953,764 B2 | 5/2011 | Baffier et al. |
| 7,971,094 B1 | 6/2011 | Benn et al. |
| 7,974,942 B2 | 7/2011 | Pomroy et al. |
| 8,117,165 B1 | 2/2012 | Winckelmann et al. |
| 8,146,080 B2 | 3/2012 | Carter et al. |
| D656,948 S | 4/2012 | Kundsen et al. |
| 8,150,808 B2 | 4/2012 | Zha et al. |
| 8,250,033 B1 | 8/2012 | De Souter et al. |
| 8,291,409 B2 | 10/2012 | Winner et al. |
| 8,335,765 B2 | 12/2012 | Sivasubramanian et al. |
| 8,364,648 B1 | 1/2013 | Sim-Tang |
| 8,429,630 B2 | 4/2013 | Nickolov et al. |
| 8,447,728 B2 | 5/2013 | Prahlad et al. |
| 8,448,170 B2 | 5/2013 | Wipfel et al. |
| D684,160 S | 6/2013 | Truelove et al. |
| D684,161 S | 6/2013 | Truelove et al. |
| 8,468,174 B1 | 6/2013 | Yueh et al. |
| 8,549,518 B1 | 10/2013 | Aron et al. |
| 8,572,031 B2 | 10/2013 | Merriman et al. |
| 8,601,473 B1 | 12/2013 | Aron et al. |
| 8,612,396 B1 | 12/2013 | Mcalister et al. |
| 8,635,421 B2 | 1/2014 | Gupta et al. |
| 8,656,123 B2 | 2/2014 | Lee |
| 8,656,303 B2 | 2/2014 | Hughes |
| 8,677,085 B2 | 3/2014 | Vaghani et al. |
| 8,713,060 B2 | 4/2014 | Sivasubramanian et al. |
| 8,762,335 B2 | 6/2014 | Prahlad et al. |
| 8,769,537 B1 | 7/2014 | Ruggiero et al. |
| 8,775,438 B1 * | 7/2014 | Brooker ................ G06F 9/5077 |
| | | 707/751 |
| 8,832,028 B2 | 9/2014 | Susairaj et al. |
| 8,843,441 B1 | 9/2014 | Rath et al. |
| 8,849,850 B2 | 9/2014 | Baffier et al. |
| 8,850,130 B1 | 9/2014 | Aron et al. |
| 8,856,189 B1 | 10/2014 | Bull et al. |
| 8,863,124 B1 | 10/2014 | Aron |
| 8,874,749 B1 | 10/2014 | Vittal et al. |
| 8,914,567 B2 | 12/2014 | Miroshnichenko et al. |
| 8,924,974 B1 | 12/2014 | Ruggiero et al. |
| 8,972,347 B1 | 3/2015 | Sim-Tang |
| 9,009,106 B1 | 4/2015 | Aron et al. |
| 9,069,708 B2 | 6/2015 | Gill et al. |
| D733,745 S | 7/2015 | Huang |
| 9,116,737 B2 | 8/2015 | Aswathanarayana et al. |
| 9,116,803 B1 | 8/2015 | Agrawal et al. |
| 9,116,862 B1 | 8/2015 | Rath et al. |
| 9,213,727 B1 | 12/2015 | Esposito |
| 9,244,717 B2 | 1/2016 | Pissay et al. |
| D749,117 S | 2/2016 | Huang |
| 9,256,383 B2 | 2/2016 | De Spiegeleer et al. |
| 9,268,610 B2 | 2/2016 | Hegdal et al. |
| 9,270,521 B2 * | 2/2016 | Tompkins ............... H04L 41/00 |
| D753,135 S | 4/2016 | Vazquez |
| D753,140 S | 4/2016 | Kouvas et al. |
| 9,305,068 B1 | 4/2016 | Esposito |
| 9,311,330 B1 | 4/2016 | Chockalingam et al. |
| 9,336,060 B2 | 5/2016 | Nori et al. |
| 9,336,132 B1 | 5/2016 | Aron et al. |
| 9,372,758 B2 | 6/2016 | Ashutosh et al. |
| D761,288 S | 7/2016 | Cianflone et al. |
| 9,384,254 B2 | 7/2016 | Tekade et al. |
| 9,389,962 B1 | 7/2016 | Yueh et al. |
| D763,890 S | 8/2016 | Pan |
| 9,405,634 B1 | 8/2016 | Ambastha et al. |
| 9,413,810 B2 | 8/2016 | Rezvani et al. |
| 9,436,556 B2 | 9/2016 | Siden et al. |
| D771,102 S | 11/2016 | Protzman et al. |
| 9,495,435 B2 | 11/2016 | Zhang et al. |
| 9,507,579 B2 | 11/2016 | Gambardella et al. |
| 9,529,551 B2 | 12/2016 | Kesavan et al. |
| 9,529,808 B1 | 12/2016 | Sudarsanam et al. |
| D777,747 S | 1/2017 | Derby et al. |
| D778,296 S | 2/2017 | Belkin et al. |
| D779,514 S | 2/2017 | Baris et al. |
| 9,582,297 B2 | 2/2017 | Jin et al. |
| D781,887 S | 3/2017 | Dziuba et al. |
| 9,600,193 B2 | 3/2017 | Ahrens et al. |
| 9,621,680 B2 | 4/2017 | D'Costa et al. |
| 9,639,429 B2 | 5/2017 | Stewart et al. |
| 9,652,265 B1 | 5/2017 | Narayanasamy et al. |
| 9,659,080 B1 * | 5/2017 | Drobychev ......... H04L 67/1095 |
| 9,665,437 B2 | 5/2017 | Bhargava et al. |
| D794,666 S | 8/2017 | Havaldar et al. |
| D794,667 S | 8/2017 | Havaldar et al. |
| 9,733,958 B2 | 8/2017 | Cui et al. |
| 9,740,472 B1 | 8/2017 | Sohi et al. |
| 9,740,723 B2 | 8/2017 | Prahlad et al. |
| 9,747,287 B1 | 8/2017 | Bhardwaj et al. |
| D797,116 S | 9/2017 | Chapman et al. |
| 9,753,713 B2 | 9/2017 | Mani et al. |
| 9,760,396 B2 | 9/2017 | Apte et al. |
| 9,772,866 B1 | 9/2017 | Aron et al. |
| 9,778,992 B1 | 10/2017 | Yueh et al. |
| D802,608 S | 11/2017 | Hicks et al. |
| D803,231 S | 11/2017 | Guinness et al. |
| 9,830,082 B1 | 11/2017 | Srinivasan et al. |
| D807,902 S | 1/2018 | Cong et al. |
| 9,858,155 B2 | 1/2018 | Ashutosh et al. |
| 9,881,168 B2 | 1/2018 | Chari et al. |
| D809,530 S | 2/2018 | Matheson et al. |
| D815,652 S | 4/2018 | Protzman et al. |
| 9,934,107 B1 | 4/2018 | Chikkanayakanahally et al. |
| D817,976 S | 5/2018 | Shilwant et al. |
| 9,960,963 B2 | 5/2018 | Selvaraj et al. |
| 10,013,313 B2 | 7/2018 | Zhang et al. |
| 10,033,833 B2 | 7/2018 | Fu et al. |
| 10,055,300 B2 | 8/2018 | Zhang et al. |
| 10,057,279 B1 | 8/2018 | Balduzzi et al. |
| 10,061,852 B1 | 8/2018 | Plenderleith |
| 10,078,465 B1 | 9/2018 | Wu et al. |
| 10,108,496 B2 | 10/2018 | Hoobler et al. |
| 10,108,685 B2 | 10/2018 | Amdur et al. |
| 10,146,848 B2 | 12/2018 | Narayanan et al. |
| 10,162,715 B1 | 12/2018 | Mcalister et al. |
| D838,288 S | 1/2019 | Sunshine et al. |
| 10,185,627 B2 | 1/2019 | Wong et al. |
| D839,913 S | 2/2019 | Chen et al. |
| 10,206,092 B1 | 2/2019 | Mellquist et al. |
| 10,210,048 B2 | 2/2019 | Sancheti |
| 10,212,195 B2 | 2/2019 | Maskalik et al. |
| D843,388 S | 3/2019 | Protzman et al. |
| 10,235,250 B1 | 3/2019 | Ambastha et al. |
| 10,248,657 B2 | 4/2019 | Prahlad et al. |
| 10,261,867 B1 | 4/2019 | Terry et al. |
| 10,268,551 B1 | 4/2019 | Wong |
| 10,275,267 B1 * | 4/2019 | de Kadt .............. H04L 41/5051 |
| 10,282,201 B2 | 5/2019 | Tekade et al. |
| 10,339,110 B2 | 7/2019 | Marinov et al. |
| 10,346,431 B1 | 7/2019 | Broda et al. |
| 10,372,329 B1 | 8/2019 | Ahrens et al. |
| 10,379,957 B2 | 8/2019 | Ngo |
| 10,379,963 B2 | 8/2019 | Bhargava et al. |
| D862,512 S | 10/2019 | Schubart |
| 10,445,298 B2 | 10/2019 | Ramu et al. |
| 10,447,806 B1 | 10/2019 | Sahay et al. |
| 10,476,955 B2 | 11/2019 | Mutalik et al. |
| D870,762 S | 12/2019 | Mendoza Corominas et al. |
| 10,496,302 B1 | 12/2019 | Gaurav et al. |
| 10,503,612 B1 | 12/2019 | Wang et al. |
| 10,509,798 B2 | 12/2019 | Chow et al. |
| D875,108 S | 2/2020 | Chitalia et al. |
| 10,572,292 B2 | 2/2020 | Bhandari et al. |

(56) References Cited

U.S. PATENT DOCUMENTS

| | | | |
|---|---|---|---|
| D877,753 S | 3/2020 | Chitalia et al. | |
| 10,579,364 B2 | 3/2020 | Doshi et al. | |
| 10,599,423 B2 | 3/2020 | Coleman et al. | |
| 10,606,578 B2 | 3/2020 | Kruglikov et al. | |
| 10,613,938 B2 | 4/2020 | Blumenau et al. | |
| 10,637,914 B2 | 4/2020 | Basavaiah et al. | |
| 10,700,991 B2 | 6/2020 | Khinvasara et al. | |
| 10,705,755 B2 | 7/2020 | Wang et al. | |
| 10,719,407 B1 | 7/2020 | Chockalingam et al. | |
| 10,725,866 B1 | 7/2020 | Palaiah et al. | |
| 10,728,255 B2 * | 7/2020 | Jindal | H04L 63/20 |
| 10,757,036 B2 | 8/2020 | Tung et al. | |
| 10,776,329 B2 | 9/2020 | Ramohalli Gopala Rao et al. | |
| 10,778,750 B2 | 9/2020 | Ringdahl | |
| 10,785,029 B2 | 9/2020 | Gupta et al. | |
| 10,785,255 B1 | 9/2020 | Otvagin et al. | |
| 10,812,582 B2 | 10/2020 | Spillane et al. | |
| 10,817,157 B2 | 10/2020 | Kuchibhotla et al. | |
| 10,824,522 B2 | 11/2020 | Sadavarte et al. | |
| 10,824,956 B1 | 11/2020 | Natanzon et al. | |
| 10,855,554 B2 | 12/2020 | Freeman et al. | |
| D911,356 S | 2/2021 | Varghese et al. | |
| 10,922,957 B2 | 2/2021 | Rhoads et al. | |
| 10,938,924 B1 | 3/2021 | Jensen et al. | |
| 10,949,309 B2 | 3/2021 | Hajare et al. | |
| 10,951,496 B2 | 3/2021 | Baker et al. | |
| 10,959,098 B2 | 3/2021 | Cidon et al. | |
| 10,965,737 B1 | 3/2021 | Parulkar et al. | |
| 10,984,041 B2 | 4/2021 | Bedadala et al. | |
| 10,999,165 B2 | 5/2021 | Cidon et al. | |
| 11,010,336 B2 | 5/2021 | Kuchibhotla et al. | |
| 11,010,487 B2 | 5/2021 | Noe et al. | |
| 11,036,696 B2 | 6/2021 | Higginson et al. | |
| D926,200 S | 7/2021 | Murphy et al. | |
| 11,055,352 B1 | 7/2021 | Beitchman et al. | |
| 11,061,709 B2 | 7/2021 | Cao et al. | |
| D927,507 S | 8/2021 | Norman | |
| 11,099,956 B1 | 8/2021 | Polimera et al. | |
| 11,100,020 B2 | 8/2021 | Shah et al. | |
| 11,108,629 B1 | 8/2021 | Cahyadi et al. | |
| 11,120,011 B2 | 9/2021 | Priebe et al. | |
| 11,126,426 B2 | 9/2021 | Zhu et al. | |
| 11,169,887 B2 | 11/2021 | Bajaj et al. | |
| 11,182,372 B1 | 11/2021 | Jain et al. | |
| 11,243,703 B2 | 2/2022 | Watkins | |
| 11,243,971 B2 | 2/2022 | Geigel | |
| D947,216 S | 3/2022 | Leininger | |
| D947,239 S | 3/2022 | Rubin et al. | |
| D947,240 S | 3/2022 | Rubin et al. | |
| 11,275,573 B1 | 3/2022 | Javadekar | |
| 11,308,114 B1 | 4/2022 | Moghe | |
| 11,320,978 B2 | 5/2022 | Kuchibhotla et al. | |
| 11,372,820 B1 * | 6/2022 | Harjono | H04L 67/1031 |
| 11,386,058 B2 | 7/2022 | Hung et al. | |
| 11,561,864 B1 | 1/2023 | Brahmadesam et al. | |
| 11,604,705 B2 | 3/2023 | Mehta et al. | |
| 11,604,806 B2 | 3/2023 | Mankad et al. | |
| 11,609,828 B2 | 3/2023 | Khandkar et al. | |
| 11,640,340 B2 | 5/2023 | Sontakke et al. | |
| 11,741,380 B2 * | 8/2023 | Khawas | G06N 20/20 |
| | | | 706/12 |
| 11,816,066 B2 | 11/2023 | Kuchibhotla et al. | |
| 11,860,818 B2 | 1/2024 | Kuchibhotla et al. | |
| 11,892,918 B2 | 2/2024 | Rayaraddi et al. | |
| 11,899,685 B1 | 2/2024 | Pandis et al. | |
| 11,907,507 B2 | 2/2024 | Kibo | |
| 12,010,227 B1 | 6/2024 | Chhabra et al. | |
| 12,019,523 B2 | 6/2024 | Mehta et al. | |
| 12,081,604 B1 | 9/2024 | Hinds et al. | |
| 12,093,715 B2 | 9/2024 | Zhao et al. | |
| 12,153,499 B2 | 11/2024 | Sontakke et al. | |
| 2001/0014867 A1 | 8/2001 | Conmy | |
| 2002/0019920 A1 | 2/2002 | Reuter et al. | |
| 2002/0038554 A1 | 4/2002 | Monk et al. | |
| 2002/0073089 A1 | 6/2002 | Schwartz et al. | |
| 2002/0082858 A1 | 6/2002 | Heddaya et al. | |
| 2002/0104376 A1 | 8/2002 | Danyluk et al. | |
| 2002/0174098 A1 | 11/2002 | Wu et al. | |
| 2003/0046353 A1 | 3/2003 | Chung et al. | |
| 2003/0147309 A1 | 8/2003 | Weisberg | |
| 2004/0059878 A1 | 3/2004 | Madany | |
| 2005/0027661 A1 | 2/2005 | Lober et al. | |
| 2005/0149757 A1 | 7/2005 | Corbett et al. | |
| 2006/0029096 A1 | 2/2006 | Babbar et al. | |
| 2006/0107006 A1 | 5/2006 | Green et al. | |
| 2006/0143412 A1 | 6/2006 | Armangau | |
| 2006/0161444 A1 | 7/2006 | Lubrecht et al. | |
| 2006/0161462 A1 | 7/2006 | Sharma | |
| 2006/0161879 A1 | 7/2006 | Lubrecht et al. | |
| 2006/0242189 A1 | 10/2006 | Leetaru et al. | |
| 2006/0253472 A1 | 11/2006 | Wasserman et al. | |
| 2007/0022065 A1 | 1/2007 | Hatano et al. | |
| 2007/0100793 A1 | 5/2007 | Brown et al. | |
| 2007/0183224 A1 | 8/2007 | Erofeev | |
| 2007/0185852 A1 | 8/2007 | Erofeev | |
| 2007/0185922 A1 | 8/2007 | Kapoor et al. | |
| 2007/0185937 A1 | 8/2007 | Prahlad et al. | |
| 2007/0234115 A1 | 10/2007 | Saika | |
| 2007/0300221 A1 | 12/2007 | Hartz et al. | |
| 2008/0059894 A1 | 3/2008 | Cisler et al. | |
| 2008/0126945 A1 | 5/2008 | Munkvold et al. | |
| 2008/0256311 A1 | 10/2008 | Lee | |
| 2009/0022285 A1 | 1/2009 | Swanburg et al. | |
| 2009/0028082 A1 | 1/2009 | Wynn et al. | |
| 2009/0037914 A1 | 2/2009 | Chagoly et al. | |
| 2009/0112881 A1 | 4/2009 | Kodama | |
| 2009/0125858 A1 | 5/2009 | Vishweshwara et al. | |
| 2009/0132543 A1 | 5/2009 | Chatley et al. | |
| 2009/0161547 A1 | 6/2009 | Riddle et al. | |
| 2009/0228669 A1 | 9/2009 | Slesarev et al. | |
| 2009/0276771 A1 | 11/2009 | Nickolov et al. | |
| 2009/0276833 A1 | 11/2009 | Paul et al. | |
| 2009/0319582 A1 | 12/2009 | Simek et al. | |
| 2010/0017801 A1 | 1/2010 | Kundapur | |
| 2010/0023564 A1 | 1/2010 | Yerneni et al. | |
| 2010/0198791 A1 | 8/2010 | Wu et al. | |
| 2010/0251242 A1 | 9/2010 | Sivasubramanian et al. | |
| 2011/0004586 A1 | 1/2011 | Cherryholmes et al. | |
| 2011/0022882 A1 | 1/2011 | Jaehde et al. | |
| 2011/0071981 A1 | 3/2011 | Ghosh et al. | |
| 2011/0093435 A1 | 4/2011 | Zha et al. | |
| 2011/0099420 A1 | 4/2011 | Macdonald Mcalister et al. | |
| 2011/0138383 A1 | 6/2011 | Le | |
| 2011/0252420 A1 | 10/2011 | Tung et al. | |
| 2012/0011378 A1 | 1/2012 | Dalton et al. | |
| 2012/0084260 A1 | 4/2012 | Cherkauer et al. | |
| 2012/0123999 A1 | 5/2012 | Ashutosh et al. | |
| 2012/0271797 A1 | 10/2012 | Patil | |
| 2012/0290714 A1 * | 11/2012 | Cohen | G06F 11/3055 |
| | | | 709/224 |
| 2013/0019015 A1 | 1/2013 | Devarakonda et al. | |
| 2013/0031136 A1 | 1/2013 | Shah | |
| 2013/0091285 A1 | 4/2013 | Devarakonda et al. | |
| 2013/0110779 A1 | 5/2013 | Taylor et al. | |
| 2013/0117441 A1 | 5/2013 | Kuchibhotla et al. | |
| 2013/0232470 A1 | 9/2013 | Yung | |
| 2013/0232497 A1 | 9/2013 | Jalagam et al. | |
| 2013/0238331 A1 | 9/2013 | Mikan et al. | |
| 2013/0263119 A1 | 10/2013 | Pissay et al. | |
| 2013/0290180 A1 | 10/2013 | Baffier et al. | |
| 2013/0332251 A1 | 12/2013 | Ioannidis et al. | |
| 2014/0006350 A1 | 1/2014 | Fukui et al. | |
| 2014/0018947 A1 | 1/2014 | Ales | |
| 2014/0059226 A1 | 2/2014 | Messerli et al. | |
| 2014/0101117 A1 | 4/2014 | Uzzaman | |
| 2014/0108339 A1 | 4/2014 | Marsden | |
| 2014/0108352 A1 | 4/2014 | Ahrens et al. | |
| 2014/0189685 A1 | 7/2014 | Kripalani | |
| 2014/0201171 A1 | 7/2014 | Vijayan et al. | |
| 2014/0229504 A1 | 8/2014 | Kim et al. | |
| 2014/0229698 A1 | 8/2014 | Sivasubramanian et al. | |
| 2014/0250081 A1 | 9/2014 | Stewart et al. | |
| 2014/0282256 A1 | 9/2014 | Fish et al. | |
| 2014/0337844 A1 | 11/2014 | Jin et al. | |

(56)  References Cited

U.S. PATENT DOCUMENTS

| | | |
|---|---|---|
| 2014/0359058 A1 | 12/2014 | Karnawat et al. |
| 2015/0019495 A1 | 1/2015 | Siden et al. |
| 2015/0033223 A1 | 1/2015 | Chari et al. |
| 2015/0039837 A1 | 2/2015 | Quan et al. |
| 2015/0052108 A1 | 2/2015 | Volk et al. |
| 2015/0074054 A1 | 3/2015 | Antony |
| 2015/0121453 A1 | 4/2015 | Gupta |
| 2015/0127611 A1 | 5/2015 | Westerman et al. |
| 2015/0142610 A1 | 5/2015 | Manoharan et al. |
| 2015/0143064 A1 | 5/2015 | Bhargava et al. |
| 2015/0188775 A1 | 7/2015 | Van Der Walt |
| 2015/0188789 A1 | 7/2015 | Jayaprakash |
| 2015/0195347 A1 | 7/2015 | Luft |
| 2015/0207682 A1 | 7/2015 | Moraes Nichele et al. |
| 2015/0207683 A1 | 7/2015 | Adogla |
| 2015/0207703 A1 | 7/2015 | Gallagher et al. |
| 2015/0227435 A1 | 8/2015 | Ashutosh et al. |
| 2015/0227602 A1 | 8/2015 | Ramu et al. |
| 2015/0254141 A1 | 9/2015 | Wertheimer et al. |
| 2015/0301814 A1 | 10/2015 | Chen et al. |
| 2015/0331923 A1 | 11/2015 | Kim |
| 2015/0339941 A1 | 11/2015 | Lu |
| 2015/0347987 A1 | 12/2015 | Ali |
| 2015/0358417 A1 | 12/2015 | Patil et al. |
| 2015/0370641 A1 | 12/2015 | Susairaj et al. |
| 2016/0041997 A1 | 2/2016 | Gokhale et al. |
| 2016/0048408 A1 | 2/2016 | Madhu et al. |
| 2016/0057077 A1 | 2/2016 | Gomatam et al. |
| 2016/0066201 A1 | 3/2016 | Kerpez et al. |
| 2016/0077923 A1 | 3/2016 | Zhang et al. |
| 2016/0077925 A1 | 3/2016 | Tekade et al. |
| 2016/0078104 A1 | 3/2016 | Clifford et al. |
| 2016/0092535 A1 | 3/2016 | Kuchibhotla et al. |
| 2016/0094401 A1 | 3/2016 | Anwar et al. |
| 2016/0094410 A1 | 3/2016 | Anwar et al. |
| 2016/0094647 A1 | 3/2016 | Mordani et al. |
| 2016/0125059 A1 | 5/2016 | Jain et al. |
| 2016/0127307 A1 | 5/2016 | Jain et al. |
| 2016/0162845 A1 | 6/2016 | Carroll et al. |
| 2016/0182328 A1 | 6/2016 | Bhasin et al. |
| 2016/0188421 A1 | 6/2016 | Karinta et al. |
| 2016/0191348 A1 | 6/2016 | Lee et al. |
| 2016/0197835 A1 | 7/2016 | Luft |
| 2016/0224259 A1 | 8/2016 | Ahrens et al. |
| 2016/0239637 A1 | 8/2016 | Miller et al. |
| 2016/0246503 A1 | 8/2016 | Phelan et al. |
| 2016/0248629 A1 | 8/2016 | Erdmann et al. |
| 2016/0266913 A1 | 9/2016 | Achillopoulos |
| 2016/0267105 A1 | 9/2016 | Sun et al. |
| 2016/0274981 A1 | 9/2016 | Wilkinson |
| 2016/0292358 A1 | 10/2016 | Heger |
| 2016/0306840 A1 | 10/2016 | Deshmukh et al. |
| 2016/0321339 A1 | 11/2016 | Tekade et al. |
| 2016/0335369 A1 | 11/2016 | Picard et al. |
| 2016/0337473 A1 | 11/2016 | Rao |
| 2016/0344582 A1 | 11/2016 | Shivanna et al. |
| 2016/0378361 A1 | 12/2016 | Uriel |
| 2016/0378622 A1 | 12/2016 | Ren et al. |
| 2016/0380809 A1 | 12/2016 | Hou et al. |
| 2017/0031775 A1 | 2/2017 | Arumugham et al. |
| 2017/0039236 A1 | 2/2017 | Li et al. |
| 2017/0060699 A1 | 3/2017 | Hohl et al. |
| 2017/0068469 A1 | 3/2017 | Shankar et al. |
| 2017/0091231 A1 | 3/2017 | Difranco et al. |
| 2017/0115978 A1 | 4/2017 | Modi et al. |
| 2017/0199753 A1 | 7/2017 | Gong |
| 2017/0220777 A1 | 8/2017 | Wang et al. |
| 2017/0228227 A1 | 8/2017 | Winterfeldt et al. |
| 2017/0235563 A1 | 8/2017 | Bafna et al. |
| 2017/0235758 A1 | 8/2017 | Gopalapura Venkatesh et al. |
| 2017/0235950 A1 | 8/2017 | Gopalapura Venkatesh et al. |
| 2017/0243275 A1 | 8/2017 | Goens et al. |
| 2017/0262232 A1 | 9/2017 | Zhao et al. |
| 2017/0264684 A1 | 9/2017 | Spillane et al. |
| 2017/0272359 A1 | 9/2017 | Behringer et al. |
| 2017/0286517 A1 | 10/2017 | Horowitz et al. |
| 2017/0286518 A1 | 10/2017 | Horowitz et al. |
| 2017/0315877 A1 | 11/2017 | Kaplingat et al. |
| 2017/0322827 A1 | 11/2017 | Little et al. |
| 2017/0344618 A1 | 11/2017 | Horowitz et al. |
| 2017/0351584 A1 | 12/2017 | Griffith et al. |
| 2017/0351716 A1 | 12/2017 | Higginson et al. |
| 2017/0357667 A1 | 12/2017 | Auch et al. |
| 2017/0371547 A1 | 12/2017 | Fruchtman et al. |
| 2017/0374136 A1 | 12/2017 | Ringdahl |
| 2018/0025007 A1 | 1/2018 | Dai |
| 2018/0060119 A1 | 3/2018 | Zamir |
| 2018/0063088 A1 | 3/2018 | Hardy |
| 2018/0113622 A1 | 4/2018 | Sancheti |
| 2018/0121239 A1 | 5/2018 | Sawhney et al. |
| 2018/0121494 A1 | 5/2018 | Antonopoulos et al. |
| 2018/0121521 A1 | 5/2018 | Bivol |
| 2018/0157561 A1 | 6/2018 | Venkatesh et al. |
| 2018/0173452 A1 | 6/2018 | Hu et al. |
| 2018/0181469 A1 | 6/2018 | Yueh et al. |
| 2018/0203771 A1 | 7/2018 | Heidel et al. |
| 2018/0232142 A1 | 8/2018 | Shekar et al. |
| 2018/0253676 A1 | 9/2018 | Sheth et al. |
| 2018/0270219 A1 | 9/2018 | Li |
| 2018/0275881 A1 | 9/2018 | Ashraf et al. |
| 2018/0285201 A1 | 10/2018 | Bangalore et al. |
| 2018/0285353 A1 | 10/2018 | Ramohalli Gopala Rao et al. |
| 2018/0293397 A1 | 10/2018 | Demember et al. |
| 2018/0300203 A1 | 10/2018 | Kathpal et al. |
| 2018/0307728 A1 | 10/2018 | Crupi et al. |
| 2018/0324279 A1 | 11/2018 | Barton et al. |
| 2019/0005407 A1 | 1/2019 | Harris et al. |
| 2019/0018738 A1 | 1/2019 | Chen |
| 2019/0034240 A1 | 1/2019 | Nabi et al. |
| 2019/0065322 A1 | 2/2019 | Chakankar et al. |
| 2019/0075031 A1 | 3/2019 | Skelton et al. |
| 2019/0087279 A1 | 3/2019 | Kumar et al. |
| 2019/0089597 A1 | 3/2019 | Pathak et al. |
| 2019/0102257 A1 | 4/2019 | Zhou et al. |
| 2019/0102411 A1 | 4/2019 | Hung et al. |
| 2019/0116237 A1 | 4/2019 | Gibson |
| 2019/0121671 A1 | 4/2019 | Guim Bernat |
| 2019/0125828 A1 | 5/2019 | Bortz |
| 2019/0129799 A1 | 5/2019 | Kumarasamy |
| 2019/0138631 A1 | 5/2019 | Crane |
| 2019/0155699 A1 | 5/2019 | Luo et al. |
| 2019/0155936 A1 | 5/2019 | Du et al. |
| 2019/0158605 A1 | 5/2019 | Markuze et al. |
| 2019/0179711 A1 | 6/2019 | Luo et al. |
| 2019/0182213 A1 | 6/2019 | Saavedra et al. |
| 2019/0230156 A1 | 7/2019 | Mclarty et al. |
| 2019/0235904 A1 | 8/2019 | Epping et al. |
| 2019/0238412 A1 | 8/2019 | Vohra et al. |
| 2019/0238520 A1 | 8/2019 | Espinosa et al. |
| 2019/0245704 A1 | 8/2019 | Pala |
| 2019/0266268 A1 | 8/2019 | Polinati |
| 2019/0310926 A1 | 10/2019 | Hashimoto et al. |
| 2019/0324865 A1 | 10/2019 | Weissman et al. |
| 2019/0332582 A1 | 10/2019 | Kumar et al. |
| 2019/0339870 A1 | 11/2019 | Meiri et al. |
| 2019/0340091 A1 | 11/2019 | Chandrasekaran et al. |
| 2019/0349194 A1 | 11/2019 | Fan |
| 2019/0361412 A1 | 11/2019 | Park et al. |
| 2019/0361748 A1 | 11/2019 | Walters et al. |
| 2019/0362004 A1 | 11/2019 | Oks et al. |
| 2019/0370146 A1 | 12/2019 | Babu et al. |
| 2019/0384496 A1 | 12/2019 | Abdul Rasheed et al. |
| 2019/0391880 A1 | 12/2019 | Wang et al. |
| 2019/0394093 A1 | 12/2019 | Kulkarni et al. |
| 2020/0028932 A1 | 1/2020 | Yang et al. |
| 2020/0034178 A1 | 1/2020 | Gupta et al. |
| 2020/0034245 A1 | 1/2020 | Kohler |
| 2020/0042293 A1 | 2/2020 | Elango et al. |
| 2020/0050522 A1 | 2/2020 | Coleman et al. |
| 2020/0059411 A1 | 2/2020 | Olmsted-Thompson et al. |
| 2020/0081704 A1 | 3/2020 | Bafna et al. |
| 2020/0097177 A1 | 3/2020 | Ashokkumar et al. |
| 2020/0097325 A1 | 3/2020 | Vadapandeshwara et al. |
| 2020/0099692 A1 | 3/2020 | Jindal et al. |

(56) References Cited

U.S. PATENT DOCUMENTS

| | | |
|---|---|---|
| 2020/0104375 A1 | 4/2020 | Earnesty et al. |
| 2020/0104376 A1 | 4/2020 | Earnesty et al. |
| 2020/0104377 A1 | 4/2020 | Earnesty et al. |
| 2020/0106737 A1 | 4/2020 | Beedu et al. |
| 2020/0110675 A1 | 4/2020 | Wang et al. |
| 2020/0137157 A1 | 4/2020 | Joseph et al. |
| 2020/0153898 A1 | 5/2020 | Sabath et al. |
| 2020/0162380 A1 | 5/2020 | Pilkington et al. |
| 2020/0193388 A1 | 6/2020 | Tran-Kiem et al. |
| 2020/0201526 A1 | 6/2020 | Kuchibhotla et al. |
| 2020/0210378 A1* | 7/2020 | Kuchibhotla ....... G06F 11/1471 |
| 2020/0210379 A1 | 7/2020 | Kuchibhotla et al. |
| 2020/0250046 A1 | 8/2020 | Wong et al. |
| 2020/0250059 A1* | 8/2020 | Bothello ............... G06F 9/5027 |
| 2020/0285608 A1 | 9/2020 | Chakankar et al. |
| 2020/0285652 A1 | 9/2020 | Wang et al. |
| 2020/0314173 A1 | 10/2020 | Pahwa et al. |
| 2020/0322425 A1 | 10/2020 | Sharma et al. |
| 2020/0349018 A1 | 11/2020 | Meadowcroft et al. |
| 2020/0351332 A1 | 11/2020 | Palladino et al. |
| 2020/0366661 A1 | 11/2020 | Mehta et al. |
| 2020/0379793 A1 | 12/2020 | Parihar et al. |
| 2021/0034471 A1 | 2/2021 | Khandkar et al. |
| 2021/0051530 A1 | 2/2021 | Venkataraman et al. |
| 2021/0064512 A1 | 3/2021 | Sirov et al. |
| 2021/0064591 A1 | 3/2021 | Sun et al. |
| 2021/0075700 A1 | 3/2021 | Palladino et al. |
| 2021/0117293 A1 | 4/2021 | Luo et al. |
| 2021/0133031 A1 | 5/2021 | Moldvai et al. |
| 2021/0135983 A1 | 5/2021 | Farnham |
| 2021/0141921 A1 | 5/2021 | Toplak |
| 2021/0141923 A1 | 5/2021 | Wu et al. |
| 2021/0144060 A1 | 5/2021 | Cencini et al. |
| 2021/0194825 A1 | 6/2021 | Goodman et al. |
| 2021/0200643 A1 | 7/2021 | Luo et al. |
| 2021/0218598 A1 | 7/2021 | Ganapathy et al. |
| 2021/0281428 A1 | 9/2021 | Kempf et al. |
| 2021/0328979 A1 | 10/2021 | M |
| 2021/0391999 A1 | 12/2021 | Chilamakuri et al. |
| 2021/0400533 A1 | 12/2021 | Kwok |
| 2021/0406132 A1 | 12/2021 | Gupta et al. |
| 2021/0406717 A1 | 12/2021 | Tauheed et al. |
| 2022/0004469 A1 | 1/2022 | Shen et al. |
| 2022/0066993 A1 | 3/2022 | Khanuja et al. |
| 2022/0116445 A1 | 4/2022 | Filippou et al. |
| 2022/0311681 A1 | 9/2022 | Palladino et al. |
| 2022/0351169 A1 | 11/2022 | Kim et al. |
| 2022/0417205 A1 | 12/2022 | Nainar et al. |
| 2023/0065444 A1* | 3/2023 | Pyla ..................... G06F 9/5016 |
| 2023/0095814 A1 | 3/2023 | Sarkar |
| 2023/0096071 A1 | 3/2023 | Sarkar |
| 2023/0108625 A1 | 4/2023 | Yi et al. |
| 2023/0115093 A1* | 4/2023 | Zhou ........................ G06N 5/04 |
| | | 706/12 |
| 2023/0125754 A1 | 4/2023 | Willett et al. |
| 2023/0164567 A1 | 5/2023 | Fellows et al. |
| 2023/0185823 A1 | 6/2023 | Chu et al. |
| 2023/0195529 A1* | 6/2023 | Luthra .................. G06F 9/5044 |
| | | 718/104 |
| 2023/0214305 A1 | 7/2023 | Hockey et al. |
| 2023/0216736 A1 | 7/2023 | Almadani et al. |
| 2023/0231912 A1 | 7/2023 | Vohra et al. |
| 2023/0247087 A1 | 8/2023 | Nagaraja et al. |
| 2023/0251938 A1 | 8/2023 | Sontakke et al. |
| 2023/0344885 A1 | 10/2023 | Arnold et al. |
| 2023/0379699 A1 | 11/2023 | Oerton et al. |
| 2024/0045585 A1 | 2/2024 | Kuchibhotla et al. |
| 2024/0045834 A1 | 2/2024 | Kuchibhotla et al. |
| 2024/0126777 A1 | 4/2024 | Tylik et al. |
| 2024/0134824 A1 | 4/2024 | Khanuja et al. |
| 2024/0161006 A1 | 5/2024 | Dey et al. |

FOREIGN PATENT DOCUMENTS

| | | |
|---|---|---|
| CN | 108664660 A | 10/2018 |
| CN | 113010599 A | 6/2021 |
| EP | 1 654 683 B1 | 5/2006 |
| EP | 2 980 707 A1 | 2/2016 |
| GB | 2 451 943 A | 2/2009 |
| LU | 102236 B1 | 11/2020 |
| TW | 201600970 A1 | 1/2016 |
| WO | WO-2010/106578 | 9/2010 |
| WO | WO-2016/069029 A1 | 5/2016 |
| WO | WO-2020/026476 | 2/2020 |
| WO | WO-2020/072338 A1 | 4/2020 |
| WO | WO-2021/108075 A1 | 6/2021 |

OTHER PUBLICATIONS

Baird, Colin. "MongoDB Atlas Security" Medium. Oct. 28, 2021. Retrieved from https://medium.com/@colinbaird_51123/mongodb-atlas-security-46996fb214e (accessed Sep. 28, 2023).

Foreign Search Report on PCT Dtd Sep. 7, 2023.

FreeCodeCamp. "MongoDB Atlas Tutorial—How to Get Started" FreeCodeCamp. Feb. 4, 2021. Retrieved from https://www.freecodecamp.org/news/get-started-with-mongodb-atlas/ (accessed Sep. 28, 2023).

Github. "Multi-tenancy & Row-level Security" Tableau Embedding Playbook. Jul. 7, 2020. Retrieved from https:/tableau.github.io/embedding-playbook/pages/04_multitenancy_and_rls (accessed Sep. 28, 2023).

Kubernetes. "Access Clusters Using the Kubernetes API" Kubernetes Documentation. Apr. 11, 2019. Retrieved from https://kubernetes.io/docs/tasks/administer-cluster/access-cluster-api/ (accessed Oct. 11, 2023).

Kubernetes. "Authenticating" Kubernetes Documentation. Jul. 12, 2018. Retrieved from https://kubernetes.io/docs/reference/access-authn-authz/authentication/ (accessed Oct. 11, 2023).

Kubernetes. "Communication between Nodes and the Control Plane" Kubernetes Documentation. May 1, 2020. Retrieved from https://kubernetes.io/docs/concepts/architecture/control-plane-node-communication/ (accessed Oct. 9, 2023).

Kubernetes. "Nodes" Kubernetes Documentation. Jul. 14, 2017. Retrieved from https://kubernetes.io/docs/concepts/architecture/nodes/ (accessed Oct. 11, 2023).

Kubernetes. "Operating etcd clusters for Kubernetes" Kubernetes Documentation. Sep. 27, 2018. Retrieved from https://kubernetes.io/docs/tasks/administer-cluster/configure-upgrade-etcd/ (accessed Oct. 11, 2023).

Kubernetes. "PKI certificates and requirements" Kubernetes Documentation. Jun. 16, 2019. Retrieved from https://kubernetes.io/docs/setup/best-practices/certificates/ (accessed Oct. 11, 2023).

Melo, Gilson. "Overview of the Interconnect Between Oracle and Microsoft" Oracle Cloud Infrastructure Blog. Jun. 5, 2019 Retrieved from https://blogs.oracle.com/cloud-infrastructure/post/overview-of-the-interconnect-between-oracle-and-microsoft (accessed Sep. 28, 2023).

Microsoft. "How Project schedules tasks: Behind the scenes" Project Desktop. Nov. 12, 2020. Retrieved from https://support.microsoft.com/en-us/office/how-project-schedules-tasks-behind-the-scenes-df3431ab-8d8a-4047-afc6-a87b547dbac0 (accessed Sep. 28, 2023).

Oracle. "Exadata Database Service on Cloud@Customer Security Controls" Oracle Gen 2 Exadata Database Service on Cloud@Customer Security Controls. Oct. 26, 2020. Retrieved from https://www.oracle.com/a/ocom/docs/engineered-systems/exadata/exadata-cloud-at-customer-security-controls.pdf (accessed Oct. 9, 2023).

Progress. "Multi-tenant database architecture" Progress Documentation. Sep. 5, 2021. Retrieved fromhttps://docs.progress.com/bundle/openedge-database-management-117/page/Multi-tenant-database-architecture.html (accessed Sep. 28, 2023).

Progress. "Multi-tenant features" Progress Documentation. Apr. 12, 2017. Retrieved from https://docs.progress.com/bundle/openedge-database-management-117/page/Multi-tenant-features.html (accessed Sep. 28, 2023).

(56) References Cited

OTHER PUBLICATIONS

Progress. "Simple tenancy" Progress Documentation. Apr. 12, 2017. Retrieved from https://docs.progress.com/bundle/openedge-database-management-117/page/Simple-tenancy.html (accessed Sep. 28, 2023).

Progress. "Table partitioning details" Progress Documentation. Sep. 6, 2021. Retrieved from https://docs.progress.com/bundle/openedge-database-management-117/page/Table-partitioning-details.html (accessed Sep. 28, 2023).

Progress. "Tenant ID" Progress Documentation. Apr. 12, 2017. Retrieved from https://docs.progress.com/bundle/openedge-database-multitenancy-117/page/Tenant-ID.html (accessed Sep. 28, 2023).

Progress. "Tenant-ID( ) method" Progress Documentation. Jun. 2011. Retrieved from https://docs.progress.com/bundle/abl-reference/page/TENANT-ID-method.html# (accessed Sep. 28, 2023).

Progress. "What is multi-tenancy?" Progress Documentation. Apr. 12, 2017. Retrieved from https://docs.progress.com/bundle/openedge-database-multitenancy-117/page/What-is-multi-tenancy.html (accessed Sep. 28, 2023).

Saleforce. "Row-Level Security Example based on Role Hierarchy and Record Ownership" SalesForce Help. Apr. 2021. Retrieved from https://help.salesforce.com/s/articleView?language=en_US&id=sf.bi_security_rowlevel_example_rolehierarchy.htm&type=5 (accessed Sep. 28, 2023).

Tabbara, Bassam, et al. "Introducing Crossplane—An Open Source Multi-Cloud Control-Plane" Dec. 4, 2018. Retrieved from https://docs.google.com/document/d/1whncqdUeU2cATGEJhHvzXWC9xdK29Er45NJeoemxebo/mobilebasic (accessed Sep. 28, 2023).

Ten Six. "How to Assign a Task Calendar in Microsoft Project" Ten Six Consulting. Feb. 27, 2018. Retrieved from https://tensix.com/how-to-assign-a-task-calendar-in-microsoft-project/ (accessed Sep. 28, 2023).

Viveros, P., et al. "Optimal grouping and scheduling of preventive maintenance activities" Research Publishing, Singapore.Nov. 1, 2020. Retrieved from https://re.public.polimi.it/retrieve/handle/11311/1181262/685019/ (accessed Sep. 28, 2023).

YouTube Video screenshots for Progress User Assistance. "Creating tenants, domains, and users in a Progress OpenEdge multi tenant database" YouTube. May 23, 2016. Retrieved from https://youtu.be/3kGL2afVV_E [youtube.com] (accessed Sep. 28, 2023).

YouTube Video screenshots for Progress. "Data Management: Table Partitioning and Multi-tenancy" YouTube. Oct. 8, 2018. Retrieved from https://www.youtube.com/watch?v=NbEuNmSazh8 [youtube.com] (accessed Sep. 28, 2023).

YouTube Video screenshots for Progress. "Evolving Your OpenEdge Architecture" YouTube. Apr. 26, 2019. Retrieved from https://youtu.be/-7r7xISRe3U [youtube.com] (accessed Sep. 28, 2023).

YouTube Video for Delphix Corp., "How To Create Database Copies with Delphix," YouTube, Apr. 3, 2018, https://www.youtube.com/watch?v=1EjR-k4EJ68 [youtube.com].

YouTube Video for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].

AWS. "Amazon RDS Backup & Restore Using AWS Backup How-To Guide" Getting Started Resource Center. Jun. 14, 2021. Retrieved from https://aws.amazon.com/getting-started/hands-on/amazon-rds-backup-restore-using-aws-backup/ (accessed Dec. 7, 2023).

AWS. "Amazon RDS Backup and Restore" AWS. Sep. 18, 2020. Retrieved from https://aws.amazon.com/rds/features/backup/ (accessed Dec. 7, 2023).

AWS. "Backup with AWS" AWS. Jun. 2019. Retrieved from https://pages.awscloud.com/rs/112-TZM-766/images/AWS004%20B%26R%20eBook%20R4i.pdf (accessed Dec. 7, 2023).

AWS. "Getting started 3: Create a scheduled backup" AWS Backup. Oct. 21, 2019. Retrieved from https://docs.aws.amazon.com/aws-backup/latest/devguide/create-a-scheduled-backup.html (accessed Dec. 7, 2023).

AWS. "Tagging Amazon RDS resources" Amazon Relational Database Service. Jan. 16, 2013. Retrieved from https://docs.aws.amazon.com/AmazonRDS/latest/UserGuide/USER_Tagging.html (accessed Dec. 7, 2023).

AWS. "Working with backups" Amazon Relational Database Service. Jan. 16, 2013. Retrieved from https://docs.aws.amazon.com/AmazonRDS/latest/UserGuide/USER_WorkingWithAutomatedBackups.html (accessed Dec. 7, 2023).

Husemoller, John. "Automate AWS Backups with AWS Service Catalog" AWS Cloud Operations & Migrations Blog. Jan. 31, 2021. Retrieved from https://aws.amazon.com/blogs/mt/automate-aws-backups-with-aws-service-catalog/ (accessed Dec. 7, 2023).

Hussain, Sadequl. "Running SQL Server Databases in the Amazon Cloud—RDS Backup and Restore (Part 3)" MSSQL Tips. Jul. 2014. Retrieved from https://www.mssqltips.com/sqlservertip/3290/running-sql-server-databases-in-the-amazon-cloud-rds-backup-and-restore-part-3/ (accessed Dec. 7, 2023).

Sommer, Chris. "Beware the automated backup window when running native SQL Server backups in RDS" SQL Server Central. Aug. 4, 2017. Retrieved from https://www.sqlservercentral.com/blogs/beware-the-automated-backup-window-when-running-native-sql-server-backups-in-rds (accessed Dec. 7, 2023).

"Amazon RDS Now Supports Setting Up Connectivity Between Your RDS Database and EC2 Compute Instance in 1-Click", Amazon Web Services, https://aws.amazon.com/rds.

"Azure Arc extends the Azure control plane", https://infohub.delltechnologies.com/l/techbook-dell-emc-integrated-system-for-microsoft-azure-stack-hci-2/azure-arc-extends-the-azure-control-plane-14.

"Configure cross-tenant access settings for B2B collaboration", Azure AD, Microsoft Entra, May 24, 2022, 21pp.

"Connected Machine Agent Prerequisites", Sep. 27, 2022, https://learn.microsoft.com/en-us/azure/azure-arc/servers/prerequisites.

"Control Plane", https://docs.controlplane.com.

"Exadata Database Service onCloud@Customer Administrator'sGuide", https://docs.oracle.com/en/engineered-systems/exadata-cloud-at-customer/ecccm/ecc-network-requirements.html#GUID-F06BD75B-E971-48ED-8699-E1004D4B4AC1.

Features and Capabilities of Azure Arcenabled SQL Managed Instance:, Aug. 13, 2022, https://learn.microsoft.com/en-us/azure/azure-arc/data/managed-instance-features.

"Managing Cloud-Native Workloads with Anthos", https://authors.packtpub.com/wp-content/uploads/2021/10/Chapter-8-Professional-Cloud-Architect-1.pdf.

"Oracle Exadata Cloud@Customer X9M", Version 1.17, 2022, https://www.oracle.com/dk/a/ocom/docs/engineered-systems/exadata/exacc-x9m-ds.pdf.

"Overview of Azure Connected Machine Agent", Sep. 4, 2022, https://learn.microsoft.com/en-us/azure/azure-arc/servers/agent-overview.

"Row-Level Security", Sep. 17, 2022, https://learn.microsoft.com/en-us/sql/relational-databases/security/row-level-security?view=sql-server-ver16.

"Use Azure Private Link to Securely Connect Servers to Azure Arc", Jul. 28, 2022, https://learn.microsoft.com/en-us/azure/azure-arc/servers/private-link-security.

Alhamazani, et al., "Cross-Layer Multi-Cloud Real-Time Application QoS Monitoring and Benchmarking As-a-Service Framework", https://arxiv.org/ftp/arxiv/papers/1502/1502.00206.pdf.

Aluciani. "Provisioning PostgreSQL to be Highly Available and Resilient on Nutanix" Nutanix Community Blog. 2019. Retrieved from https://next.nutanix.com/community-blog-154/provisioning-postgresql-to-be-highly-available-and-resilient-on-nutanix-33726 (Year: 2019).

Amazon Web Services, "Amazon RDS Now Supports Setting up Connectivity Between You RDS Database and EC2 Compute Instance in 1-Click", https://aws.amazon.com/about-aws/whats-new/2022/08/amazon-rds-setting-up-connectivity-rds-database-ec2-compute-instance-1-click/.

Amazon Web Services, "Amazon RDS on Outposts", https://aws.amazon.com/rds/outposts/?pg=In&sec=hiw.

Amazon Web Services, "Configuring and Using Oracle Connection Manager on Amazon EC2 for Amazon RDS for Oracle", Jan. 12,

(56) References Cited

OTHER PUBLICATIONS 2021, https://aws.amazon.com/blogs/database/configuring-and-using-oracle-connection-manager-on-amazon-ec2-for-amazon-rds-for-oracle.

Amazon Web Services, "SaaS Tenant Isolation Strategies. Isolating Resources in a Multi-Tenant Environment", (Aug. 2020).

Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).

Anjum, Maaz, "Database Provisioning in EM12c: Provision me a Database Now!" Slideshare, (Dec. 12, 2013) from https://www.slideshare.net/MaazAnjum/maaz-anjum-gouser-database-provisioning-in-em12c-provision-me-a-database-now (accessed Jun. 28, 2021).

Anthos Technical Overview, https://cloud.google.com/anthos/docs/concepts/overview.

ApexSQL, "Automated database provisioning using ApexSQL DevOps toolkit" ApexSQL Knowledgebase (2020) from https://knowledgebase.apexsql.com/automated-database-provisioning-using-apexsql-devops-toolkit/ (accessed Jun. 28, 2021).

Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).

AWS Database Blog, "Configuring and Using Oracle Connection Manager on Amazon for EC2 for Amazon RDS for Oracle", Jan. 12, 2021, https://aws.amazon.com/blogs/database/configuring-and-using-oracle-connection-manager-on-amazon-ec2-for-amazon-rds-for-oracle/.

AWS Prescriptive Guidance, "PostgreSQL Pool Model", https://docs.aws.amazon.com/prescriptive-guidance/latest/saas-multitenant-managed-postgresql/pool.html.

AWS Prescriptive Guidance, "Row-Level Security Recommendations", https://docs.aws.amazon.com/prescriptive-guidance/latest/saas-multitenant-managed-postgresql/rls.html.

AWS Serverless SaaS Workshop—Lab4 : Isolating tenant data in a pooled model—Adding the missing code.

AWS Serverless SaaS Workshop—Lab4 : Isolating tenant data in a pooled model—Revisiting Authentication, Authorization, & Tenant Isolation.

AWS, "Working with Aurora multi-master clusters" User Guide for Aurora. 2020. Received from https://docs.aws.amazon.com/AmazonRDS/latest/AuroraUserGuide/aurora-multi-master.html (Year: 2020).

Ay, Neslisah. "How to Set Up a High Available PostgreSQL Cluster Using Patroni" Neslisah Ay Medium Page. Mar. 18, 2019. Retrieved from https://medium.com/@neslisah.demirci/how-to-set-up-a-high-available-postgresql-cluster-using-patroni-d7044a754d2f (Year: 2019).

BackupAssist, "https://backupassist.com/support/en/backupassist/manage/calendar.htm", Jul. 1, 2017 (Year: 2017).

Balasubramanian, Sudhir, "Virtual Volumes for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).

Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).

Brooks, Aaron, "19 Best A/B Testing Tools in 2021" (published Aug. 12, 2020) Venture Harbour, from https://www.ventureharbour.com/best-a-b-testing-tools/ (accessed Sep. 14, 2021).

Brull, Jim, "Oracle Cloud Database vs On-Premises—Understanding the Differences" Centroid—OCI, Oracle Cloud. 2020. Received from https://www.centroid.com/blog/oracle-cloud-database-vs-on-premises/ (Year: 2020).

Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).

Bucur, et al., "Multi-Cloud Resource Management Techniques for Cyber-Physical Systems", MDPI, Dec. 15, 2021, https://www.ncbi.nlm.nih.gov/pmc/articles/PMC8706026/.

Cano, Ignacio, et al. "Curator: Self-Managing Storage for Enterprise Clusters" (Mar. 27, 2017), from https://www.usenix.org/conference/nsdi17/.

Cisco Public "Hyperconvergence for Databases" (2019) from https://www.cisco.com/c/dam/en/us/products/collateral/hyperconverged-infrastructure/hyperflex-hx-series/le-60303-hxsql-aag.pdf (accessed Dec. 18, 2019).

Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).

Cisco Public, "Cisco HyperFlex All-NVMe Systems for Oracle Database: Reference Architecture" (2019) from https://www.cisco.com/c/en/us/products/collateral/hyperconverged-infrastructure/hyperflex-hx-series/hx-oracle-wp.html (accessed Dec. 18, 2019).

Cisco Public, "Cisco HyperFlex HX Data Platform" (2018) from https://www.cisco.com/c/dam/en/us/products/collateral/hyperconverged-infrastructure/hyperflex-hx-series/white-paper-c11-736814.pdf (accessed Dec. 18, 2019).

Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).

Cunningham, "Introducing PlanetScale Managed Cloud", Nov. 3, 2021, https://planetscale.com/blog/introducing-planetscale-managed-cloud.

Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).

Delphix "Database Provisioning Overview" (published 2017) Delphix Corp., from https://docs.delphix.com/docs/introduction/database-virtualization-with-delphix/database-provisioning-overview (accessed Dec. 19, 2019).

Delphix "Quick Start Guides" (published 2017) Delphix Corp., from https://docs.delphix.com/docs52/quick-start-guides (accessed Dec. 19, 2019).

Delphix "Replication" (Published 2017) Delphix Corp., from https://docs.delphix.com/docs52/data-backup-and-recovery-solutions/replication (accessed Dec. 19, 2019).

Delphix, "Provisioning and Managing Virtual Databases" Delphix Engine 6.0.8.0 Documentation (2020) from https://docs.delphix.com/docs/datasets/getting-started/provisioning-and-managing-virtual-databases (accessed Jun. 28, 2021).

Delphix, "Understanding SnapSync and LogSync for Oracle" (May 5, 2013) from https://www.delphix.com/blog/data-virtualization/understanding-snapsync-and-logsync-oracle (accessed Jan. 7, 2020).

Drake, Sam et al. "Architecture of Highly Available Databases" International Service Availability Symposium, pp. 1-16. Springer, Berlin, Heidelberg, 2004. (Year: 2004).

Dremio, "Multiple AWS Clusters" Dremio. 2020. Received from https://docs.dremio.com/deployment/provisioning-ec2.html (Year: 2020).

Ex Parte Quayle Action with Refs. on U.S. Appl. No. 29/733,571 Dtd Feb. 11, 2022.

Extended European Search Report re EP21192308.1 Dtd Jan. 24, 2022.

Extended European Search Report re EP21192379.2 Dtd Jan. 26, 2022.

Fenton, Tom, "How To Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).

Final Office Action on U.S. Appl. No. 16/234,547 Dtd Sep. 9, 2022.

Final Office Action on U.S. Appl. No. 16/234,547 Dtd Oct. 5, 2021.

Final Office Action on U.S. Appl. No. 17/006,595 Dtd Oct. 14, 2021.

Final Office Action on U.S. Appl. No. 17/182,511 Dtd Dec. 6, 2022.

Final Office Action on U.S. Appl. No. 17/337,197 Dtd Dec. 15, 2022.

(56) References Cited

OTHER PUBLICATIONS

Flecha, Pete, "Whats New in Virtual Volumes (vVols) 2.0" VMware vSAN Virtual Blocks Blog (Oct. 18, 2016) from https://blogs.vmware.com/virtualblocks/2016/10/18/whats-new-in-virtual-volumes-2-0/ (accessed Jun. 2, 2021).

Foreign Action other than Search Report on EP 21192308.1 Dtd Apr. 6, 2022.

Foreign Action other than Search Report on EP 21192308.1 Dtd Jun. 10, 2022.

Foreign Action other than Search Report on EP 21192379.2 Dtd Jun. 15, 2022.

Friedman, Vitaly, "Designing the Perfect Date and Time Picker." Smashing Magazine, published Jul. 2017 (Retrieved from the Internet Apr. 7, 2020). Internet URL: < https://www.smashingmagazine.com/2017 /07 /designing-perfect-date-time-picker/> (Year: 2017).

Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).

Geek University, "VM snapshot files," VMware ESXi course, retrieved Sep. 11, 2022 from https://geek-university.com/vm-snapshot-files/.

Geier, Eric, "Using Static IP Addresses on Your Network" Cisco Press. Sep. 14, 2009. Received from https://www.ciscopress.com/articles/article.asp?p=1393495. (Year: 2009).

Google Cloud, "Architectures for high availability of PostgreSQL clusters on Compute Engine" Google Cloud Architecture Center, (Jan. 21, 2021) from https://cloud.google.com/architecture/architectures-high-availability-postgresql-clusters-compute-engine (accessed Dec. 14, 2021).

Grace, Cato, "What's New in SRM and vSphere Replication 8.3" VMware vSAN Virtual Blocks Blog (Mar. 10, 2020) from https://blogs.vmware.com/virtualblocks/2020/03/10/whats-new-srm-vr-83/ (accessed Jun. 2, 2021).

Guevara, Introducing PlanetScale Insights: Advanced query monitoring, May 26, 2022, https://planetscale.com/blog/introducing-planetscale-insights-advanced-query-monitoring.

Gui, Huan et al. "Network A/B Testing: From Sampling to Estimation" Proceedings of the 24th International Conference on World Wide Web (WWW 15), pp. 399-409, May 18, 2015. DOI: 10.1145/2736277.2741081 (Year: 2015).

Hammerspace, "Simplify Database Deployment Across Kubernetes Clusters" Hammerspace Solution Brief. 2020. Received from https://hammerspace.com/wp-content/uploads/2019/03/HS0107-USEN-Multi-Cluster-Database-Deployments.pdf (Year: 2020).

Hosterman, Cody, "Introducing vSphere Virtual Volumes on the FlashArray" Pure Storage (Jun. 13, 2017) from https://blog.purestorage.com/purely-technical/introducing-vsphere-virtual-volumes-on-the-flasharray/ (accessed Jun. 2, 2021).

Hosterman, Cody, "Introducing vSphere Virtual Volumes on the FlashArray" PureStorage, (Jun. 13, 2017) from https://blog.purestorage.com/purely-technical/introducing-vsphere-virtual-volumes-on-the-flasharray/ (accessed Jun. 28, 2021).

Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).

Hosterman, Cody, "What's New in vSphere 7.0 Storage Part I: VVols are all over the place!" codyhosterman.com (Mar. 10, 2021) from https://www.codyhosterman.com/2020/03/whats-new-in-vsphere-7-0-storage-part-i-vvols-are-all-over-the-place/ (accessed Jun. 2, 2021).

Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).

IBM, "Creating a database deployment on the cluster" IBM Cloud Paks 2.1.0 (2021) from https://www.ibm.com/docs/en/cloud-paks/cp-data/2.1.0?topic=database-creating-deployment (accessed Jun. 28, 2021).

Katz, Jonathan S. "Multi-Kubernetes Cluster PostgreSQL Deployments" Crunchy Data. May, 7, 2020. Received from https://info.crunchydata.com/blog/multi-kubernetes-cluster-postgresql- deployments (Year: 2020).

Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7 891-1 (Year: 2017).

Kolasa, Konrad, "Date Picker." Dribbble, published Feb. 28, 2017 (Retrieved from the Internet Apr. 7, 2020). Internet URL: < https://dribbble.com/shots/3326020-Date-Picker> (Year: 2017).

Kubernetes "Configure Access to Multiple Clusters" Kubernetes Documentation. Oct. 22, 2020. Retrieved from https://kubernetes.io/docs/tasks/access-application-cluster/configure-access-multiple-clusters/ (Year: 2020).

Kubernetes, "Configure Access to Multiple Clusters" Kubernetes Documentation. Oct. 22, 2020. Received from https://kubernetes.io/docs/tasks/access-application-cluster/configure-access-multiple-clusters/ (Year: 2020).

Kumar, Madan. "Managing High Availability in PostgreSQL—Part III: Patroni" ScaleGrid. Aug. 22, 2019. Retrieved from https://scalegrid.io/blog/managing-high-availability-in-postgresql-part-3/ (Year: 2019).

Lctree, "Lctree," Linked Clone Tree Visualizer for vCloud Director, published (Nov. 28, 2012).

Lee, Brandon, "VMware vSphere 7 vVols New Features" VirtualiztaionHowto (Jun. 3, 2020) from https://www.virtualizationhowto.com/2020/06/vmware-vsphere-7-vvols-new-features/ (accessed Jun. 2, 2021).

M. A. Metawai et al. "Load balancing in distributed multi-agent computing systems" Ain Shams Engineering Journal. ASEJ. May 23, 2012. p. 237-249. (Year: 2012).

Matijaca, Ante, "Dashboard" Dribble, published Dec. 21, 2015, retrieved Feb. 11, 2022 from <https://dribbble.com/shots/2417233-Dashboard> (Year: 2015).

Meadowcroft, Ben, "Virtual Volumes: First Year In Review" VMware vSAN Virtual Blocks Blog (Mar. 14, 2016) from https://blogs.vmware.com/virtualblocks/2016/03/14/virtual-volumes-first- year-in-review/ (accessed Jun. 28, 2021).

Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).

Mellor, Chris "Beam, Flow and Era: Not a yoga class, silly, Nutanix's move into copy data management" (published May 10, 2019) The Register, from https://www.theregister.co.uk/2018/05/10/nutanix_beam_flow_era/ (accessed Dec. 18, 2019).

Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).

Microsoft Docs, "Always On availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.

Microsoft Docs, "What is an Always On availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.

Microsoft SQL, "Upgrading Always On Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).

Microsoft, "Use a template to create an Access desktop database," Microsoft Office Support, retrieved Sep. 29, 2022 from https://support.microsoft.com/en-us/office/use-a-template-to-create-an-access-desktop-database-d9354d47-e4ce-4efb-878b-c48f3650fb73.

(56) References Cited

OTHER PUBLICATIONS

Microsoft, "Database Engine Instances (SQL Server)" Oct. 2, 2020, from https://docs.microsoft.com/en-us/sql/database-engine/configure-windows/database-engine-instances-sql-server?view=sql-server-ver15 (retrieved Jan. 25, 2022).

Mulford, Juan, "vSphere 7—Describe Instant Clone Architecture And Use Cases," Mulcas Cloudy Infrastructures, published Dec. 28, 2021, retrieved Sep. 11, 2022 from https://mulcas.com/vsphere-7-describe-instant-clone-architecture-and-use-cases/.

MVware, "Horizon Architecture", https://techzone.vmware.com/resource/horizon-architecture#introduction.

Net App Support, "Data replication from one destination to another in a series (cascading)" Net App. 2015. Received from https://library.netapp.com/ecmdocs/ECMP1635994/html/GUID-25C143ED-C369-4129-B055-C532FDB8AB79.html (Year: 2015).

Netapp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).

Netapp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).

Nizhegolenko, Alexey. "High-Availability MySQL cluster with load balancing using HAProxy and Heartbeat." Towards Data Science. Dec. 3, 2018. Retrieved from https://towardsdatascience.com/high-availability-mysql-cluster-with-load-balancing-using-haproxy-and-heartbeat-40a16e134691 (Year: 2018).

Non-Final Office Action on U.S. Appl. No. 16/228,728 Dtd Mar. 24, 2020.

Non-Final Office Action on U.S. Appl. No. 16/234,547 Dtd Feb. 22, 2022.

Non-Final Office Action on U.S. Appl. No. 16/234,547 Dtd Apr. 15, 2021.

Non-Final Office Action on U.S. Appl. No. 16/234,547 Dtd Nov. 7, 2022.

Non-Final Office Action on U.S. Appl. No. 16/234,553 Dtd Jan. 6, 2021.

Non-Final Office Action on U.S. Appl. No. 17/122,740 Dtd Aug. 19, 2022.

Non-Final Office Action on U.S. Appl. No. 17/181,586 Dtd Jul. 1, 2022.

Non-Final Office Action on U.S. Appl. No. 17/182,511 Dtd Jul. 21, 2022.

Non-Final Office Action on U.S. Appl. No. 17/237,599 Dtd Oct. 14, 2022.

Non-Final Office Action on U.S. Appl. No. 17/337,197 Dtd Sep. 8, 2022.

Notice of Allowance on U.S. Appl. No. 16/228,728 Dtd Jul. 1, 2020.

Notice of Allowance on U.S. Appl. No. 16/234,553 Dtd Mar. 30, 2021.

Notice of Allowance on U.S. Appl. No. 17/122,740 Dtd Nov. 2, 2022.

Notice of Allowance on U.S. Appl. No. 17/181,586 Dtd Aug. 16, 2022.

Notice of Allowance on U.S. Appl. No. 17/181,586 Dtd Nov. 16, 2022.

Notice of Allowance on U.S. Appl. No. 17/237,599 Dtd Dec. 5, 2022.

Notice of Allowance on U.S. Appl. No. 29/673,554 Dtd Apr. 17, 2020.

Notice of Allowance on U.S. Appl. No. 29/733,571 Dtd Apr. 28, 2022.

Notion, "Database templates," Notion Help Center, retrieved Sep. 29, 2022 from https://www.notion.so/help/database-templates.

Nutanix "Nutanix announces Flow, Era and Beam and .NEXT 2018" (published May 9, 2018) Nutanix Youtube, from https://www.youtube.com/watch?v=w40asaGtrkU (accessed Dec. 19, 2019).

Nutanix, "Blueprints Usage," Nutanix Support and Insights, retrieved Sep. 29, 2022 from https://portal.nutanix.com/page/documents/details?targetId=Nutanix-Calm-Admin-Operations-Guide-v3_2_7:nuc-nucalm-blueprints-intro-c.html.

Nutanix, "Creating a Playbook," Nutanix Support and Insights, retrieved Sep. 29, 2022 from https://portal.nutanix.com/page/documents/details?targetId=Nutanix-Beam-User-Guide:bea-playbook-create-t.html.

Nutanix, "Creating a ServiceNow Template in Beam," Nutanix Support and Insights, retrieved Sep. 29, 2022 from https://portal.nutanix.com/page/documents/details?targetId=Nutanix-Beam-User-Guide:bea-servicenow-template-create-cg-t.html.

Nutanix, "Nutanix Hybrid Cloud Infrastructure Now Available on Amazon Web Services" Nutanix Press Release. Aug. 11, 2020. Received from https://www.nutanix.com/press-releases/2020/nutanix-clusters-on-aws?icid=111AJW0ZPW22N (Year: 2020).

Nyffenegger et al., "SQL Server Instance" 2017, from https://renenyffenegger.ch/notes/development/databases/SQL-Server/architecture/instance (retrieved Jan. 25, 2022).

Opster, "High Availability in Elasticsearch—Cross Cluster Replication and Alternatives" Opster. 2020. Received from https://opster.com/blogs/elasticsearch-cross-cluster-replication-overview/ (Year: 2020).

Opster, "Multi-Cluster Load Balancer—An Alternative to Cross Cluster Replication" Opster. 2020. Received from https://opster.com/elasticsearch-multi-cluster-load-balancer/ (Year: 2020).

Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).

Oracle Cloud, "Using Oracle Autonomous Database on Shared Exadata Infrastructure" published Dec. 2022.

Oracle Communications, "Provisioning Database Interface User's Guide, Release 16.0" (Sep. 2014) Oracle, p. 1-174.

Oracle Help Center, "Enterprise Manager Lifecycle Management Administrator's Guide, 4. Overview of Database Provisioning" (2019) from, https://docs.oracle.com/cd/E24628_01/em.121/e27046/prov_db_overview.htm#EMLCM12206, (accessed Dec. 17, 2019).

Oracle, "Creating Databases Using Database Template," Cloud Administration Guide, retrieved Sep. 29, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.

Oracle, "Creating Databases Using Database Template," Cloud Administration Guide, retrieved on Oct. 17, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.

Oracle, "Creating Databases Using Database Template," Enterprise Manager Cloud Administration Guide, retrieved Sep. 29, 2022 from https://docs.oracle.com/cd/E91266_01/EMCLO/GUID-BB3923BE-192D-40A2-9C5D-AAC5BA3326C0.htm#EMCLO2097.

Oracle, "Creating Databases Using Database Template," Enterprise Manager Cloud Administration Guide, retrieved on Oct. 17, 2022 from https://docs.oracle.com/cd/E91266_01/EMCLO/GUID-BB3923BE-192D-40A2-9C5D-AAC5BA3326C0.htm#EMCLO2097.

Oracle, "Exadata Cloud@Customer Security Controls", Version 2.18, Jul. 27, 2022, https://www.oracle.com/a/ocom/docs/engineered-systems/exadata/exadata-cloud-at-customer-security-controls.pdf.

Oracle, "Introduction to Blueprints," Enterprise Manager Cloud Administration Guide, retrieved Sep. 29, 2022 from https://docs.oracle.com/cd/E63000_01/EMCLO/blueprint.htm#EMCLO1910.

Oracle, "Oracle Exadata Cloud@Customer X9M", Version 1.17, 2022, https://www.oracle.com/dk/a/ocom/docs/engineered-systems/exadata/exacc-x9m-ds.pdf.

Oracle, "Oracle Gen 2 Exadata Cloud@Customer Security Controls", version 2.18, Jul. 27, 2022, https://www.oracle.com/a/ocom/docs/engineered-systems/exadata/exadata-cloud-at-customer-security-controls.pdf.

Oracle, "Using the DBaaS Self Service Portal," Cloud Administration Guide, retrieved Sep. 29, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.

(56)    References Cited

OTHER PUBLICATIONS

Oracle, "Using the DBaaS Self Service Portal," Cloud Administration Guide, retrieved on Oct. 17, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.

Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).

Palmer, Brent, "Date Range." Dribbble, published Oct. 21, 2015 (Retrieved from the Internet Apr. 7, 2020). Internet URL: <https://dribbble.com/shots/2306949-Date-Range> (Year: 2015).

Patil, Manoj E. et al. "Design and Implementation of Graphical User Interface for Relational Database Management System" (2012), International Jounral of Computer Science and Information Technologies (IJCSIT), vol. 3 (3), p. 3871-3874.

PlanetScale, Deployment Options Documentation, Aug. 1, 2022, https://planetscale.com/docs/concepts/deployment-options#cloud.

PlanetScale, Query Insights Documentation, 2022, https://planetscale.com/docs/concepts/query-insights#insights-page-overview.

PlanetScale, The MySQL-compatible serverless database platform, 2022, https://planetscale.com.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Principled Technologies, "VMware vCloud Automation Center DBaaS: Provision databases in minutes" A Principled Technologies Test Report (Aug. 2014) from https://www.principledtechnologies.com/vmware/vCAC_DBaaS_0914.pdf (accessed Jun. 2, 2021).

Raffic, Mohammed, "Creating Linked Clone Desktop Pools in VMware Horizon View 6.X," VMware Arena, published Mar. 15, 2017, retrieved Sep. 11, 2022 from http://www.vmwarearena.com/creating-linked-clone-desktop-pools-in-vmware-horizon-view-6-x/.

Red Hat "Chapter 4. Configuring The Haproxy Load Balancer" Red Hat Customer Portal. 2020. Retrieved on Dec. 22, 2020 from https://access.redhat.com/documentation/en-us/red_hat_cloudforms/4.6/html/high_availability_guide/configuring_haproxy (Year: 2020).

Reed, Kate "Nutanix Introduces Database Services with Era" (published May 9, 2018) Business Wire, from https://www.businesswire.com/news/home/20180509005397/en/ (accessed Dec. 18, 2019).

Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).

Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).

Sanglaji, Maryam et al. "Nutanix Era: Databases Made Simple" (published 2018) Nutanix, from https://www.nutanix.com/blog/nutanix-era-databases-made-simple (accessed Dec. 18, 2019).

Sanglaji, Maryam et al. "Nutanix Era: One-click Database Management (London)" (published 2018) .NEXT Conference 2018, from https://next.nutanix.com/next-conference-2018-54/nutanix-era-one-click-database-manag (accessed Dec. 18, 2019).

Sanglaji, Maryam et al. "Nutanix Era: One-click Database Management" (published 2018) .NEXT Conference 2018, from https://www.dropbox.com/s/tfhw1nb0rcvexg3/NEXTEURO2018%20-%20Nutanix%20Era-One%20click%20Database%20Management.pdf?dl=0 (accessed Dec. 18, 2019).

Savjani, Parikshit, "Automate your Azure Database for MySQL deployments using ARM templates," Microsoft Azure, published Nov. 1, 2018, retrieved Sep. 29, 2022 from https://azure.microsoft.com/en-us/blog/automate-your-azure-database-for-mysql-deployments-using-arm-templates/.

Sharif, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).

Stack Exchange Users. "PostgreSQL High Availability/Scalability using HAProxy and PGBouncer" Stack Exchange. Nov. 2020. Retrieved from https://dba.stackexchange.com/questions/56559/postgresql-high-availability-scalability-using-haproxy-and-pgbouncer (Year: 2020).

Stepan, "How to Set Up Multi-Cluster Load Balancing with GKE", DoiT International. Aug. 17, 2020. Received from https://blog.doit-intl.com/how-to-setup-multi-cluster-load-balancing-with-gke-4b407e1f3dff (Year: 2020).

Stone, "Cross Tenant Access", LoanPro Help, https://help.loanpro.io/article/vyy37c5bhd-cross-tenant-access, accessed Jun. 29, 2022.

Storti, Brian "A Primer on Database Replication" Brianstorti.com (May 23, 2017) from https://www.brianstorti.com/replication/ (accessed Jun. 28, 2021).

Tang, "Multi-tenant access control for cloud services", Aug. 2014, The University of Texas at San Antonio College of Sciences.

Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).

Tessel for Oracle, "Fully-managed, high-performance Oracle databases with enterprise-grade data protection, security, and compliance@ your terms", 2022, https://www.tessell.io/services/oracle.

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jan. 8, 2019.

The Nutanix Bible; from https://nutanixbible.com/; accessed on Jun. 8, 2017.

The Nutanix Bible; from https://nutanixbible.com/; accessed on Jun. 9, 2016.

US Notice of Allowance on U.S. Appl. No. 17/006,595 Dtd Feb. 18, 2022.

US Office Action on U.S. Appl. No. 17/006,595 Dtd Aug. 27, 2021.

Virtualization Works, "VMware vFabric Data Director" Virtualization Works: VMware Authorized Online Reseller, (Jun. 2021) from https://www.virtualizationworks.com/vFabric-Data-Director.asp#:~:text=VMware%C2%AE%20vFabric%E2%84%A2%20Data, agility%20and%20reducing%20database%20TCO (accessed Jun. 28, 2021).

VMWARE "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).

VMware Horizon, "Horizon Control Plane Services Architecture", Sep. 2021, https://images.techzone.vmware.com/sites/default/files/resource/horizon_control_plane_services_architecture_noindex.pdf.

(56) References Cited

OTHER PUBLICATIONS

VMware Tanzu, "Innovate and grow your business on any and many clouds-fast", 2022.

VMware, "Clone a Virtual Machine," VMware Fusion, published Sep. 3, 2020, retrieved Sep. 11, 2022 from https://docs.vmware.com/en/VMware-Fusion/12/com.vmware.fusion.using.doc/GUID-482C606F-0143-4466-A64A-F64116BC5430.html.

VMware, "Create a Workload Cluster Template," VMware Telco Cloud Automation, published Apr. 6, 2021, retrieved on Sep. 29, 2022 from https://docs.vmware.com/en/VMware-Telco-Cloud-Automation/1.9/com.vmware.tca.userguide/GUID-E33A228F-4FB6-41BB-BC8E-AB0D3642B788.html.

VMware, "Deploy a Virtual Machine from a Template in the vSphere Web Client," VMware vSphere, published Apr. 8, 2021, retrieved Sep. 29, 2022 from https://docs.vmware.com/en/VMware-vSphere/6.7/com.vmware.vsphere.vm_admin.doc/GUID-8254CD05-CC06-491D-BA56-A773A32A8130.html.

VMware, "Getting Started with Database Ingestion," VMware vFabric Data Director 2.0, retrieved Sep. 11, 2022 from https://www.vmware.com/pdf/vfabric-data-director-20-database-ingestion-guide.pdf.

VMware, "Horizon 7 Administration," VMware Horizon 7 7.13, published Oct. 2020, retrieved Sep. 11, 2022 from https://docs.vmware.com/en/VMware-Horizon-7/7.13/horizon-administration.pdf.

VMware, "Horizon Cloud on Microsoft Azure Architcture", https://techzone.vmware.com/resource/horizon-cloud-on-microsoft-azure-architecture#introduction.

VMware, "Horizon Cloud Pods in Microsoft Azure—Create a VDI Multi-Cloud Assignment in Your Horizon Cloud Tenant Environment", Aug. 8, 2022, https://docs.vmware.com/en/VMware-Horizon-Cloud-Service/services/hzncloudmsazure.admin15/GUID-9EE86FC9-49CB-4995-8346-3AA76CCE96F8.html.

VMware, "Horizon Control Plane Services Architecture", Sep. 2021, https://images.techzone.vmware.com/sites/default/files/resource/horizon_control_plane_services_architecture_noindex.pdf.

VMware, "Horizon Messaging", https://docs.vmware.com/en/VMware-Horizon-7/7.13/horizon-architecture-planning/GUID-39B5D03B-F619-4355-A30A-F8544D95539C.html.

VMware, "Learn More About Network Profiles in vRealize Automation Cloud", https://docs.vmware.com/en/vRealize-Automation/services/Using-and-Managing-Cloud-Assembly/GUID-01E442EE-4004-4ED1-AA32-9CF73F24CB09.html.

VMware, "Managing Virtual Machines in VMware Cloud on AWS," VMware Cloud on AWS, published Feb. 11, 2021, retrieved on Sep. 29, 2022 from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html.

VMware, "Setting Up Virtual Desktops in Horizon Console," VMware Horizon 7 7.13, published Oct. 2020, retrieved Sep. 11, 2022 from https://docs.vmware.com/en/VMware-Horizon-7/7.13/virtual-desktops.pdf.

VMware, "Snapshot Files," VMware vSphere, published Jul. 29, 2022, retrieved Sep. 11, 2022 from https://docs.vmware.com/en/VMware-vSphere/7.0/com.vmware.vsphere.vm_admin.doc/GUID-38F4D574-ADE7-4B80-AEAB-7EC502A379F4.html.

VMware, "Understanding Clones in VMware vSphere 7," Performance Study, published May 27, 2021, retrieved on Sep. 11, 2022 from https://www.vmware.com/content/dam/digitalmarketing/vmware/en/pdf/techpaper/performance/cloning-vSphere7-perf.pdf.

VMware, "Using VMware Workstation Pro," VMware Workstation Pro 16.0, published 2021, retrieved Sep. 11, 2022 from https://docs.vmware.com/en/VMware-Workstation-Pro/16.0/workstation-pro-16-user-guide.pdf.

VMware, "VMware Horizon 7 Instant-Clone Desktops And RDSH Servers," VMware Horizon 7.x, published Jul. 2017, retrieved Sep. 11, 2022 from https://www.vmware.com/content/dam/digitalmarketing/vmware/en/pdf/techpaper/vmware-horizon-view-instant-clone-technology.pdf.

VMware, "VMware Horizon on VMware vSAN Best Practices," Technical White Paper, published Dec. 2020, retrieved Sep. 11, 2022 from https://www.vmware.com/content/dam/digitalmarketing/vmware/en/pdf/products/vsan/vmware-horizon-7-on-vmware-vsan-best-practices.pdf.

VMware, "VMware vFabric Data DirectorAdministrator and User Guide," vFabric Data Director 1.0, retrieved Sep. 11, 2022 from https://usermanual.wiki/vmware/vfabricdatadirector10ag.715740134/view.

VMware, "VMware vStorage Virtual Machine File System," Vmware Technical White Paper Updated for VMware Vsphere 4 Version 2.0, retrieved Sep. 11, 2022 from https://www.vmware.com/content/dam/digitalmarketing/vmware/en/pdf/techpaper/vmware-vmfs-tech-overview-white-paper.pdf.

VMware, "vRealize Automation Cloud and VMware Cloud on AWS", https://www.vmware.com/content/dam/digitalmarketing/vmware/en/pdf/vrealize-automation/vmw-vrealize-automation-cloud-on-aws-solution-brief.pdf.

VMware, "Create a Workload Cluster Template" (published Apr. 6, 2021) from https://docs.vmware.com/en/VMware-Telco-Cloud-Automation/1.9/com.vmware.tca.userguide/GUID-E33A228F-4FB6-41BB-BC8E-AB0D3642B788.html (accessed Sep. 10, 2021).

VMware, "Deploy a Virtual Machine from a Template in the vSphere Web Client" (published Apr. 8, 2021) from https://docs.vmware.com/en/VMware-vSphere/6.7/com.vmware.vsphere.vm_admin.doc/GUID-8254CD05-CC06-491D-BA56-A773A32A8130.html (accessed Sep. 10, 2021).

VMware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).

VMware, "Managing Virtual Machines in VMware Cloud on AWS" (published Feb. 11, 2021) from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html (accessed Sep. 10, 2021).

VMware, "Virtual Volumes and Replication" VMware Docs (May 31, 2019) from https://docs.vmware.com/en/VMware-vSphere/6.5/com.vmware.vsphere.storage.doc/GUID-6346A936-5084-4F38-ACB5-B5EC70AB8269.html (accessed Jun. 2, 2021).

VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).

VMware, "What's New in vSphere 7 Core Storage" VMware The Cloud Platform Tech Zone (May 17, 2021) from https://core.vmware.com/resource/whats-new-vsphere-7-core-storage#sec2-sub5 (accessed Jun. 2, 2021).

VMware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmware-whats-new-vsphere-virtual-volumes.pdf (accessed Jun. 2, 2021).

VMware, Cloud Control Plane Management, "Horizon Control Plane Services", https://www.vmware.com/in/products/horizon/controlplane.html.

VMware, Create Network Profiles, https://vdc-repo.vmware.com/vmwb-repository/dcr-public/e07569a6-6154-45d7-acdf-595e0b089892/44bb2e01-dd74-44e8-98da-b16f257b9a8d/GUID-35DF1889-6E34-449E-915A-3BC5C4DA172C.html.

Warner, Alex et al., "Chapter 16—Canarying Releases" (published 2018) Google Workbook published by O'Reilly Media, Inc., from https://sre.google/workbook/canarying-releases/ (accessed Sep. 14, 2021).

Warren, "Internet Archive Wayback Machine Introduces New Beta Version With Calendar View." warren's blog, published Jan. 23, 2011 (Retrieved from the Internet Apr. 7, 2020). Internet URL: <warrenduecker.blogspot.com/2011/01/internet-archive-wayback-machine.html> (Year: 2011).

WebDeveloper Juice, "7 Beatiful Web Based Timeline Using Javascript and CSS," WebDeveloper Juice, published Sep. 28, 2011, retrieved

(56) References Cited

OTHER PUBLICATIONS

Feb. 11, 2022 from <https://www.webdeveloperjuice.com/2011/09/28/7-beautiful-web-based-timeline-using-javascript-and-css/> (Year: 2011).

Wickstrom, Frank, "Keeping personal data personal with database sanitization" Anders. (Jun. 26, 2019) from https://www.anders.com/en/blog/keeping-personal-data-personal-with-database-sanitization/ (accessed Jun. 28, 2021).

YouTube Video screenshots for "Nutanix Business Critical Applications & Databases—.NEXT Europe 2019," YouTube, Oct. 16, 2019, https://www.youtube.com/watch?v=KI7IEmm6j60 [youtube.com].

YouTube Video screenshots for Nutanix , "Nutanix Era .NEXT 2019 Demo", YouTube, May 10, 2019, https://youtu.be/PAWHHdCEArc [youtube.com].

YouTube Video screenshots for Nutanix , "Unify Private and Public Clouds with Nutanix Clusters", YouTube, Jul. 31, 2020, https://www.youtube.com/watch?v=xuw4F4wBDoc [youtube.com].

Zhang, Junchi, "vFabric Data Director 2.7 customer deck," published May 17, 2013, retrieved Sep. 11, 2022 from https://www.slideshare.net/harryaya/vfabric-data-director-27-customer-deck.

Arslan, Erman, "Delphix—Notes vol. 1, my new toy for the upcoming months," Erman Arslan's Oracle Blog, published Aug. 8, 2016, retrieved on Jan. 2, 2023 from http://ermanarslan.blogspot.com/2016/08/delphix-notes-vol-1-my-new-toy-for.html.

Delphix Corp., "Delphix Engine User Guide," Delphix, published Dec. 2017, retrieved Jan. 2, 2023 from https://docs.delphix.com/docs52/files/83053093/83053098/2/1512670775673/Delphix Engine User Guide.pdf.

Delphix Corp., "Delphix Engine User Guide," Delphix, published Nov. 2018, retrieved Jan. 2, 2023 from https://docs.delphix.com/docs531/files/98113199/98116076/2/1542301179433/User Guide.pdf.

Delphix Corp., "Delphix Engine User Guide," Delphix, published Oct. 2017, retrieved Jan. 2, 2023 from https://docs.delphix.com/docs-old/files/74711255/74715951/5/1509647013871/Delphix Engine User Guide.pdf.

Delphix Corp., "FAQ: SnapShot and SnapSync (KBA1014)," Delphix, published March, 4 2022, retrieved Jan. 2, 2023 from https://support.delphix.com/Continuous_Data_Engine_(formerly_Virtualization_Engine)/Delphix_Admin/FAQ%3A_SnapShot_and_SnapSync_(KBA1014).

Delphix Corp., "Linking to a Database," Database Linking Overview, published Dec. 2017, retrieved on Jan. 2, 2023 from https://docs.delphix.com/docs52/introduction/database-virtualization-with-delphix/database-linking-overview.

Delphix Corp., "Understanding Timelines," Understanding Timelines and How to Preserve Data in a Point in Time, published Jun. 2018, retrieved Jan. 2, 2023 from https://docs.delphix.com/docs526/delphix-self-service/delphix-self-service-data-user-guide/understanding-timelines-and-how-to-preserve-data-in-a-point-in-time.

Delphix Corp., "What Does the Delphix Engine Do?," Delphix Engine Overview, published Dec. 2017, retrieved on Jan. 2, 2023 from https://docs.delphix.com/docs52/introduction/database-virtualization-with-delphix/delphix-engine-overview.

Delphix Corp., "What's New Guide for 5.2," Delphix, published Dec. 2017, retrieved on Jan. 2, 2023 from https://docs.delphix.com/docs52/files/83053093/83056028/2/1513184739765/What%27s New Guide for 5.2.pdf.

Murugan, Palani, "Delphix Dynamic Data Platform on VMware vSAN," VMware Virtual Blocks Blog, published Nov. 20, 2017, retrieved on Jan. 2, 2023 from https://blogs.vmware.com/virtualblocks/2017/11/20/delphix-vsan/.

Rubrik, "Exploring the Depth of Simplicity: Protecting Microsoft SQL Server with Rubrik," Technical White Paper, published Mar. 2017, retrieved on Jan. 2, 2023 from https://www.rubrik.com/content/dam/rubrik/en/resources/white-paper/Protecting-Microsoft-SQLServer-with-Rubrik.pdf.

Rubrik, "Hyperconverged Infrastructure with the Simplest Data Protection," published Jan. 2016, retrieved on Jan. 2, 2023 from https://web.archive.org/web/20210117100439/https://www.rubrik.com/wp-content/uploads/2015/12/Joint-Solution-Brief-Nutanix-and-Rubrik.pdf.

YouTube Video screenshots for Delphix Corp., "How To Create Database Copies with Delphix," YouTube, Apr. 3, 2018, https://www.youtube.com/watch?v=1EjR-k4EJ68 [youtube.com].

YouTube Video screenshots for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].

AWS. "Amazon DocumentDB elastic clusters: how it works" Amazon DocumentDB. Retrieved from https://docs.aws.amazon.com/documentdb/latest/developerguide/elastic-how-it-works.html (accessed Apr. 6, 2023).

AWS. "Amazon EC2 M5 Instances" Amazon DocumentDB. Amazon EC2. Retrieved from https://aws.amazon.com/ec2/instance-types/m5/ (accessed Apr. 6, 2023).

AWS. "Amazon ECS clusters" Amazon Elastic Container Service. Retrieved from https://docs.aws.amazon.com/AmazonECS/latest/developerguide/clusters.html (accessed Apr. 6, 2023).

AWS. "Amazon Virtual Private Cloud" User Guide. Retrieved from https://docs.aws.amazon.com/pdfs/vpc/latest/userguide/vpc-ug.pdf#what-is-amazon-vpc (accessed Apr. 6, 2023).

AWS. "AWS glossary" AWS General Reference Guide. Retrieved from https://docs.aws.amazon.com/general/latest/gr/glos-chap.html (accessed Apr. 6, 2023).

AWS. "Copy a snapshot" Amazon Elastic Compute Cloud. Retrieved from https://docs.aws.amazon.com/AWSEC2/latest/UserGuide/ebs-copy-snapshot.html#ebs-snapshot-copy (accessed Apr. 6, 2023).

AWS. "CopySnapshot" Amazon Elastic Compute Cloud. Retrieved from https://docs.aws.amazon.com/AWSEC2/latest/APIReference/API_CopySnapshot.html (accessed Apr. 6, 2023).

AWS. "CreateDBInstanceReadReplica" Amazon Relational Database Service. Retrieved from https://docs.aws.amazon.com/AmazonRDS/latest/APIReference/API_CreateDBInstanceReadReplica.html (accessed Apr. 25, 2023).

AWS. "Introducing Five New Amazon EC2 Bare Metal Instances" Amazon Web Services. Feb. 13, 2019. Retrieved from https://aws.amazon.com/about-aws/whats-new/2019/02/introducing-five-new-amazon-ec2-bare-metal-instances/ (accessed Apr. 6, 2023).

AWS. "Kubernetes on AWS" Amazon Web Services. Retrieved from https://aws.amazon.com/kubernetes/#:~: text=Kubernetes%20manages%20clusters%20of%20Amazon,premises%20and%20in%20the%20cloud (accessed Apr. 6, 2023).

AWS. "Storage" Amazon Elastic Compute Cloud. Retrieved from https://docs.aws.amazon.com/AWSEC2/latest/WindowsGuide/Storage.html (accessed Apr. 6, 2023).

AWS. "Use EBS direct APIs to access the contents of an EBS snapshot" Amazon Elastic Compute Cloud. Retrieved from https://docs.aws.amazon.com/AWSEC2/latest/UserGuide/ebs-accessing-snapshot.html (accessed Apr. 6, 2023).

AWS. "User Guide for Linux Instances" Amazon Elastic Compute Cloud. 2023. Retrieved from https://docs.aws.amazon.com/pdfs/AWSEC2/latest/UserGuide/ec2-ug.pdf#ebs-accessing-snapshot (accessed Apr. 6, 2023).

AWS. "What Is An Instance In Cloud Computing?" Amazon Web Services. Retrieved from https://aws.amazon.com/what-is/cloud-instances/#:~: text=You%20can%20run%20multiple%20virtual,of%20sharing%20and%20scaling%20resources (accessed Apr. 6, 2023).

AWS. "Working with DB instance read replicas" Amazon Relational Database Service. Retrieved from https://docs.aws.amazon.com/AmazonRDS/latest/UserGuide/USER_ReadRepl.html (accessed Apr. 25, 2023).

AWS. "Working with read replicas for Microsoft SQL Server in Amazon RDS" Amazon Relational Database Service. Retrieved from https://docs.aws.amazon.com/AmazonRDS/latest/UserGuide/SQLServer.ReadReplicas.html (accessed Apr. 25, 2023).

Banthia, Bakul. "Can I share snapshots with specific users?" Tessell. Retrieved from https://help.tessell.com/en/articles/7118615-can-i-share-snapshots-with-specific-users (accessed Apr. 6, 2023).

Banthia, Bakul. "Do I need to enable snapshots for my database service or is it done automatically?" Tessell. Retrieved from https://

(56)                    References Cited

OTHER PUBLICATIONS help.tessell.com/en/articles/7118606-do-i-need-to-enable-snapshots-for-my-database-service-or-is-it-done-automatically (accessed Apr. 6, 2023).

Banthia, Bakul. "How can I perform cross-region snapshots and point-in-time-restore (PITR) for my disaster recovery needs?" Tessell. Retrieved from https://help.tessell.com/en/articles/6614103-how-can-i-perform-cross-region-snapshots-and-point-in-time-restore-pitr-for-my-disaster-recovery-needs (accessed Apr. 6, 2023).

Banthia, Bakul. "How do I provision a database service?" Tessell. Retrieved from https://help.tessell.com/en/articles/7118590-how-do-i-provision-a-database-service (accessed Apr. 6, 2023).

Banthia, Bakul. "How does billing work in Tessell?" Tessell. Retrieved from https://help.tessell.com/en/articles/6624926-how-does-billing-work-in-tessell (accessed Apr. 6, 2023).

Banthia, Bakul. "How does Tessell guarantee Zero Data Loss for Oracle?" Tessell. Retrieved from https://help.tessell.com/en/articles/7118627-how-does-tessell-guarantee-zero-data-loss-for-oracle (accessed Apr. 6, 2023).

Banthia, Bakul. "How does Tessell host Oracle databases on Azure?" Tessell. Retrieved from https://help.tessell.com/en/articles/7118621-how-does-tessell-host-oracle-databases-on-azure (accessed Apr. 6, 2023).

Banthia, Bakul. "Manage Data on Your Multi-tenant SaaS Environment with Tessell" Tessell. Feb. 25, 2023. Retrieved from https://tessell.com/blogs/manage-multi-tenant-saas-metadata (accessed May 9, 2023).

Banthia, Bakul. "Snapshots" Tessell. Retrieved from https://help.tessell.com/en/collections/3899147-snapshots (accessed Apr. 6, 2023).

Banthia, Bakul. "What are all the Apps in Tessell?" Tessell. Retrieved from https://help.tessell.com/en/articles/7118551-what-are-all-the-apps-in-tessell (accessed Apr. 6, 2023).

Banthia, Bakul. "What is an Availability Machine?" Tessell. Retrieved from https://help.tessell.com/en/articles/7118549-what-is-an-availability-machine (accessed Apr. 6, 2023).

Banthia, Bakul. "What is Tessell and how does it work?" Tessell. Retrieved from https://help.tessell.com/en/articles/7118534-what-is-tessell-and-how-does-it-work (accessed Apr. 6, 2023).

Banthia, Bakul. "What is Tessell's security posture?" Tessell. Retrieved from https://help.tessell.com/en/articles/6624923-what-is-tessell-s-security-posture (accessed Apr. 25, 2023).

Banthia, Bakul. "What is Tessell's unified data management?" Tessell. Retrieved from https://help.tessell.com/en/articles/6624933-what-is-tessell-s-unified-data-management (accessed Apr. 6, 2023).

Banthia, Bakul. "What is the patch set composition of DB engine version for Oracle?" Tessell. Retrieved from https://help.tessell.com/en/articles/6614079-what-is-the-patch-set-composition-of-db-engine-version-for-oracle (accessed Apr. 6, 2023).

Banthia, Bakul. "Where are my automated snapshots stored and how do I manage their retention?" Tessell. Retrieved from https://help.tessell.com/en/articles/7118607-where-are-my-automated-snapshots-stored-and-how-do-i-manage-their-retention (accessed Apr. 6, 2023).

Banthia, Bakul. "Where are the databases hosted in Tessell?" Tessell. Retrieved from https://help.tessell.com/en/articles/6624929-where-are-the-databases-hosted-in-tessell (accessed Apr. 6, 2023).

Banthia, Bakul. "Why choose Tessell for your startup?" Tessell. Mar. 24, 2023. Retrieved https://tessell.com/blogs/why-tessell-for-startups (accessed May 9, 2023).

Barr, Jeff. "Amazon EC2 Bare Metal Instances with Direct Access to Hardware" AWS News Blog. Nov. 28, 2017. Retrieved from https://aws.amazon.com/blogs/aws/new-amazon-ec2-bare-metal-instances-with-direct-access-to-hardware/ (accessed Apr. 6, 2023).

Barr, Jeff. "New—Cross-Account Copying of Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).

Featonby, Malcolm. "Amazon ECS availability best practices" Containers. Nov. 8, 2019. Retrieved from https://aws.amazon.com/blogs/containers/amazon-ecs-availability-best-practices/ (accessed Apr. 6, 2023).

Flexera. "How can I copy an EBS snapshot between different EC2 regions?" Flexera CMP Docs. Retrieved from https://docs.rightscale.com/faq/clouds/aws/How_can_I_copy_an_EBS_snapshot_between_different_EC2_regions.html (accessed Apr. 6, 2023).

Hashicorp Terraform. "tessell_dap (Data Source)" tessell. Retrieved from https://registry.terraform.io/providers/TessellDevelopment/tessell/latest/docs/data-sources/dap#nestedatt--target_cloud_locations (accessed Apr. 6, 2023).

Hashicorp Terraform. "tessell_database_backup (Resource)" tessell. Retrieved from https://registry.terraform.io/providers/TessellDevelopment/tessell/latest/docs/resources/database_backup (accessed Apr. 6, 2023).

Hashicorp Terraform. "tessell_db_service (Resource)" tessell. Retrieved from https://registry.terraform.io/providers/tessell-cloud/tessell/latest/docs/resources/db_service#snapshot_configuration (accessed Apr. 6, 2023).

Kaplan, Steve. "The Tessellator Crunches Cloud Costs" Tessellator Book 1. 2022. Retrieved from https://tessell.com/documents/Tessellator%20Book%201.pdf (accessed Apr. 6, 2023).

Kaplan, Steven. "Bringing the Art and Science of Tessellation to Data" Tessell. Feb. 20, 2023. Retrieved from https://tessell.com/blogs/tessellation-of-data (accessed May 9, 2023).

Kaplan, Steven. "The Tessell Alternative to Oracle Database Services for Microsoft Azure" Tessell. Feb. 15, 2023. Retrieved from https://tessell.com/blogs/the-tessell-alternative-to-oracle-dbaas-on-azure (accessed May 9, 2023).

Kaplan, Steven. "The Why and How of Cloud Databases . . . and how Tessell changes the game" Tessell. Jan. 24, 2023. Retrieved from https://tessell.com/blogs/the-why-and-how-of-cloud-databases (accessed May 9, 2023).

Khanuja, Kamaldeep. "Benchmark Tessell RDS PostgreSQL performance using PGIO (SLOB)" Tessell. Mar. 1, 2023. Retrieved from https://tessell.com/blogs/postgresql-benchmark (accessed May 9, 2023).

Khanuja, Kamaldeep. "Tessell supports AWS PrivateLink" Tessell. Jan. 11, 2023. Retrieved from https://tessell.com/blogs/aws-tessell-privatelink (accessed Apr. 25, 2023).

Khanuja, Kamaldeep. "Tessell supports AWS PrivateLink" Tessell. Jan. 11, 2023. Retrieved from https://tessell.com/blogs/aws-tessell-privatelink (accessed May 9, 2023).

Krishnia, Rajesh. "Fully Managed Oracle Database Service on Azure with Tessell" Tessell. Mar. 5, 2023. Retrieved from https://tessell.com/blogs/azure-tessell-oracle-dbaas (accessed May 9, 2023).

Kuchibhotla, Bala. "Tessell's journey: How and why it all started?" Tessell. Mar. 24, 2023. Retrieved from https://tessell.com/blogs/why-tessell (accessed May 9, 2023).

Kuchibhotla, Bala. "Why choose Tessell for your enterprise?" Tessell. Mar. 24, 2023. Retrieved from https://tessell.com/blogs/why-tessell-for-enterprises (accessed May 9, 2023).

Kumar, Sandip. "Benchmark Tessell RDS Oracle performance using SLOB" Tessell. Apr. 13, 2023. Retrieved from https://tessell.com/blogs/oracle-benchmark (accessed May 9, 2023).

Microsoft. "Basic Always On availability groups for a single database" SQL Server. Mar. 3, 2023. Retrieved from https://learn.microsoft.com/en-us/sql/database-engine/availability-groups/windows/basic-availability-groups-always-on-availability-groups?view=sql-server-ver16 (accessed Apr. 25, 2023).

Microsoft. "What is BareMetal Infrastructure on Azure?" BareMetal Infrastructure. Apr. 10, 2023. Retrieved from https://learn.microsoft.com/en-us/azure/baremetal-infrastructure/concepts-baremetal-infrastructure-overview (accessed Apr. 20, 2023).

Mitchell, Cal. "Migrating On Prem SQL Server To Multi Cloud With Tessell" SQLpipe. Feb. 18, 2023. Retrieved from https://www.sqlpipe.com/blog/migrating-on-prem-sql-server-to-multi-cloud-with-tessell (accessed Apr. 6, 2023).

MP4 Video screenshots for Tessell. "Backups" Tessell. Retrieved from https://tessell.com/videos/Backups.mp4 (accessed Apr. 25, 2023).

(56) References Cited

OTHER PUBLICATIONS

MP4 Video screenshots for Tessell. "DataFlow" Tessell. Retrieved from https://tessell.com/videos/DataFlow.mp4 (accessed Apr. 25, 2023).

Nutanix Inc., "Prism 5.5, Prism Central Guide" (Jul. 7, 2020) pp. 1-618.

Nutanix, Inc. "Prism Central Guide", Acropolis 5.0, (Oct. 18, 2018), pp. 1-374.

Nutanix, Inc., "Acropolis Advance Administration Guide" Acropolis 5.0 Feb. 9, 2018, pp. 1-60.

Nutanix, Inc., "Acropolis Advanced Administration Guide" Acropolis 5.1, Jul. 11, 2018, pp. 1-63.

Nutanix, Inc., "Prism Central Guide", Acropolis 5.1, (Oct. 18, 2018), pp. 1-410.

Nutanix, Inc., "Prism Web Console Guide" Prism 5.8, (Mar. 19, 2019), pp. 1-808.

Parikh, Priyank. "Benchmark Tessell RDS MySQL performance using Sysbench" Tessell. Apr. 19, 2023. Retrieved from https://tessell.com/blogs/mysql-benchmark (accessed May 9, 2023).

Pillai, Animesh. "High-performance data infrastructure for the cloud era" Tessell. Retrieved from https://app.hubspot.com/documents/20843544/view/494538972?accessId=b713c0 (accessed Apr. 13, 2023).

PlanetScale. "PlanetScale is the world's most advanced serverless MySQL platform" PlanetScale. Retrieved from https://planetscale.com/ (accessed Apr. 6, 2023).

Polovyi, Ivan. "AWS ECS Cluster using the EC2 Launch Type" AWS in Plain English. Jul. 25, 2021. Retrieved from https://aws.plainenglish.io/aws-ecs-cluster-using-the-ec2-launch-type-cb5ae2347b46 (accessed Apr. 6, 2023).

Rawat, Maneesh. "Nitro Boost your PostgreSQL Workloads" PGConf India. Feb. 23, 2023. Retrieved from https://pgconf.in/conferences/pgconfin2023/program/proposals/356 (accessed Apr. 6, 2023).

Sandbu, Marius. "Tessell—A new way to provide DBaaS in Public Cloud" Marius Sandbu Tech Ramblings. Nov. 1, 2022. Retrieved from https://msandbu.org/tessell-a-new-way-to-provide-dbaas-in-public-cloud/ (accessed Apr. 6, 2023).

Singh, Deepak. "Cluster Management with Amazon ECS" AWS Compute Blog. Feb. 6, 2015. Retrieved from https://aws.amazon.com/blogs/compute/cluster-management-with-amazon-ecs/ (accessed Apr. 6, 2023).

Tahir, Saqlain. "Field Notes: SQL Server Deployment Options on AWS Using Amazon EC2" AWS Architecture Blog. Jun. 18, 2021. Retrieved from https://aws.amazon.com/blogs/architecture/field-notes-sql-server-deployment-options-on-aws-using-amazon-ec2/ (accessed Apr. 6, 2023).

Tessell. "Announcing SOC 2 Type I Certification for Tessell" Tessell. Mar. 31, 2023. Retrieved from https://tessell.com/blogs/tessell-soc2-type1 (accessed May 9, 2023).

Tessell. "Azure Tessell for Oracle" Microsoft. Retrieved from https://azuremarketplace.microsoft.com/en-us/marketplace/apps/tessellinc1655919615020.tessell_database_service?ocid=GTMRewards_WhatsNewBlog_healthcareazurecloudsecurityassessment_Vol160&tab=Overview (accessed Apr. 6, 2023).

Tessell. "Cloud Databases. Done Right. At Scale." Tessell. Retrieved from https://tessell.com/ (accessed Apr. 6, 2023).

Tessell. "Differentiated Infrastructure. Delightful Management." Tessell. Retrieved from https://query.prod.cms.rt.microsoft.com/cms/api/am/binary/RW13XNT (accessed Apr. 6, 2023).

Tessell. "It's official: Tessell's DBaaS is Co-Sell Ready with Microsoft Azure" Tessell. Mar. 10, 2023. Retrieved from https://tessell.com/blogs/azure-tessell-ip-co-sell (accessed May 9, 2023).

Tessell. "Migrating a #SQLServer #database to a multi-cloud environment poses many challenges." Twitter. Retrieved from https://twitter.com/tessell/status/1631039267672674304 (accessed Apr. 20, 2023).

Tessell. "Multi-AZ High Availability for Oracle Standard Edition 2" Tessell. Retrieved from https://query.prod.cms.rt.microsoft.com/cms/api/am/binary/RW10vv8 (accessed Apr. 13, 2023).

Tessell. "Multi-AZ High Availability for Oracle Standard Edition 2" Tessell. Retrieved from https://query.prod.cms.rt.microsoft.com/cms/api/am/binary/RW13XNV (accessed Apr. 6, 2023).

TESSELL. "Plans & Pricing" Tessell. Retrieved from https://tessell.com/pricing?show=service (accessed Apr. 6, 2023).

Tessell. "Pricing Guide" Tessell. Retrieved from https://tessell.com/pricing/guide?engine=PostgreSQL&cloud=AWS&workload=High Performance&deploymentOption=Professional&workflow=self (accessed Apr. 6, 2023).

Tessell. "Product Help, FAQs, Knowledge Base, and more . . . " Tessell. Retrieved from https://help.tessell.com/en/ (accessed Apr. 6, 2023).

Tessell. "Product Overview" AWS Marketplace. Retrieved from https://aws.amazon.com/marketplace/pp/prodview-h2caqujt4pp3q (accessed Apr. 6, 2023).

Tessell. "Tessell Blogs" Tessell. Retrieved from https://tessell.com/blogs (accessed May 9, 2023).

Tessell. "Tessell Database as a Service" AWS Marketplace. Retrieved from https://aws.amazon.com/marketplace/seller-profile?id=37c6e91e-5c34-43b2-b938-91ac9f9b9a73 (accessed Apr. 6, 2023).

Tessell. "Tessell for Enterprises" Tessell. Retrieved from https://tessell.com/platform/enterprises (accessed Apr. 6, 2023).

Tessell. "Tessell for MySQL" Tessell. Retrieved from https://tessell.com/services/mysql (accessed Apr. 6, 2023).

Tessell. "Tessell for Oracle" Tessell. Retrieved from https://tessell.com/services/oracle (accessed Apr. 6, 2023).

Tessell. "Tessell for PostgreSQL" Tessell. Retrieved from https://tessell.com/services/postgresql (accessed Apr. 6, 2023).

Tessell. "Tessell for SQL Server" Tessell. Retrieved from https://tessell.com/services/sqlserver (accessed Apr. 6, 2023).

Tessell. "Tessell for Startups" Tessell. Retrieved from https://tessell.com/platform/developers (accessed Apr. 6, 2023).

Tessell. "Tessell" Twitter. Retrieved from https://twitter.com/tessell (accessed Apr. 20, 2023).

Tessell. "Tessell" YouTube. Retrieved from https://www.youtube.com/channel/UCMSdbKchVXPIEreaRbW-fLw?app=desktop (accessed Apr. 6, 2023).

Tessell. "The Tessell platform provides unparalleled security for your data and users" Tessell Data Transform Enterprise. Retrieved from https://query.prod.cms.rt.microsoft.com/cms/api/am/binary/RE50pqt (accessed Apr. 13, 2023).

Tessell. "The Tessell platform provides unparalleled security for your data and users" Tessell. Retrieved from https://query.prod.cms.rt.microsoft.com/cms/api/am/binary/RW13XNU (accessed Apr. 6, 2023).

Tessell. "We take care of your data infrastructure and data management needs" Tessell. Retrieved from https://www.tessell.com/about-us (accessed Apr. 6, 2023).

Twitter Video screenshots for Tessell. "Tessell's delightful data management . . . " Twitter. Apr. 19, 2023. https://twitter.com/tessell/status/1648775051980816385 [twitter.com].

Vogels, Werner. "Under the Hood of Amazon EC2 Container Service" All Things Distributed. Jul. 20, 2015. Retrieved from https://www.allthingsdistributed.com/2015/07/under-the-hood-of-the-amazon-ec2-container-service.html (accessed Apr. 6, 2023).

YouTube Video screenshots for Amazon Web Services. "Amazon ECS: Core Concepts" YouTube. Aug. 31, 2017. https://www.youtube.com/watch?app=desktop&v=eq4wL2MiNqo&feature=youtu.be [youtube.com].

YouTube Video screenshots for Tessell. "Eliminate IOPS metering for your cloud data infrastructure" YouTube. Oct. 20, 2022. https://www.youtube.com/watch?v=Puk0fQ43PmA [youtube.com].

YouTube Video screenshots for Tessell. "Tessell DBaaS on your choice of cloud at your terms" YouTube. Sep. 14, 2022. https://www.youtube.com/watch?v=sfWo0KyT1Do [youtube.com].

YouTube Video screenshots for Tessell. "Tessell. Choice. Power to you." YouTube. Mar. 6, 2023. https://www.youtube.com/watch?v=4DduLUdikRY [youtube.com].

YouTube Video screenshots for Tessell. "Why Tessell?" YouTube. Jan. 15, 2023. https://www.youtube.com/watch?v=JSOPhTgwrXI [youtube.com].

Adobe. "Creating and configuring the database" Experience League. Dec. 2021. Retrieved from https://experienceleague.adobe.com/docs/

(56) References Cited

OTHER PUBLICATIONS campaign-classic/using/installing-campaign-classic/initial-configuration/ creating-and-configuring-the-database.html?lang=en (accessed Jul. 26, 2023).

Amudala, Rajasekhar. "Add Targets Manually on EM Cloud Control 13c" Oracle Dba—Tips and Techniques. Jul. 13, 2020. Retrieved from http://www.br8dba.com/add-targets-manually-on-em-cloud-control-13c/ (accessed Aug. 30, 2023).

AWS. "Amazon CloudFormation" Amazon CloudFormation. Oct. 25, 2021. Retrieved from https://web.archive.org/web/20211025042539/https://www.amazonaws.cn/en/cloudformation/ (accessed Sep. 14, 2023).

AWS. "Amazon EC2 M5 Instances" Amazon DocumentDB. Amazon EC2. Nov. 2017. Retrieved from https://aws.amazon.com/ec2/instance-types/m5/ (accessed Apr. 6, 2023).

AWS. "Amazon ECS clusters" Amazon Elastic Container Service. Dec. 2019. Retrieved from https://docs.aws.amazon.com/AmazonECS/latest/developerguide/clusters.html (accessed Apr. 6, 2023).

AWS. "Amazon Relational Database Service (RDS)" Amazon Relational Database Service. Dec. 24, 2017. Retrieved from https://web.archive.org/web/20171224182936/https:/aws.amazon.com/rds/#features (accessed Sep. 6, 2023).

AWS. "Amazon VPC FAQs" Amazon VPC. Dec. 14, 2021. Retrieved from https://aws.amazon.com/vpc/faqs/ (accessed Sep. 6, 2023).

AWS. "Announcing Amazon RDS Custom for Oracle" Amazon Relational Database Service. Oct. 26, 2021. Retrieved from https://aws.amazon.com/about-aws/whats-new/2021/10/amazon-rds-custom-oracle/ (accessed Aug. 30, 2023).

AWS. "AWS CloudFormation concepts" AWS CloudFormation. Oct. 22, 2021. Retrieved from https://docs.aws.amazon.com/AWSCloudFormation/latest/UserGuide/cfn-whatis-concepts.html (accessed Sep. 6, 2023).

AWS. "AWS glossary" AWS General Reference Guide. Jan. 2013. Retrieved from https://docs.aws.amazon.com/general/latest/gr/glos-chap.html (accessed Apr. 6, 2023).

AWS. "AWS Rule Functions" AWS CloudFormation. Sep. 24, 2021. Retrieved from https://web.archive.org/web/20210924041142/https:/docs.aws.amazon.com/AWSCloudFormation/latest/UserGuide/intrinsic-function-reference-rules.html (accessed Sep. 6, 2023).

AWS. "AWS::EC2::Subnet" AWS CloudFormation. Oct. 2021. Retrieved from https://docs.aws.amazon.com/AWSCloudFormation/latest/UserGuide/aws-resource-ec2-subnet.html (accessed Sep. 6, 2023).

AWS. "Configuring a DB instance for Amazon RDS Custom for Oracle" Amazon Relational Database Service. Dec. 3, 2021. Retrieved from https://docs.aws.amazon.com/AmazonRDS/latest/UserGuide/custom-creating.html (accessed Aug. 30, 2023).

AWS. "Copy a snapshot" Amazon Elastic Compute Cloud. Dec. 2012. Retrieved from https://docs.aws.amazon.com/AWSEC2/latest/UserGuide/ebs-copy-snapshot.html#ebs-snapshot-copy (accessed Apr. 6, 2023).

AWS. "CopySnapshot" Amazon Elastic Compute Cloud. Dec. 2014. Retrieved from https://docs.aws.amazon.com/AWSEC2/latest/APIReference/API_CopySnapshot.html (accessed Apr. 6, 2023).

AWS. "Create a custom Windows AMI" Amazon Elastic Compute Cloud. Jan. 15, 2013. Retrieved from https://docs.aws.amazon.com/AWSEC2/latest/WindowsGuide/Creating_EBSbacked_WinAMI.html (accessed Aug. 30, 2023).

AWS. "Create a DB instance" Amazon Relational Database Service. Jan. 2016. Retrieved from https://docs.aws.amazon.com/AmazonRDS/latest/UserGuide/CHAP_Tutorials.WebServerDB.CreateDBInstance.html (accessed Jul. 26, 2023).

AWS. "CreateDBInstanceReadReplica" Amazon Relational Database Service. Jan. 16, 2013. Retrieved from https://docs.aws.amazon.com/AmazonRDS/latest/APIReference/API_CreateDBInstanceReadReplica.html (accessed Apr. 25, 2023).

AWS. "Creating a MySQL DB Instance and Connecting to a Database on a MySQL DB Instance" Amazon Relational Database Service. Dec. 22, 2017. Retrieved from https://web.archive.org/web/20171222204154/https:/docs.aws.amazon.com/AmazonRDS/latest/UserGuide/CHAP_GettingStarted.CreatingConnecting.MySQL.html (accessed Sep. 6, 2023).

AWS. "Creating an Amazon RDS DB instance" Amazon Relational Database Service. 2020. Retrieved from https://docs.aws.amazon.com/AmazonRDS/latest/UserGuide/USER_CreateDBInstance.html (accessed Jul. 26, 2023).

AWS. "Creating an Amazon RDS DB instance" Amazon Relational Database Service. May 13, 2020. Retrieved from https://docs.aws.amazon.com/AmazonRDS/latest/UserGuide/USER_CreateDBInstance.html#USER_CreateDBInstance.Settings (accessed Aug. 30, 2023).

AWS. "Creating and connecting to a MySQL DB instance" Amazon Relational Database Service. May 2014. Retrieved from https://docs.aws.amazon.com/AmazonRDS/latest/UserGuide/CHAP_GettingStarted.CreatingConnecting.MySQL.html (accessed Jul. 26, 2023).

AWS. "Creating and connecting to an Oracle DB instance" Amazon Relational Database Service. Jun. 6, 2014. Retrieved from https://docs.aws.amazon.com/AmazonRDS/latest/UserGuide/CHAP_GettingStarted.CreatingConnecting.Oracle.html (accessed Aug. 30, 2023).

AWS. "How Amazon VPC works" Amazon VPC. Oct. 26, 2021. Retrieved from https://docs.aws.amazon.com/vpc/latest/userguide/how-it-works.html (accessed Sep. 6, 2023).

AWS. "Introducing Five New Amazon EC2 Bare Metal Instances" Amazon Web Services. Feb. 13, 2019. Feb. 2019. Retrieved from https://aws.amazon.com/about-aws/whats-new/2019/02/introducing-five-new-amazon-ec2-bare-metal-instances/ (accessed Apr. 6, 2023).

AWS. "Kubernetes on AWS" Amazon Web Services. Jun. 2018. Retrieved from https://aws.amazon.com/kubernetes/#:~:text=Kubernetes%20manages%20clusters%20of%20Amazon,premises%20and%20in%20the%20cloud (accessed Apr. 6, 2023).

AWS. "Maintaining a DB instance" Amazon Relational Database Service. Sep. 5, 2015. Retrieved from https://docs.aws.amazon.com/AmazonRDS/latest/UserGuide/USER_UpgradeDBInstance.Maintenance.html#OS_Updates (accessed Aug. 30, 2023).

AWS. "Regions and Availability Zones" About AWS. Apr. 2019. Retrieved from https://aws.amazon.com/about-aws/global-infrastructure/regions_az/?p=ngi&loc=2 (accessed Jul. 26, 2023).

AWS. "Regions and Availability Zones" Amazon Relational Database Service. Dec. 22, 2017. Retrieved from https://web.archive.org/web/20171222195304/http:/docs.aws.amazon.com/AmazonRDS/latest/UserGuide/Concepts.RegionsAndAvailabilityZones.html (accessed Sep. 6, 2023).

AWS. "Rules" AWS CloudFormation. Feb. 9, 2021. Retrieved from https://docs.aws.amazon.com/AWSCloudFormation/latest/UserGuide/Welcome.html (accessed Sep. 6, 2023).

AWS. "Storage" Amazon Elastic Compute Cloud. Sep. 14, 2014. Retrieved from https://docs.aws.amazon.com/AWSEC2/latest/WindowsGuide/Storage.html (accessed Apr. 6, 2023).

AWS. "Use EBS direct APIs to access the contents of an EBS snapshot" Amazon Elastic Compute Cloud. Apr. 27, 2020. Retrieved from https://docs.aws.amazon.com/AWSEC2/latest/UserGuide/ebs-accessing-snapshot.html (accessed Apr. 6, 2023).

AWS. "What is AWS CloudFormation?" AWS CloudFormation. Feb. 18, 2020. Retrieved from https://docs.aws.amazon.com/AWSCloudFormation/latest/UserGuide/Welcome.html (accessed Sep. 6, 2023).

AWS. "Working with Amazon RDS Custom" Amazon Relational Database Service. Nov. 27, 2021. Retrieved from https://docs.aws.amazon.com/AmazonRDS/latest/UserGuide/rds-custom.html (accessed Aug. 30, 2023).

AWS. "Working with custom engine versions for Amazon RDS Custom for Oracle" Amazon Relational Database Service. Dec. 3, 2021. Retrieved from https://docs.aws.amazon.com/AmazonRDS/latest/UserGuide/custom-cev.html (accessed Aug. 30, 2023).

AWS. "Working with DB instance read replicas" Amazon Relational Database Service. Jan. 18, 2013. Retrieved from https://docs.aws.amazon.com/AmazonRDS/latest/UserGuide/USER_ReadRepl.html (accessed Apr. 25, 2023).

AWS. "Working with read replicas for Microsoft SQL Server in Amazon RDS" Amazon Relational Database Service. Nov. 30,

(56)　　　　　References Cited

OTHER PUBLICATIONS

2020. Retrieved from https://docs.aws.amazon.com/AmazonRDS/latest/UserGuide/SQLServer.ReadReplicas.html (accessed Apr. 25, 2023).

Bhrara, Raminder. "Oracle Cloud Infrastructure OCI Gen-2 Cloud Security—Part II (Identity and Access Management)" RedThunder. Blog. Dec. 31, 2018. Retrieved from https://redthunder.blog/2018/12/31/oracle-cloud-infrastructure-oci-gen-2-cloud-security-part-ii-identity-and-access-management/ (accessed Sep. 14, 2023).

Bugsnag. "Install using CloudFormation" SmartBear BugSnag Docs. Jul. 28, 2021. Retrieved from https://web.archive.org/web/20210728140402/https://docs.bugsnag.com/on-premise/clustered/cloudformation-installation/ (accessed Sep. 14, 2023).

CloudThat. "Virtualization in Amazon Web Services" CloudThat. Oct. 16, 2014. Retrieved from https://www.cloudthat.com/resources/blog/virtualization-in-amazon-web-services (accessed Aug. 30, 2023).

Commvault. "Adding a Database Group for Alibaba Cloud ApsaraDB RDS for MySQL" Essential. Sep. 22, 2020. Retrieved from https://documentation.commvault.com/v11/essential/122970_adding_database_group_for_alibaba_cloud_apsaradb_rds_for_mysql.html (accessed Aug. 30, 2023).

Commvault. "Creating a Server Backup Plan" Essential. Nov. 6, 2020. Retrieved from https://documentation.commvault.com/v11/essential/130962_creating_server_backup_plan.html (accessed Aug. 30, 2023).

Commvault. "Creating a Server Plan" Essential. Oct. 27, 2021. Retrieved from https://documentation.commvault.com/2023e/essential/86648_creating_server_plan.html (accessed Aug. 30, 2023).

Commvault. "Restoring a Database Group for Alibaba Cloud ApsaraDB RDS for MySQL" Essential. Feb. 18, 2021. Retrieved from https://documentation.commvault.com/2023e/essential/122176_restoring_database_group_for_alibaba_cloud_apsaradb_rds_for_mysql.html (accessed Aug. 30, 2023).

dbInsight. "Turn your Database into a Service " A dbInsight white paper for Nutanix. Feb. 2020. Retrieved from https://nutanix.com/content/dam/nutanix/resources/white-papers/wp-turn-your-database-into-a-service.pdf (accessed Jul. 26, 2023).

Donchovski, Igor. "Maintenance for MongoDB Replica Sets" SlideShare. Oct. 2, 2019. Retrieved from https://www.slideshare.net/IgorLE/maintenance-for-mongodb-replica-sets (accessed Aug. 30, 2023).

Duvuri, Aditya. "Policies in Oracle Cloud Infrastructure (OCI) Data Integration" Oracle Cloud Infrastructure Blog. Aug. 17, 2020. Retrieved from https://blogs.oracle.com/dataintegration/post/policies-in-oracle-cloud-infrastructure-oci-data-integration (accessed Sep. 14, 2023).

Erwin, Danyelle. "What's New in SAP HANA Cockpit 2.0 SP 12" SAP Community. Jun. 22, 2020. Retrieved from https://blogs.sap.com/2020/06/22/whats-new-in-sap-hana-cockpit-2.0-sp-12/ (accessed Aug. 30, 2023).

Flexera. "How can I copy an EBS snapshot between different EC2 regions?" Flexera CMP Docs. Dec. 19, 2015. Retrieved from https://docs.rightscale.com/faq/clouds/aws/How_can_I_copy_an_EBS_snapshot_between_different_EC2_regions.html (accessed Apr. 6, 2023).

Google Cloud. "Configurations Overview" Cloud Deployment Manager. Oct. 16, 2021. Retrieved from https://web.archive.org/web/20211016075925/https:/cloud.google.com/deployment-manager/docs/configuration/ (accessed Sep. 6, 2023).

Google Cloud. "Creating Instances" Database Products. Sep. 18, 2018. Retrieved from https://web.archive.org/web/20180918103721/https:/cloud.google.com/sql/docs/mysql/create-instance (accessed Sep. 6, 2023).

Google Cloud. "Deployment Manager Fundamentals" Cloud Deployment Manager. Feb. 27, 2021. Retrieved from https://web.archive.org/web/20210227173536/https:/cloud.google.com/deployment-manager/docs/fundamentals (accessed Sep. 6, 2023).

Google Cloud. "Google Cloud Deployment Manager Documentation" Cloud Deployment Manager. Dec. 14, 2021. Retrieved from https://web.archive.org/web/20211214023957/https://cloud.google.com/deployment-manager/docs (accessed Sep. 14, 2023).

Google Cloud. "Rest Resource: networks" Compute Engine. Nov. 5, 2021. Retrieved from https://cloud.google.com/compute/docs/reference/rest/beta/networks (accessed Sep. 6, 2023).

Google Cloud. "Rest Resource: subnetworks" Compute Engine. Jul. 1, 2019. Retrieved from https://cloud.google.com/compute/docs/reference/rest/beta/subnetworks (accessed Sep. 6, 2023).

Google Cloud. "Supported resource types" Cloud Deployment Manager. Sep. 16, 2021. Retrieved from https://web.archive.org/web/20210916123002/https:/cloud.google.com/deployment-manager/docs/configuration/supported-resource-types (accessed Sep. 6, 2023).

Google Cloud. "VPC networks" Virtual Private Cloud. Oct. 29, 2021. Retrieved from https://cloud.google.com/vpc/docs/vpc (accessed Sep. 6, 2023).

Google. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 2023).

Havewala, Porus. "Back Up a Thousand Databases Using Enterprise Manager Cloud Control 12c" Technical Article. Jan. 2014. Retrieved from https://www.oracle.com/technical-resources/articles/enterprise-manager/havewala-rman-em12c.html (accessed Aug. 30, 2023).

Hinker, Stefan. "A Patch Train Solution for OCI OS Management" A-Team Chronicles. Jul. 17, 2020. Retrieved from https://www.ateam-oracle.com/post/a-patch-train-solution-for-oci-os- management (accessed Aug. 30, 2023).

Jain, Viral. "How To Create SQL Database In AWS" C-Sharp Corner. May 4, 2018. Retrieved from https://www.c-sharpcorner.com/article/how-to-create-sql-database-in-aws/ (accessed Jul. 26, 2023).

Launier, Jeremy et al. "Introducing A New Era in Database Management" Nutanix. Oct. 6, 2020. Retrieved from https://www.nutanix.com/blog/introducing-new-era-in-database-management (accessed Jul. 26, 2023).

Mathew, Prince. "Custom Database Software Images now available on Gen2 Exadata Cloud@Customer" Oracle Database Insider. Jun. 10, 2021. Retrieved from https://blogs.oracle.com/database/post/custom-database-software-images-now-available-on-gen2-exadata-cloudcustomer (accessed Aug. 30, 2023).

Matijaca, Ante, "Dashboard" Dribbble, published Dec. 21, 2015, retrieved Feb. 11, 2022 from <https://dribbble.com/shots/2417233-Dashboard> (Year: 2015).

Melo, Gilson. "Overview of the Interconnect Between Oracle and Microsoft" Oracle Cloud Infrastructure Blog. Jun. 5, 2019. Retrieved from https://blogs.oracle.com/cloud-infrastructure/post/overview-of-the-interconnect-between-oracle-and-microsoft (accessed Sep. 14, 2023).

MongoDB. "mongo Shell Methods" Reference. Aug. 2019. Retrieved from https://www.mongodb.com/docs/v4.2/reference/method/ (accessed Aug. 30, 2023).

MongoDB. "mongodb" GitHub. Mar. 2015. Retrieved from https://github.com/mongodb/docs/blob/v4.2/source/core/replica-set-priority-0-member.txt (accessed Aug. 30, 2023).

MongoDB. "Priority 0 Replica Set Members" MongoDB Manual. Aug. 2019. Retrieved from https://www.mongodb.com/docs/manual/core/replica-set-priority-0-member/ (accessed Aug. 30, 2023).

MongoDB. "Replica Set Elections" MongoDB Manual. Aug. 2019. Retrieved from https://www.mongodb.com/docs/manual/core/replica-set-elections/ (accessed Aug. 30, 2023).

MongoDB. "Replica Set Members" Replication. Aug. 2019. Retrieved from https://www.mongodb.com/docs/v4.2/core/replica-set-members/#replica-set-secondary-members (accessed Aug. 30, 2023).

MongoDB. "The mongo Shell" MongoDB. Aug. 2019. Retrieved from https://www.mongodb.com/docs/v4.2/mongo/ (accessed Aug. 30, 2023).

MongoDB. "Troubleshoot Replica Sets" MongoDB Manual. Aug. 2019. Retrieved from https://www.mongodb.com/docs/manual/tutorial/troubleshoot-replica-sets/ (accessed Aug. 30, 2023).

MongoDB. "Upgrade a Replica Set to 4.2" Replication. Aug. 2019. Retrieved from https://www.mongodb.com/docs/v4.2/release-notes/4.2-upgrade-replica-set/ (accessed Aug. 30, 2023).

(56)        References Cited

OTHER PUBLICATIONS

MySQL. "Creating a MySQL Server Deployment" Documentation. Mar. 13, 2017. Retrieved from https://web.archive.org/web/20170313043247/http://docs.oracle.com/cloud/latest/mysql-cloud/UOMCS/GUID-D03FE523-AD8D-4C53-935C-D5D6513D2A24.htm#GUID-D03FE523-AD8D-4C53-935C-D5D6513D2A24 (accessed Sep. 6, 2023).

Non-Final Office Action on U.S. Appl. No. 17/694,964 Dtd Aug. 9, 2023.

Non-Final Office Action on U.S. Appl. No. 17/951,632 Dtd Sep. 14, 2023.

Nutanix. "Multi-Cluster Management" Nutanix Support and Insights. Oct. 2020. Retrieved from https://portal.nutanix.com/page/documents/details?targetId=Nutanix-Era-User-Guide-v2_0:era-era-multicluster-management-c.html (accessed Jul. 26, 2023).

Nutanix. "Nutanix Calm Overview" Nutanix Support and Insights. Jul. 2021. Retrieved from https://portal.nutanix.com/page/documents/solutions/details?targetId=RA-2093-Nutanix-Calm:top-nutanix-calm-overview.html (accessed Jul. 26, 2023).

Nutanix. "Provisioning a MongoDB Replica Set" Nutanix Support and Insights. Sep. 2021. Retrieved from https://portal.nutanix.com/page/documents/details?targetId=Nutanix-Era-User-Guide-v2_3:top-era-provision-mongodb-replica-t.html (accessed Jul. 26, 2023).

Nutanix. "Provisioning a PostgreSQL Instance" Nutanix Support and Insights. Jan. 2021. Retrieved from https://portal.nutanix.com/page/documents/details?targetId=Nutanix-Era-User-Guide-v2_3:top-era-provisioning-a-postgresql-database-t.html (accessed Jul. 26, 2023).

Oracle, "Webinar: Automate your database provisioning to increase efficiency and standardization" (published Jul. 14, 2020) Oracle Youtube, from https://www.youtube.com/watch?v=nUMdekXyqr4 (accessed Jun. 28, 2021).

Oracle. "About Managed Targets" Enterprise Manager Cloud Control Extensibility Programmer's Guide. May 2014. Retrieved from https://docs.oracle.com/cd/E24628_01/doc.121/e25159/managed_targets.htm#EMPRG140 (accessed Aug. 30, 2023).

Oracle. "Accessing Object Storage Resources Across Tenancies" Oracle Cloud Infrastructure Documentation. Sep. 21, 2021. Retrieved from https://web.archive.org/web/20210921123150/https://docs.oracle.com/en-us/iaas/Content/Object/Concepts/accessingresourcesacrosstenancies.htm (accessed Sep. 14, 2023).

Oracle. "Managing Groups" Enterprise Manager Cloud Control Administrator's Guide. Feb. 2016. Retrieved from https://docs.oracle.com/cd/E24628_01/doc.121/e24473/group_management.htm#EMADM9216 (accessed Aug. 30, 2023).

Oracle. "Managing Software Sources" Oracle Cloud Infrastructure Documentation. Sep. 17, 2021. Retrieved from https://docs.oracle.com/en-us/iaas/os-management/osms/osms- software-sources.htm (accessed Aug. 30, 2023).

Oracle. "Securing Object Storage" Oracle Cloud Infrastructure Documentation. Apr. 2021. Retrieved from https://docs.public.oneportal.content.oci.oraclecloud.com/en-us/iaas/Content/Security/Reference/objectstorage_security.htm (accessed Sep. 14, 2023).

Oracle. "Update Your Database Homes and Grid Infrastructure Via the OCI Web Console on the Exadata Cloud Service" Oracle Database Insider. May 2, 2020. Retrieved from https://blogs.oracle.com/database/post/update-your-database-homes-and-grid-infrastructure-via-the-oci-web-console-on-the-exadata-cloud-service (accessed Aug. 30, 2023).

Oracle. "User Guide" Oracle Cloud Infrastructure. Nov. 26, 2019. Retrieved from https://docs.oracle.com/cd/E97706_01/pdf/ug/OCI_User_Guide.pdf (accessed Aug. 30, 2023).

Oracle. "Using DBMS_Rolling to Perform a Rolling Upgrade" Concepts and Administration. Sep. 2020. Retrieved from https://docs.oracle.com/en/database/oracle/oracle- database/19/sbydb/using-DBMS_ROLLING-to-perform-rolling-upgrade.html#GUID-70C09F5B-90BE-4C8C-96A5-45A52E05D380 (accessed Aug. 30, 2023).

Oracle. "Using Pre-Authenticated Requests" Oracle Cloud Infrastructure Documentation. Apr. 2021. Retrieved from https://docs.public.oneportal.content.oci.oraclecloud.com/en-us/iaas/Content/Object/Tasks/usingpreauthenticatedrequests.htm#Using_PreAuthenticated_Requests (accessed Sep. 14, 2023).

Pederson, Jenna. "Provisioning an RDS Database With Cloudformation (Part 2)" Jenna Pederson. Jun. 28, 2021. Retrieved from https://jennapederson.com/blog/2021/6/28/provisioning-an-rds-database-with-cloudformation-part-2/ (accessed Sep. 6, 2023).

Quest. "Creating custom User-defined Database Groups" Support. Aug. 16, 2017. Retrieved from https://support.quest.com/kb/4229519/creating-custom-user-defined-database-groups (accessed Aug. 30, 2023).

Reinero, Bryan. "Your Ultimate Guide to Rolling Upgrades" MongoDB. May 1, 2018. Retrieved from https://www.mongodb.com/blog/post/your-ultimate-guide-to-rolling-upgrades (accessed Aug. 30, 2023).

Sereno Cloud Solution. "Nutanix 1 Click Database Service by ERA" Medium Enterprise Clouds. Jan. 2021. Retrieved from https://www.serenoclouds.com/medium-enterprise-clouds/private-hybrid-clouds/nutanix-enterprise-cloud-solution/nutanix-1-click-database-service-by-era/ (accessed Jul. 26, 2023).

Shah, Manish. "Gen 2 Exadata Cloud at Customer New Features: Shared ORACLE_HOME" Exadata Database Machine. Jun. 2, 2020. Retrieved from https://blogs.oracle.com/exadata/post/gen-2-exadata-cloud-at-customer-new-features-shared-oracle-home (accessed Aug. 30, 2023).

Sharma, Madhurkant. "Cloud Computing Platforms and Technologies" Geeks for Geeks. Sep. 8, 2018. Retrieved from https://www.geeksforgeeks.org/cloud-computing-platforms-and-technologies/ (accessed Jul. 26, 2023).

Steven Tom, Idaho National Laboratory, "Recommended Practice for Patch Management of Control Systems", Dec. 2008, Cybersecurity Infrastructure Security Agency (CISA), U.S. Department of Homeland Security. (Year: 2008).

Tudip Digital. "What is Deployment Manager?" Tudip. Jun. 24, 2019. Retrieved from https://tudip.com/blog-post/what-is-deployment-manager/ (accessed Sep. 6, 2023).

Westermann, Daniel. "pg_auto_failover: Failover and switchover scenarios" Application Integration & Middleware. Nov. 11, 2020. Retrieved from https://www.dbi-services.com/blog/pg_auto_failover-failover-and-switchover-scenarios/ (accessed Jul. 26, 2023).

Wong, Julie. "OS Management with Oracle Cloud Infrastructure" Oracle Cloud Infrastructure Blog. Mar. 11, 2020. Retrieved from https://blogs.oracle.com/cloud-infrastructure/post/os- management-with-oracle-cloud-infrastructure (accessed Aug. 30, 2023).

YouTube Video screenshots for "Nutanix Era .NEXT 2019 Demo," YouTube, May 10, 2019, https://www.youtube.com/watch?v=8hbpfrOSwOU [youtube.com].

YouTube Video screenshots for Alibaba Cloud. "How-to | Launch a MySQL Instance on Alibaba Cloud ApsaraDB for Relational Database Service" YouTube. Feb. 27, 2017. https://youtu.be/E5wGoIVFBuU [youtube.com].

YouTube Video screenshots for Alibaba Cloud. "How-to | Set Up a Multi tier WordPress Site on Alibaba Cloud" YouTube. Jun. 25, 2018. https://youtu.be/yWXhibylW6M [youtube.com].

YouTube Video screenshots for AOS Note. "How to Create an RDS Database Using CloudFormation" YouTube. Feb. 17, 2021. https://youtu.be/h73xPAwffec [youtube.com].

YouTube Video screenshots for Cloud Advocate. "Google Cloud Deployment Manager—Getting Started" YouTube. Aug. 28, 2020. https://youtu.be/qVKp7W1bfrE [youtube.com].

YouTube Video screenshots for Nutanix University. "How To Provision a PostgreSQL cluster using Nutanix Era | Nutanix University" YouTube. Aug. 8, 2019. https://youtube.com/watch?v=FoDGtORWNnU [youtube.com].

YouTube Video screenshots for Nutanix University. "Multicloud Database Provisioning with Nutanix Era Part 1 | Tech Bytes | Nutanix University" YouTube. Oct. 28, 2021. https://youtu.be/q3KOcdyM7PY [youtube.com].

YouTube Video screenshots for Nutanix University. "Nutanix Era: Provision a database from a backup file | Nutanix University" YouTube. Jul. 1, 2021. https://youtu.be/SfpGqaqXsbo [youtube.com].

(56) References Cited

OTHER PUBLICATIONS

YouTube Video screenshots for Nutanix. "Zero Byte Clone Data Management | Build it Better: DBaaS with Nutanix Era | Part 2%" YouTube. Mar. 17, 2021. https://youtube.com/watch?v=XIGtTA2dM80 [youtube.com].

Yun, Channy. "Amazon RDS Custom for Oracle—New Control Capabilities in Database Environment" AWS News Blog. Oct. 26, 2021. Retrieved from https://aws.amazon.com/blogs/aws/amazon-rds-custom-for-oracle-new-control-capabilities-in-database-environment/ (accessed Aug. 30, 2023).

Zhou, Siyuan, et al. "Fault-Tolerant Replication with Pull-Based Consensus in MongoDB" Usenix. Mar. 10, 2021. Retrieved from https://www.usenix.org/system/files/nsdi21-zhou.pdf (accessed Aug. 30, 2023).

Actifio Enablement Team, "https://www.youtube.com/watch?v=7mCcJTXxFM3l", "Oracle Advanced Data Protection and Work-flows", May 15, 2018 ) (Year: 2018).

Final Office Action on U.S. Appl. No. 16/234,547 Dtd May 11, 2023.

Final Office Action on U.S. Appl. No. 16/805,581 Dtd Jul. 6, 2022.

Non-Final Office Action on U.S. Appl. No. 16/805,581 Dtd Jan. 14, 2022.

Non-Final Office Action on U.S. Appl. No. 16/805,581 Dtd Oct. 12, 2022.

Non-Final Office Action on U.S. Appl. No. 17/337,197 Dtd Jun. 6, 2023.

"About Snapshots and Clones", Administering Oracle Java Cloud Service, https://docs.oracle.com/en/cloud/paas/java-cloud/jscag/snapshots-and-clones1.html#GUID-28871F48-A458-41C1-86F8-566ED842C3D5.

"Cloning a volume for an Amazon Aurora DB cluster", https://docs.aws.amazon.com/AmazonRDS/latest/AuroraUserGuide/Aurora.Managing.Clone.html.

"Dell PS Series Snapshots and Clones: Best Practices and Sizing Guidelines", Dell Storage Engineering, Nov. 2019, https://dl.dell.com/manuals/common/ps-series-snapshots-clones- bp1027_en-us.pdf.

"Enterprise Manager Cloud Administration Guide", Oracle Help Center, 2024, https://docs.oracle.com/cd/E24628_01/doc.121/e28814/cloud_db_clonesnap.htm#CEGCJCBC.

"Protecting Microsoft SQL Server with Rubrik", Rubrik Technical Marketing, Sep. 2023, https://www.rubrik.com/content/dam/rubrik/en/resources/white-paper/rwp-protecting-microsoft-sql-server-with-rubrik.pdf.

Maruthachalam, et al., "A Distributed System Design for Next Generation Storage and Remote Replication", 2014, https://ieeexplore.ieee.org/abstract/document/6814686.

Google, Creating Instances, Cloud SQL for MySQL, pp. 1-5.

Taking a Backup Using Snapshots, LVM Howto, Chapter 13 Recipes.

Affidavit of Nathaniel E Frank-White, Aug. 10, 2024.

Expedia, Preferred Class Drop Down, www.expedia.com/.

Foreign Action other than Search Report on PCT Dtd Jan. 2, 2025.

McGraw-Hill Dictionary of Scientific and Technical Terms, recoil milking—recovery system, pp. 4, 6th edition.

MySQL, "Supported Platforms: MySQL Database", https://web.archive.org/web/20181106221826/https://www.mysql.com/support/supportedplatforms/database.html.

New Oxford American Dictionary, Third Edition, "authorized—avail", 4 pages, 2010.

*Nutanix* v. *Tessell*, "Civil Docket for Case 3:24-cv-01729-AMO".

*Nutanix* v. *Tessell*, "Order Setting initial Case Management Conference and ADR Deadlines" Northern District of California, Mar. 20, 2024.

*Tessell* v. *Nutanix* IPR Power of Attorney.

*Tessell* v. *Nutanix*, IPR2025-00322, Dec. 18, 2024, pp. 7.

"Creating Instances," Google Cloud ("Google") (Wayback Machine Capture, Sep. 18, 2018), available at https://www.archive.org/web/20180918103721/https://cloud.google.com/sql/docs/mysql/create-instance.

"Nutanix Era: Databases Made Simple, " as archived by the Internet Archive on Sep. 26, 2020, available at http://web.archive.org/web/20200926222827/https://www.nutanix.com/blog/nutanix-era-databases-made-simple.

"Taking a Backup Using Snapshots" ("LVM-Howto") (Wayback Machine Capture, Jan. 20, 2007), available at https://web.archive.org/web/20070120200004/https://tldp.org/HOWTO/LVM-HOWTO/snapshots_backup.html.

"Windows Geo-Clustering: SQL Server, " published Oct. 12, 2014.

7 more ways to Query Always on Availability Groups, as archived by the Internet Archive on Mar. 30, 2019, available at https://web.archive.org/web/20190330182441/https://sqlundercover.com/2019/02/19/7-more-ways-to-query-always-on-availability-groups/.

Amazon Relational Database Service User Guide (2016) ("RDS ") (Wayback Machine Capture, Apr. 12, 2016), available at https://web.archive.org/web/20160412105355/http://docs.aws.amazon.com/AmazonRDS/latest/UserGuide/rds-ug.pdf.

BackupAssist, "https://secure.backupassist.com/support/en/backupassist/manage/calendar.htm" ; "https://secure.backupassist.com/ support/en/references/backup-schedules.htm", Jul. 1, 2017 (Year: 2017).

Federal Court Management Statistics–Profiles, U.S. District Courts–Combined Civil and Criminal (Dec. 2024).

Oracle, "https://web.archive.org/web/20170829005212/https://docs.oracle.com/cd/E24628_01lem.121/e27046/ cloning_database.htm#EMLCM93230", Aug. 29, 2017 (Year: 2017).

Order Granting Defendant's Motion to Compel Arbitration (staying the remaining claims) in *Nutanix, Inc.* v. *Tessell, Inc.*, Case No. 3:24-cv-01729 (N.D. Cal. Mar. 20, 2024).

SQL Server AlwaysOn Availability Group Backup Preference Setting, as archived by the Internet Archive on Sep. 25, 2020, available at https://www.mssqltips.com/sqlservertip/4976/sql-server-alwayson-availability-group-backup-preference-setting/.

The American Heritage Dictionary of the English Language (5th ed. 2011) ("Heritage").

Use the Availability Group Wizard (SQL Server Management Studio), as archived by the Interne Archive on Jan. 20, 2020, available at https://web.archive.org/web/20200120100053/https://docs.microsoft.com/en-us/sql/database-engine/availability-groups/windows/use-the-availability-group-wizard-sql-server-management-studio?view=sql-server-ver15.

Using Oracle Database Cloud Service –2013 Creating a Database Deployment (2017) ("Oracle") (Wayback Machine Capture, Jan. 18, 2017), available at https://web.archive.org/web/20170118071307/https://docs.oracle.com/en/cloud/paas/database-dbaascloud/csdbi/create-db-deployment.html.

Communication under Rule 71(3) EPC for EP application 23159241.1, Oct. 2, 2025.

"Recommended Practice for Patch Management of Control Systems", Steven Tom, Idaho National Laboratory, Dec. 2008, Cybersecurity Infrastructure Security Agency (CISA), US. Department of Homeland Security (Year: 2008).

High availability software—Wikipedia (Year: 2016).

Enterprise Manager Lifecycle Management Administrator's Guide, "14 Cloning Oracle Databases and Pluggable Databases", https://web.archive.org/web/20170829005212/https://docs.oracle.com/cd/E24628_01/em.121/e27046/cloning_database.htm#EMLCM93230, 2017, Oracle.

Oracle®, "Oracle® Enterprise Manager Cloud Administration Guide 120 Release 5 (12.1.0.5)E28814-19", Dec. 2015 (Year: 2015).

"Database Management Revolutionized by AI", OCI, https://www.oracle.com/artificial-intelligence/transform-database-management-with-ai/, Oct. 16, 2025.

"AI agents in Azure Cosmos DB", https://learn.microsoft.com/en-us/azure/cosmos-db/ai-agents, Mar. 9, 2025.

"MCP: Transform Database Admin Tasks with LLMs", https://builder.aws.com/content/2umKOtgxiPzrAf0RzQOdnFhGedg/mcp-transform-database-admin-tasks-with-llms, Jun. 8, 2025.

"Oracle Autonomous Database", White Paper Series, 13 pages, Sep. 2018.

"What are the future trends in DBMS technology? Advances in data and systems have led to the following advances in DBMS technology.", https://aws.amazon.com/what-is/dbms/, Oct. 16, 2025.

(56) References Cited

OTHER PUBLICATIONS

Garg, "Neon: The Serverless PostgreSQL Platform Built for AI Agents", Gocodeo, Jun. 16, 2025, https://www.gocodeo.com/post/neon-the-serverless-postgresql-platform-built-for-ai-agents.

Marodia, Democratizing database observability with AI-assisted troubleshooting, https://cloud.google.com/blog/products/databases/inside-ai-assisted-troubleshooting-for-databases, May 13, 2025.

Oracle, "Oracle Autonomous Database Technical Overview", Version [2.1], 20 page, Jul. 2020.

"An SQL Server DBA’s Guide to Actifio GO", https://docs.actifio.com/static/Actifio-GO/PDFs/DBA_SQLServer.pdf, 2001.

M. A. Murphy, M. Fenn, L. Abraham, J. A. Canter, B. T. Sterrett and S. Goasguen, "Distributed management of virtual cluster infrastructures," 2009 IEEE International Symposium on Parallel & Distributed Processing, Rome, Italy, 2009, pp. 1-8 (Year: 2009).

\* cited by examiner

500

505 → START

510 → RECEIVE USER INPUTS

515 → DETERMINE APPLICABLE POLICIES

520 → SELECT ONE OR MORE DATACENTERS BASED ON THE USER INPUTS AND PRE-DEFINED RULES

525 → DETERMINE NUMBER OF CLUSTERS TO BE SELECTED

530 → SELECT THE NUMBER OF CLUSTERS FROM THE SELECTED ONE OR MORE DATACENTERS BASED ON THE USER INPUTS AND THE PRE-DEFINED RULES

535 → END

AUTONOMOUS DATABASE MANAGEMENT SYSTEM

CROSS-REFERENCE TO RELATED APPLICATIONS

This is a non-provisional of U.S. Provisional Application No. 63/292,846, filed on Dec. 22, 2021, the entirety of which is incorporated by reference herein.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some embodiments of the present disclosure, a method is disclosed. The method includes receiving, by a processor of a database management system, a user request for provisioning a database, autonomously selecting, by the processor, a datacenter for provisioning the database based at least on a first pre-defined rule, autonomously selecting, by the processor, at least one cluster in the datacenter based at least on a second pre-defined rule, determining, by the processor, a network location of each of the at least one cluster, and provisioning, by the processor, the database on each of the at least one cluster using the network of each of the at least one cluster.

In accordance with some embodiments of the present disclosure, a system is disclosed. The system includes a memory having computer-readable instructions stored thereon and a processor of a database management system executing the computer-readable instructions to receive a user request to provision a database, autonomously select a datacenter to provision the database based at least on a first pre-defined rule, autonomously select at least one cluster in the datacenter based at least on a second pre-defined rule, determine a network location of each of the at least one cluster, and provision the database on each of the at least one cluster using the network location of each of the at least one cluster.

In accordance with some embodiments of the present disclosure, a non-transitory computer-readable medium having computer-readable instructions stored thereon is disclosed. The computer-readable instructions when executed by a processor of a database management system cause the processor to: receive a user request to provision a database, autonomously select a datacenter to provision the database based at least on a first pre-defined rule, autonomously select at least one cluster in the datacenter based at least on a second pre-defined rule, determine a network location of each of the at least one cluster, and provision the database on each of the at least one cluster using the network location of each of the at least one cluster.

Figure 1:
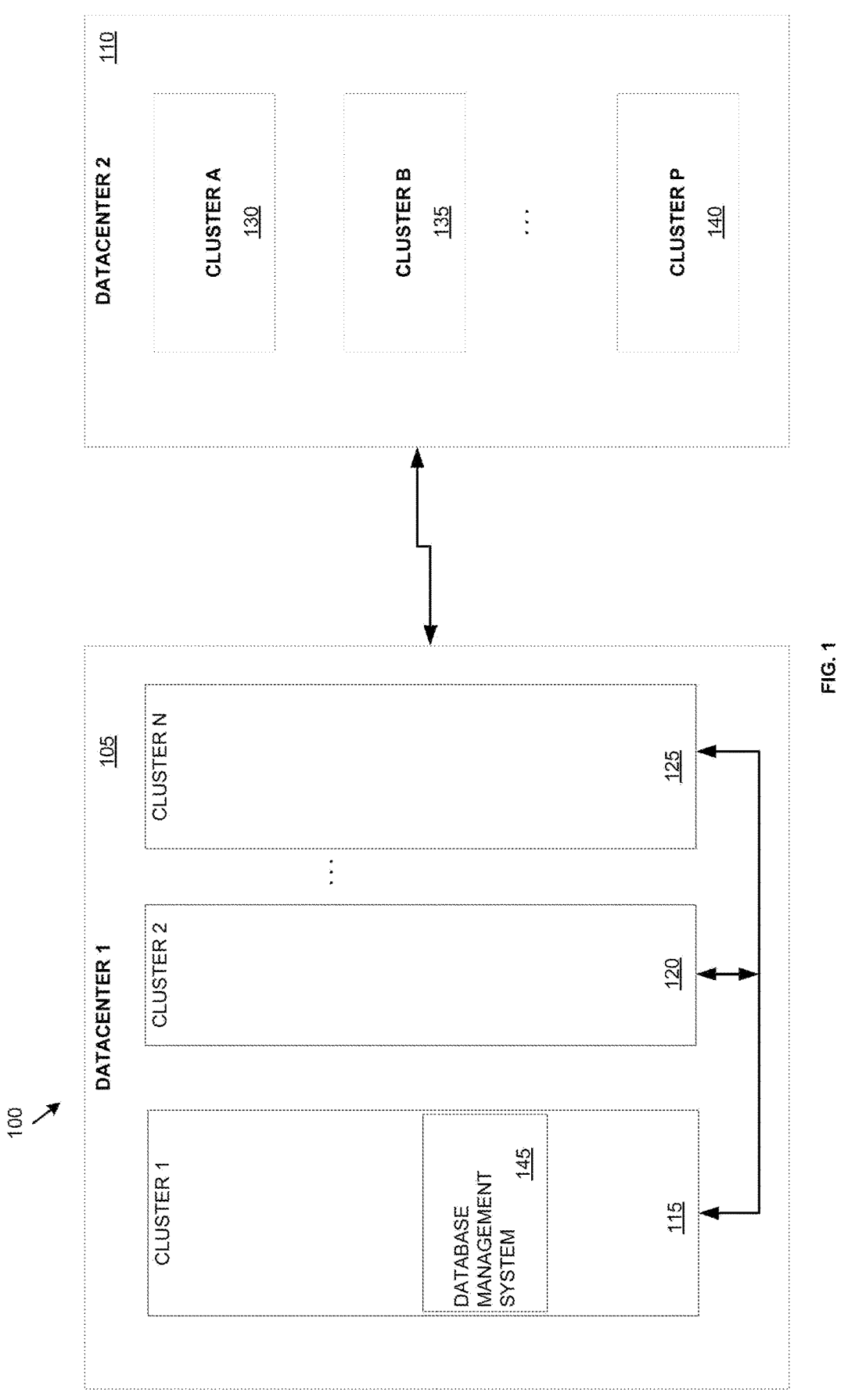
FIG. 1 is an example block diagram showing additional details of the database system of FIG. 1, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a virtual computing system having a plurality of clusters, with each of the plurality of clusters having a plurality of nodes. Each of the plurality of nodes includes one or more virtual machines and other entities managed by an instance of a monitor such as a hypervisor. These and other components may be part of a datacenter, which may be managed by a user (e.g., an administrator or other authorized personnel). A distributed storage system, for providing storage and protection capabilities, is associated with the virtual computing system. The virtual computing system may be configured for providing database management services. For example, at least some of the one or more virtual machines within the virtual computing system may be configured as database virtual machines for storing one or more databases. These databases may be managed by a database management system. The database management system may provide a plurality of database services.

Referring to FIG. 1, an example block diagram of a database system 100 is shown, in accordance with some embodiments of the present disclosure. The database system 100 may be configured to manage databases spread across multiple clusters in a virtual computing system. In some embodiments, the multiple clusters may be spread across one or more datacenters of the virtual computing system. For example, and as shown in FIG. 1, the database system 100 may include a datacenter 105 and a datacenter 110. Although only two datacenters are shown in FIG. 1, the database system 100 may include a single datacenter or more than two datacenters.

Further, in some embodiments, either or both of the datacenter 105 and/or the datacenter 110 may be part of an on-premise environment. In other embodiments, either or both of the datacenter 105 and/or the datacenter 110 may be part of a cloud environment (e.g., public cloud, private cloud, hybrid cloud). In an "on-premise" environment, resources (e.g., databases) may be deployed locally (e.g., in-house) on an enterprise's computers and servers, and be managed internally. In a cloud environment, resources (e.g., databases) may be hosted by a service provider and may be accessed via a network (e.g., the internet) using, for example, a web-based browser. In some embodiments, the service provider may be associated with the enterprise of the on-premise environment. In other words, in some embodiments, the cloud environment may be managed by the enterprise managing the on-premise environment. In some embodiments, the cloud environment may be managed by a third-party site provider. The cloud environment, may thus in some embodiments, be a public cloud (e.g., Amazon Web Services, Microsoft Azure, Google Cloud, etc.), a private cloud (e.g., cloud managed by a particular enterprise for their own use), or a hybrid cloud (e.g., a combination of public and private clouds).

Additionally, in some embodiments, the datacenters 105 and 110 may be geographically located in the same location, while in other embodiments, those datacenters may be in different geographical locations. For example, in some embodiments, the datacenters 105 and 110 may be located in the same or different cities, same or different states, same or different countries, same or different continents, etc. The term "geographical location" may be defined based on any physical features of an area. The database system 100 may, thus, be configured to manage databases stored in the datacenters 105 and 110. In some embodiments, the datacenter 105 and the datacenter 110 may be part of one or more availability zones and/or all-availability groups.

Each of the datacenters 105 and 110 may include one or more clusters. For example, the datacenter 105 may include clusters 115, 120, 125, while the datacenter 110 may include clusters 130, 135, 140. Although each of the datacenters 105 and 110 is shown as having three respective clusters, in other embodiments, each of those datacenters may have less than three or greater than three clusters. Further, although both the datacenters 105 and 110 have been shown as having an equal number of clusters, in some embodiments, those datacenters may have varying number of clusters.

Databases that are provisioned in the database system 100 may be located on one or more clusters in the datacenters 105 and/or 110. For example, a database may be located on one or more clusters of either the datacenter 105 or the datacenter 110. In some embodiments, a database may be located on one or more clusters of the datacenter 105, as well as on one or more clusters of the datacenter 110. For example, a first database may reside on a cluster of the datacenter 105 and a copy of the first database may reside on a cluster of the datacenter 110. In some embodiments, any changes made to one copy of the database may be automatically made (e.g., carried over, either synchronously or asynchronously) to the other copies of the database. In some embodiments, a database may be provisioned as an "n-node" database, meaning that the database is to be provisioned (e.g., created or registered) on n clusters. For example, to provision a 2-node database, the database may be provisioned on 2 clusters. The two clusters may be on the datacenter 105 only, the datacenter 110 only, or a combination of those datacenters (e.g., 1 cluster on each datacenter).

By virtue of being located in multiple datacenters (e.g., the datacenter 105 and/or the datacenter 110) and multiple environments (e.g., on-premise environment and/or cloud environment), the database system 100 provides high availability. If either of the datacenter 105 or the datacenter 110 goes down, the databases that are on both may be accessed from the other datacenter that may still be operational. Thus, the database system 100 may be considered to form an Always On Availability Group (AAG). The database system 100 may also allow the databases to be accessed from multiple locations, for example, for different purposes.

Further, the databases on the database system 100 may be managed by a database management system 145. In some embodiments, one instance of the database management system 145 may be configured to manage databases spread across not just multiple clusters of the same datacenter, but also across multiple datacenters and multiple environments (e.g., on-premise environment, cloud environment). In some embodiments, the database management system 145 may reside on one datacenter (e.g., the datacenter 105, as shown in FIG. 1) and may be configured to manage the databases located on the datacenter 105, as well as the datacenter 110. For example, the database management system 145 may be configured to manage databases (whether source, cloned, etc.) located on the clusters 115, 120, 125 of the datacenter 105. Similarly, the database management system 145 may be configured to manage databases (whether source, cloned, etc.) located on the clusters 130, 135, 140 of the datacenter 110. In other embodiments, the database management system 145 may be configured to manage databases that are located on the same datacenter as the database management system. Thus, in some embodiments, each datacenter may have an instance of a database management system to manage databases located on that datacenter. In some embodiments, such multiple instances of the database management systems may communicate with each other to facilitate management of the databases on the various datacenters.

In some embodiments, the database management system 145 may include a server (e.g., controller) that provides database management services (e.g., database provisioning, database protection, copy data management, database patching, etc.). In some embodiments, the database management system 145 may also include an agent located on each of the clusters 115-140 that facilitates communication between the server of the database management system and the databases residing on those clusters. In some embodiments, the database management system 145 may communicate with a user via an API and a dashboard, and be associated with a database storage system, as discussed in greater detail below.

By creating databases across multiple datacenters (e.g., the datacenters 105, 110) and having the database management system 145 manage those databases across the multiple datacenters, the database system 100 provides resiliency against datacenter and regional failures. The database system 100 also improves quality of service. For example, consider a database running on a datacenter (e.g., the datacenter 105) located in New York. If that database is being accessed by a user located in San Francisco, that user in San Francisco may experience a significant latency (e.g., network latency) while accessing the database located in New York. To improve performance, a cluster having a copy of the database may also be created in San Francisco (e.g., on the datacenter 110). Thus, by being able to create/register databases across multiple clusters and multiple datacenters, the database may be created/registered such that copies of the same database resides on two nodes (e.g., a two-node database) where one node is located in a cluster of the datacenter located in New York and the other node is located in a cluster of the datacenter located in San Francisco. Both nodes may be managed by the same instance of the database management system 145. Thus, by providing the ability to provision (e.g., create) databases across datacenters, while providing a single point of management of all those databases, users may access the database from the node closest to them for better quality of service.

Further, in some embodiments, cloned databases, copies of source databases, snapshots of the source and/or cloned databases, and/or transactional logs of the source and/or cloned databases may be stored in either or both of the datacenters 105 and 110 to provide high availability, back-up and restore capabilities, and to otherwise protect the databases.

Figure 2:
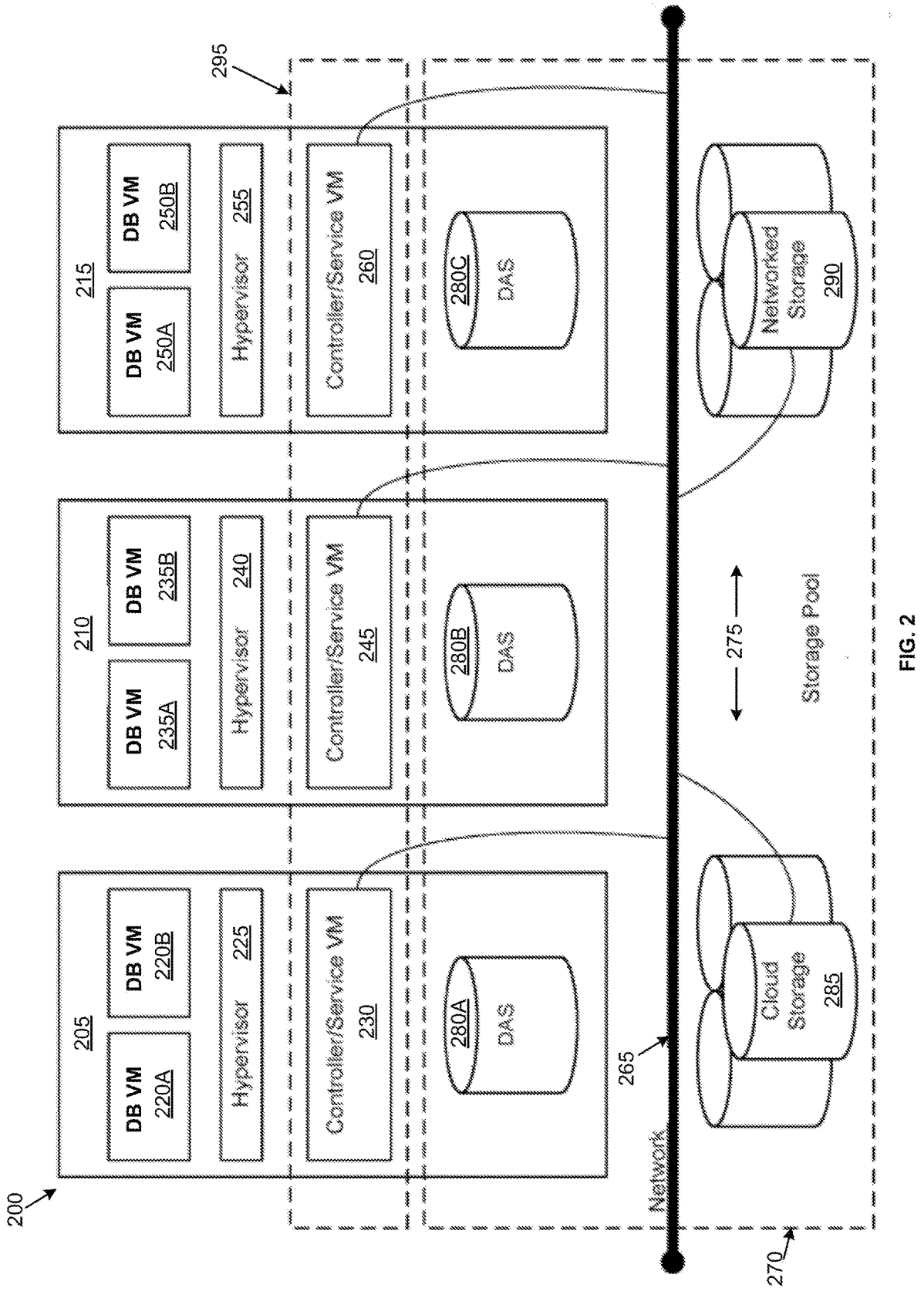
FIG. 2 is an example block diagram of a cluster of the database system of FIG. 1, in accordance with some embodiments of the present disclosure.

Referring now to FIG. 2, an example cluster 200 in a virtual computing system is shown, in accordance with some embodiments of the present disclosure. In some embodiments, the cluster 200 may be part of a hyperconverged system. In some embodiments, the cluster 200 may be part of an on-premise environment. In some embodiments, the cluster 200 may be part of a cloud environment (e.g., public cloud, private cloud, hybrid cloud). The cluster 200 may be a cluster on the datacenter 105 or the datacenter 110. Thus, in some embodiments, the cluster 200 may be any of the clusters 115-140. The cluster 200 may store databases and/or the database management system (e.g., the database management system 145, 145). The database management system is discussed in greater detail below.

The cluster 200 includes a plurality of nodes, such as a first node 205, a second node 210, and a third node 215. Each of the first node 205, the second node 210, and the third node 215 may also be referred to as a "host" or "host machine." The first node 205 includes database virtual machines ("database VMs") 220A and 220B (collectively referred to herein as "database VMs 220"), a hypervisor 225 configured to create and run the database VMs, and a controller/service VM 230 configured to manage, route, and otherwise handle workflow requests between the various nodes of the cluster 200. Similarly, the second node 210 includes database VMs 235A and 235B (collectively referred to herein as "database VMs 235"), a hypervisor 240, and a controller/service VM 245, and the third node 215 includes database VMs 250A and 250B (collectively referred to herein as "database VMs 250"), a hypervisor 255, and a controller/service VM 260. The controller/service VM 230, the controller/service VM 245, and the controller/service VM 260 are all connected to a network 265 to facilitate communication between the first node 205, the second node 210, and the third node 215. Although not shown, in some embodiments, the hypervisor 225, the hypervisor 240, and the hypervisor 255 may also be connected to the network 265. Further, although not shown, one or more of the first node 205, the second node 210, and the third node 215 may include one or more containers managed by a monitor (e.g., container engine).

The cluster 200 also includes and/or is associated with a storage pool 270 (also referred to herein as storage subsystem). The storage pool 270 may include network-attached storage 275 and direct-attached storage 280A, 280B, and 280C. The network-attached storage 275 is accessible via the network 265 and, in some embodiments, may include cloud storage 285, as well as a networked storage 290. In contrast to the network-attached storage 275, which is accessible via the network 265, the direct-attached storage 280A, 280B, and 280C includes storage components that are provided internally within each of the first node 205, the second node 210, and the third node 215, respectively, such that each of the first, second, and third nodes may access its respective direct-attached storage without having to access the network 265.

It is to be understood that only certain components of the cluster 200 are shown in FIG. 2. Nevertheless, several other components that are needed or desired in the cluster 200 to perform the functions described herein are contemplated and considered within the scope of the present disclosure.

Although three of the plurality of nodes (e.g., the first node 205, the second node 210, and the third node 215) are shown in the cluster 200, in other embodiments, greater than or fewer than three nodes may be provided within the cluster. Likewise, although only two database VMs (e.g., the database VMs 220, the database VMs 235, the database VMs 250) are shown on each of the first node 205, the second node 210, and the third node 215, in other embodiments, the number of the database VMs on each of the first, second, and third nodes may vary to include other numbers of database VMs. Further, the first node 205, the second node 210, and the third node 215 may have the same number of database VMs (e.g., the database VMs 220, the database VMs 235, the database VMs 250) or different number of database VMs.

In some embodiments, each of the first node 205, the second node 210, and the third node 215 may be a hardware device, such as a server. For example, in some embodiments, one or more of the first node 205, the second node 210, and the third node 215 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 205, the second node 210, or the third node 215 may be another type of hardware device, such as a personal computer, an input/output or peripheral unit such as a printer, or any type of device that is suitable for use as a node within the cluster 200. In some embodiments, the cluster 200 may be part of a data center. Further, one or more of the first node 205, the second node 210, and the third node 215 may be organized in a variety of network topologies. Each of the first node 205, the second node 210, and the third node 215 may also be configured to communicate and share resources with each other via the network 265. For example, in some embodiments, the first node 205, the second node 210, and the third node 215 may communicate and share resources with each other via the controller/service VM 230, the controller/service VM 245, and the controller/service VM 260, and/or the hypervisor 225, the hypervisor 240, and the hypervisor 255.

Also, although not shown, one or more of the first node 205, the second node 210, and the third node 215 may include one or more processing units or processors configured to execute instructions. The instructions may be carried out by a special purpose computer, logic circuits, or hardware circuits of the first node 205, the second node 210, and the third node 215. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 270, as well as with other elements of the first node 205, the second node 210, and the third node 215 to receive, send, and process information, and to control the operations of the underlying first, second, or third node. The processing units may retrieve a set of instructions from the storage pool 270, such as, from a permanent memory device like a read only memory ("ROM") device and copy the instructions in an executable form to a temporary memory device that is generally some form of random access memory ("RAM"). The ROM and RAM may both be part of the storage pool 270, or in some embodiments, may be separately provisioned from the storage pool. In some embodiments, the processing units may execute instructions without first copying the instructions to the RAM. Further, the processing units may include a single stand-alone processing unit, or a plurality of processing units that use the same or different processing technology.

With respect to the storage pool 270 and particularly with respect to the direct-attached storage 280A, 280B, and 280C, each of the direct-attached storage may include a variety of types of memory devices that are suitable for a virtual computing system. For example, in some embodiments, one or more of the direct-attached storage 280A, 280B, and 280C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 275 may include any of a variety of network accessible storage (e.g., the cloud storage 285, the networked storage 190, etc.) that is suitable for use within the cluster 200 and accessible via the network 265. The storage pool 270, including the network-attached storage 275 and the direct-attached storage 280A, 280B, and 280C, together form a distributed storage system configured to be accessed by each of the first node 205, the second node 210, and the third node 215 via the network 265, the controller/service VM 230, the controller/service VM 245, the controller/service VM 260, and/or the hypervisor 225, the hypervisor 240, and the hypervisor 255. In some embodiments, the various storage components in the storage pool 270 may be configured as virtual disks for access by the database VMs 220, the database VMs 235, and the database VMs 250.

Each of the database VMs 220, the database VMs 235, the database VMs 250 is a software-based implementation of a computing machine. The database VMs 220, the database VMs 235, the database VMs 250 emulate the functionality of a physical computer. Specifically, the hardware resources, such as processing unit, memory, storage, etc., of the underlying computer (e.g., the first node 205, the second node 210, and the third node 215) are virtualized or transformed by the respective hypervisor 225, the hypervisor 240, and the hypervisor 255, into the underlying support for each of the database VMs 220, the database VMs 235, the database VMs 250 that may run its own operating system and applications on the underlying physical resources just like a real computer. By encapsulating an entire machine, including CPU, memory, operating system, storage devices, and network devices, the database VMs 220, the database VMs 235, the database VMs 250 are compatible with most standard operating systems (e.g., Windows, Linux, etc.), applications, and device drivers. In some embodiments, one or more of the database VMs 220, the database VMs 235, the database VMs 250 maybe configured to host one or more databases. In some embodiments, one or more of the database VMs 220, the database VMs 235, the database VMs 250 may also be configured to host workloads other than or in addition to databases.

Each of the hypervisor 225, the hypervisor 240, and the hypervisor 255 is a virtual machine monitor that allows a single physical server computer (e.g., the first node 205, the second node 210, third node 215) to run multiple instances of the database VMs 220, the database VMs 235, and the database VMs 250 with each VM sharing the resources of that one physical server computer, potentially across multiple environments. For example, each of the hypervisor 225, the hypervisor 240, and the hypervisor 255 may allocate memory and other resources to the underlying VMs (e.g., the database VMs 220, the database VMs 235, the database VM 150A, and the database VM 150B) from the storage pool 270 to perform one or more functions. In other embodiments, other types of virtual machine monitors may be used.

By running the database VMs 220, the database VMs 235, and the database VMs 250 on each of the first node 205, the second node 210, and the third node 215, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 205, the second node 210, and the third node 215, each of the new database VMs may be configured to be associated with certain hardware resources, software resources, storage resources, and other resources within the cluster 200 to allow those virtual VMs to operate as intended.

The database VMs 220, the database VMs 235, the database VMs 250, and any newly created instances of the database VMs may be controlled and managed by their respective instance of the controller/service VM 230, the controller/service VM 245, and the controller/service VM 260. The controller/service VM 230, the controller/service VM 245, and the controller/service VM 260 are configured to communicate with each other via the network 265 to form a distributed system 195. Each of the controller/service VM 230, the controller/service VM 245, and the controller/service VM 260 may be considered a local management system configured to manage various tasks and operations within the cluster 200. For example, in some embodiments, the local management system may perform various management related tasks on the database VMs 220, the database VMs 235, and the database VMs 250.

The hypervisor 225, the hypervisor 240, and the hypervisor 255 of the first node 205, the second node 210, and the third node 215, respectively, may be configured to run virtualization software, such as, ESXi from VMWare, AHV from Nutanix, Inc., XenServer from Citrix Systems, Inc., etc. The virtualization software on the hypervisor 225, the hypervisor 240, and the hypervisor 255 may be configured for running the database VMs 220, the database VMs 235, the database VM 150A, and the database VM 150B, respectively, and for managing the interactions between those VMs and the underlying hardware of the first node 205, the second node 210, and the third node 215. Each of the controller/service VM 230, the controller/service VM 245, the controller/service VM 260, the hypervisor 225, the hypervisor 240, and the hypervisor 255 may be configured as suitable for use within the cluster 200.

The network 265 may include any of a variety of wired or wireless network channels that may be suitable for use within the cluster 200. For example, in some embodiments, the network 265 may include wired connections, such as an Ethernet connection, one or more twisted pair wires, coaxial cables, fiber optic cables, etc. In other embodiments, the network 265 may include wireless connections, such as microwaves, infrared waves, radio waves, spread spectrum technologies, satellites, etc. The network 265 may also be configured to communicate with another device using cellular networks, local area networks, wide area networks, the Internet, etc. In some embodiments, the network 265 may include a combination of wired and wireless communications. The network 265 may also include or be associated with network interfaces, switches, routers, network cards, and/or other hardware, software, and/or firmware components that may be needed or considered desirable to have in facilitating intercommunication within the cluster 200.

Referring still to FIG. 2, in some embodiments, one of the first node 205, the second node 210, or the third node 215 may be configured as a leader node. The leader node may be configured to monitor and handle requests from other nodes in the cluster 200. For example, a particular database VM (e.g., the database VMs 220, the database VMs 235, or the database VMs 250) may direct an input/output request to the controller/service VM (e.g., the controller/service VM 230, the controller/service VM 245, or the controller/service VM 260, respectively) on the underlying node (e.g., the first node 205, the second node 210, or the third node 215, respectively). Upon receiving the input/output request, that controller/service VM may direct the input/output request to the controller/service VM (e.g., one of the controller/service VM 230, the controller/service VM 245, or the controller/service VM 260) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 200 to fulfil that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 200. If the leader node fails, another leader node may be designated.

Additionally, in some embodiments, although not shown, the cluster 200 may be associated with a central management system that is configured to manage and control the operation of multiple clusters in the virtual computing system. In some embodiments, the central management system may be configured to communicate with the local management systems on each of the controller/service VM 230, the controller/service VM 245, the controller/service VM 260 for controlling the various clusters.

Again, it is to be understood again that only certain components and features of the cluster 200 are shown and described herein. Nevertheless, other components and features that may be needed or desired to perform the functions described herein are contemplated and considered within the scope of the present disclosure. It is also to be understood that the configuration of the various components of the cluster 200 described above is only an example and is not intended to be limiting in any way. Rather, the configuration of those components may vary to perform the functions described herein.

Figure 3:
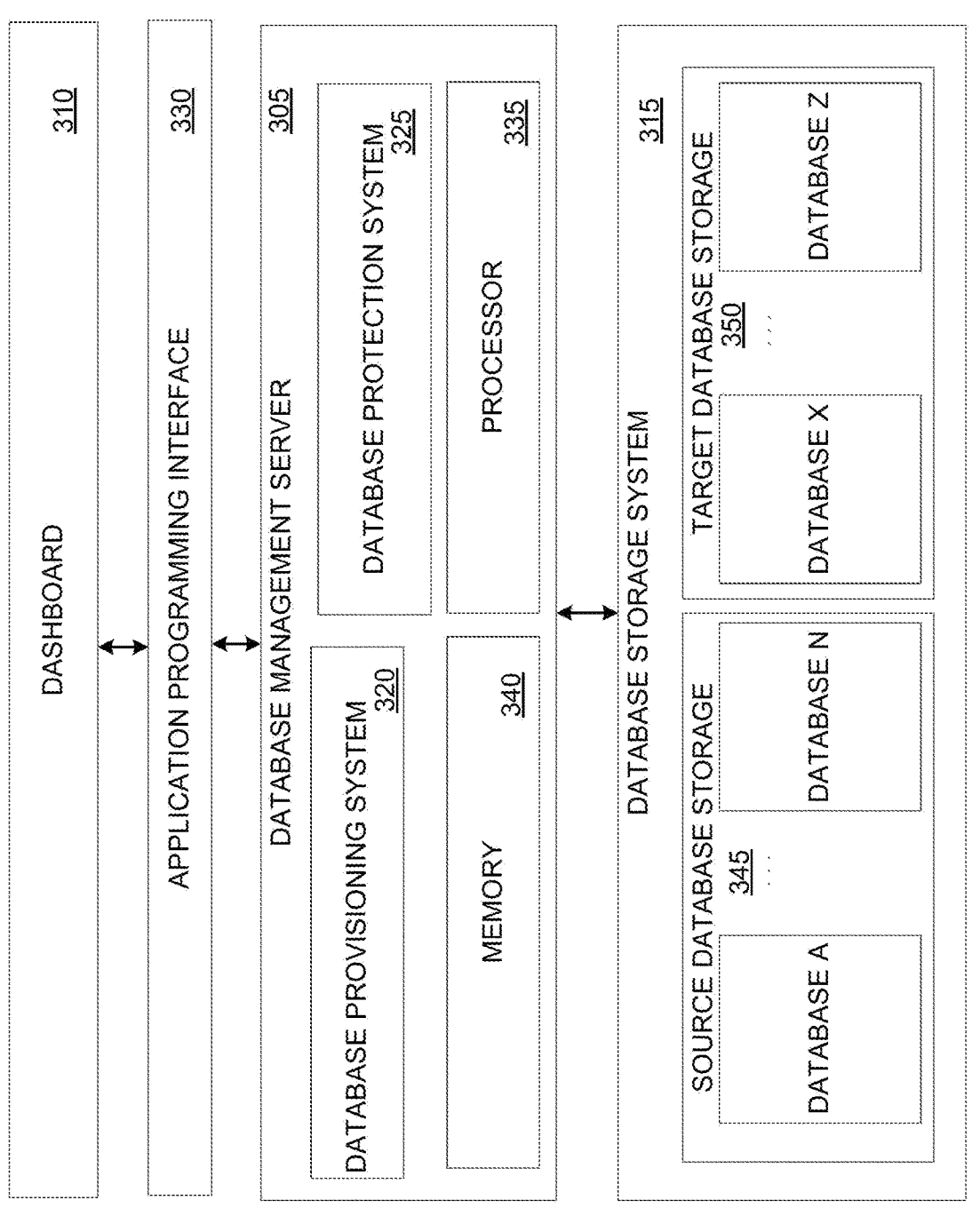
FIG. 3 is an example block diagram of an example database management system of the database system of FIG. 1, in accordance with some embodiments of the present disclosure.

Turning now to FIG. 3, an example block diagram showing various details of a database management system 300 is shown, in accordance with some embodiments of the present disclosure. FIG. 3 is discussed in conjunction with FIGS. 1 and 2. The database management system 300 is analogous to the database management system 145. The database management system 300 or portions thereof may be configured as utility software for creating and implementing database management services. The database management system 300 is configured to facilitate provisioning (e.g., creation), registration, protection, querying, administration of the databases associated therewith, etc. In other words, the database management system 300 may be configured to provide a variety of database services or database management services related to the databases associated therewith. Thus, the database management system 300 includes a database management server 305 that is configured to receive input from and provide output to a user via a dashboard 310. The database management server 305 is also associated with a database storage system 315 that is configured to store one or more databases under management of the database management system 300. In association with the dashboard 310 and the database storage system 315, the database management server 305 is configured to implement one or more database management services of the database management system. For example, the database management server 305 is configured to provide database provisioning services to create new databases and register existing databases with the database management system 300 using a database provisioning system 320. The database management server 305 is also configured to protect databases created or registered by the database provisioning system 320 via a database protection system 325. Although the database provisioning system 320 and the database protection system 325 are shown as separate components, in some embodiments, the database provisioning system and the database protection system may be combined, and the combined component may perform the operations of the individual components. Although not shown, the database management server 305 may include other or additional components that provide other or additional database management services.

The database management system 300 may be installed on a database VM (e.g., the database VMs 220, the database VMs 235, the database VMs 250 of FIG. 2). The database management system 300 may be installed via the controller/service VM (e.g., the controller/service VM 230, the controller/service VM 245, the controller/service VM 260) of the node (e.g., the first node 205, the second node 210, and the third node 215) on which the database system is to be installed. For example, an administrator desiring to install the database management system 300 may download a copy on write image file (e.g., qcow or qcow2 image file) on the controller/service VM to define the content and structure of a disk volume to be associated with the database management system. In some embodiments, instead of a copy on write image file, another type of disk image file, depending upon the type of underlying hypervisor, may be installed. Further, the administrator may create or one or more new database VMs on which the database management system 300 is to reside. As part of creating the database VMs, the administrator may allocate a particular number of virtual central processors (vCPU) to each of the database VMs, define the number of cores that are desired in each vCPU, designate a specific amount of memory to each of the database VMs, and attach a database storage device (e.g., a virtual disk from the storage pool 270) with each of the database VMs. In some embodiments, at least a portion of the database storage device attached to the database management system 300 may form the database storage system 315. The administrator may also create a new network interface (e.g., associate a virtual local area network (VLAN), assign an Internet Protocol ("IP") address to access the database management system 300, etc.) with each of the database VMs. The administrator may perform additional and/or other actions to create the database VMs on which the database system 100 resides upon creation and installation of the disk image file.

In some embodiments, the database VMs on which database management system 300 resides may all be located on a single node (e.g., one of the first node 205, the second node 210, and the third node 215). In other embodiments, the database VMs on which the database management system 300 resides may be spread across multiple nodes within a single cluster, or amongst multiple clusters. When spread across multiple clusters, each of the associated multiple clusters may be configured to at least indirectly communicate with one another to facilitate operation of the database management system 300. Upon installing the database management system 300, a user (e.g., the administrator or other user authorized to access the database system) may access the dashboard 310. The dashboard 310, thus, forms the front end of the database management system 300 and the database management server 305 and the database storage system 315 form the backend of the database system.

The database management system 300 may be accessed via a computing device associated with the virtual computing system. In other embodiments, instead of or in addition to being accessible via a particular computing device, the database management system 300 may be hosted on a cloud service and may be accessed via the cloud. In some embodiments, the database management system 300 may additionally or alternatively be configured as a mobile application suitable for access from a mobile computing device (e.g., a mobile phone). In some embodiments, the database management system 300 and particularly the dashboard 310 may be accessed via an Application Programming Interface ("API") 330. To access the dashboard 310 via the API 330, a user may use designated devices such as laptops, desktops, tablets, mobile devices, other handheld or portable devices, and/or other types of computing devices that are configured to access the API. These devices may be different from the computing device on which the database management system 300 is installed.

In some embodiments and when the dashboard 310 is configured for access via the API 330, the user may access the dashboard via a web browser and upon entering a uniform resource locator ("URL") for the API such as the IP address of the database management system 300 or other web address. Using the API 330 and the dashboard 310, the users may then send instructions to the database management server 305 and receive information back from the database management server. In some embodiments, the API 330 may be a representational state transfer ("REST") type of API. In other embodiments, the API 330 may be any other type of web or other type of API (e.g., ASP.NET) built using any of a variety of technologies, such as Java, .Net, etc., that is capable of accessing the database management server 305 and facilitating communication between the users and the database management server. In some embodiments, the API 330 may be configured to facilitate communication via a hypertext transfer protocol ("HTTP") or hypertext transfer protocol secure ("HTTPS") type request. The API 330 may receive an HTTP/HTTPS request and send an HTTP/HTTPS response back. In other embodiments, the API 330 may be configured to facilitate communication using other or additional types of communication protocols. In other embodiments, the database management system 300 may be configured for access in other ways.

The dashboard 310 provides a user interface that facilitates human-computer interaction between the users and the database management server 305. The dashboard 310 is configured to receive user inputs from the users via a graphical user interface ("GUI") and transmit those user inputs to the database management server 305. The dashboard 310 is also configured to receive outputs/information from the database management server 305 and present those outputs/information to the users via the GUI of the management system. The GUI may present a variety of graphical icons, windows, visual indicators, menus, visual widgets, and other indicia to facilitate user interaction. In other embodiments, the dashboard 310 may be configured as other types of user interfaces, including for example, text-based user interfaces and other man-machine interfaces. Thus, the dashboard 310 may be configured in a variety of ways.

Further, the dashboard 310 may be configured to receive user inputs in a variety of ways. For example, the dashboard 310 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database system 100. The dashboard 310 may also be configured to present outputs/information to the users in a variety of ways. For example, the dashboard 310 may be configured to present information to external systems such as users, memory, printers, speakers, etc. Therefore, although not shown, dashboard 310 may be associated with a variety of hardware, software, firmware components, or combinations thereof. Generally speaking, the dashboard 310 may be associated with any type of hardware, software, and/or firmware component that enables the database management server 305 to perform the functions described herein.

Thus, the dashboard receives a user request (e.g., an input) from the user and transmits that user request to the database management server 305. In some embodiments, the user request may be to request a database management service. For example, in some embodiments, the user request may be to request a database provisioning service. In response to the user request for a database provisioning service, the database management server 305 may activate the database provisioning system 320.

The database management server 305, including the database provisioning system 320 and the database protection system 325 may be configured as, and/or operate in association with, hardware, software, firmware, or a combination thereof. Specifically, the database management server 305 may include a processor 335 configured to execute instructions for implementing the database management services of the database management system 300. In some embodiments, each of the database provisioning system 320 and the database protection system 325 may have their own separate instance of the processor 335. The processor 335 may be implemented in hardware, firmware, software, or any combination thereof. "Executing an instruction" means that the processor 335 performs the operations called for by that instruction. The processor 335 may retrieve a set of instructions from a memory for execution. For example, in some embodiments, the processor 335 may retrieve the instructions from a permanent memory device like a read only memory (ROM) device and copy the instructions in an executable form to a temporary memory device that is generally some form of random access memory (RAM). The ROM and RAM may both be part of the storage pool 270 and/or provisioned separately from the storage pool. In some embodiments, the processor 335 may be configured to execute instructions without first copying those instructions to the RAM. The processor 335 may be a special purpose computer, and include logic circuits, hardware circuits, etc. to carry out the instructions. The processor 335 may include a single stand-alone processor, or a plurality of processors that use the same or different processing technology. The instructions may be written using one or more programming language, scripting language, assembly language, etc.

The database management server 305 may also include a memory 340. The memory 340 may be provisioned from or be associated with the storage pool 270. In some embodiments, the memory 340 may be separate from the storage pool 270. The memory 340 may be any of a variety of volatile and/or non-volatile memories that may be considered suitable for use with the database management server 305. In some embodiments, the memory 340 may be configured to store the instructions that are used by the processor 335. Further, although not shown, in some embodiments, the database provisioning system 320 and the database protection system 325 may each, additionally or alternatively, have their own dedicated memory.

Further, the database management server 305 may be configured to handle a variety of types of database engine types. For example, in some embodiments, the database management server 305 may be configured to manage PostgreSQL, Oracle, Microsoft SQL server, and My SQL database engine types. In other embodiments, the database management server 305 may be configured to manage other or additional database engine types. Each database that is created within or registered with the database management system 300 may be of a particular "database engine type." The database engine type may identify the type of database management system (e.g., Oracle, PostgreSQL, etc.) of a particular database. By virtue of creating or registering a database with a particular database engine type, that database is managed in accordance with the rules of that database engine type. Thus, the database management server 305 is configured to be operable with and manage databases associated with a variety of database engine types.

It is to be understood that only some components of the database management server 305 are shown and discussed herein. In other embodiments, the database management server 305 may also include other components that are considered necessary or desirable in implementing the various database management services discussed herein. Similarly, the database provisioning system 320 and the database protection system 325 may have components that are considered necessary or desirable in implementing the various database management services discussed herein.

Referring still to FIG. 3, the database storage system 315 is configured to store one or more databases that are either created within the database management system 300 or registered with the database system. The database storage system 315 may include a source database storage 345 and a target database storage 350. The source database storage

345 is configured to store the original instances of the databases (also referred to herein as source databases) that are created within or registered with the database management system 300. The target database storage 350 is configured to store the clones of the source databases (also referred to herein as cloned databases). In some embodiments, the source database storage 345 and the target database storage 350 may be provisioned from the storage pool 270 and may include virtual disk storage that is associated with the database VMs (e.g., the database VMs 220, the database VMs 235, the database VMs 250) on which the database system 100, the source databases, and the cloned databases reside. For example, in some embodiments, the source database storage 345 may be associated with one or more database VMs (referred to herein as source database VMs) and the source databases stored within the source database storage may be stored within the virtual disks associated with the source database VMs. Similarly, in some embodiments, the target database storage 350 may be associated with one or more database VMs (referred to herein as target database VMs) and the databases stored within the target database storage may be stored within the virtual disks associated with the target database VMs. In some embodiments, each source database VM may be configured to store one or more source databases and each target database VM may be configured to store one or more target databases. In other embodiments, the source database storage 345 and the target database storage 350 may additionally or alternatively be provisioned from other types of storage associated with the database system 100.

Further, depending upon the size of a particular database and the size of the virtual disk associated with a particular source database VM, a source database may be stored in its entirety on a single source database VM or may span multiple source database VMs. Further, as the size of that source database increases, the source database may be moved to another source database VM, may be stored onto multiple source database VMs, and/or additional storage may be provisioned to the source database VMs to house the increased size of the source database. Similarly, depending upon the size of a cloned database and the size of the virtual disk associated with a particular target database VM, the cloned database may be stored on a single or multiple target database VMs. Further, as the size of the cloned database increases (e.g., by virtue of updating the cloned database to incorporate any changes in the source database), the cloned database may be moved to another target database VM of appropriate size, may be divided amongst multiple target database VMs, and/or additional virtual disk space may be provisioned to the target database VM. Thus, the database storage system 315 is structured with the flexibility to expand and adapt to accommodate databases of various sizes.

Additionally, in some embodiments, the databases of the source database storage 345 and the target database storage 350 may be stored on a single cluster or span across multiple clusters. For example, in some embodiments, the databases of the source database storage 345 may span across a first set of clusters and the databases of the target database storage 350 may span across a second set of clusters. In some embodiments, the source databases and the cloned databases may be stored on separate designated clusters. In other embodiments, a cluster may be configured to store both source and cloned databases. In some embodiments, the cluster(s) on which the source databases are stored may be part of a single datacenter and/or availability zone, while in other embodiments, the cluster(s) on which the source databases are stored may be part of multiple datacenters and/or availability zones. Similarly, in some embodiments, the cluster(s) on which the cloned databases are stored may be part of a single datacenter and/or availability zone, while in other embodiments, the cluster(s) on which the cloned databases are stored may be part of multiple datacenters and/or availability zones. In some embodiments, multiple copies of the source databases and/or the cloned databases may be stored. Such multiple copies may be stored on the same cluster(s) on which the source databases or the cloned databases are stored, or may be stored on different cluster(s), and such cluster(s) may be part of the same datacenter and/or availability zone or part of different datacenters and/or availability zones. In some embodiments, at least some of the clusters on which the source databases, cloned databases, and/or copies of those databases are stored may be part of an on-premise environment, while at least some of the clusters on which the source databases, cloned databases, and/or copies of those databases are stored may be part of a cloud environment.

Additionally, it is to be understood that only some elements of the database management system 300 are shown herein. In other embodiments, the database management system 300 may include other or additional elements that may be needed or considered desirable to have in performing the functions described herein. For example, in some embodiments, the database management system 300 may include one or more agents, with each agent being stored on a cluster where a database is located or may be located.

In some embodiments, an agent may be an intermediary between the database management server 305 and the various databases on a particular cluster. In some embodiments, each agent may be configured as software, hardware, firmware, or a combination thereof. Each agent may, in some embodiments, be an autonomous software program that is configured for performing one or more specific and approved operations. Each agent may be associated with resources (e.g., CPU, memory, etc.) on the cluster that they reside on. In some embodiments, each agent may be installed on a virtual machine of the cluster that they reside on. In some embodiments, each agent may be configured to perform operations under control by the database management server 305.

The agents may interact with the database management server 305 to pick up work and execute. In other words, the database management server 305 may send requests or instructions to one or more agents for operations or tasks to be performed by those agents. Upon receiving the instructions from the database management server 305, one or more of the agents that receive those instructions may perform the requested tasks or operations by calling an appropriate script based on the type of work needed. For example, to create a clone of a database, an agent may invoke a cloning script. As another example, the agent may also be requested to gather transactional logs (also referred to herein as logs or log drives) for replicating and/or protecting databases. Upon completing their assigned task(s), the agents may respond back to the database management server 305 indicating that the tasks or operations are completed and wait to receive the next task or operation from the server. Example operations that each agent may perform may include database provisioning, database server provisioning (e.g., creating a database server virtual machine), database cloning, database server cloning (e.g., cloning a database server virtual machine), registering a database, registering a database server virtual machine, copy log operations, resiliency and curation operations, profile (e.g., network, software, compute, etc.) creation, capturing snapshots, cleanup operations, etc.

In some embodiments, each agent may have a process running thereon that may regularly (e.g., every 10 seconds) polls the database management server 305 for any tasks or operations to be performed. If the database management server 305 determines that a task or operation is needed, the server may send instructions to that polling agent. In some embodiments, the agents may poll the database management server 305 by calling an API on the database management server. In other embodiments, the agents may use other mechanisms to poll the database management server 305.

Figure 4:
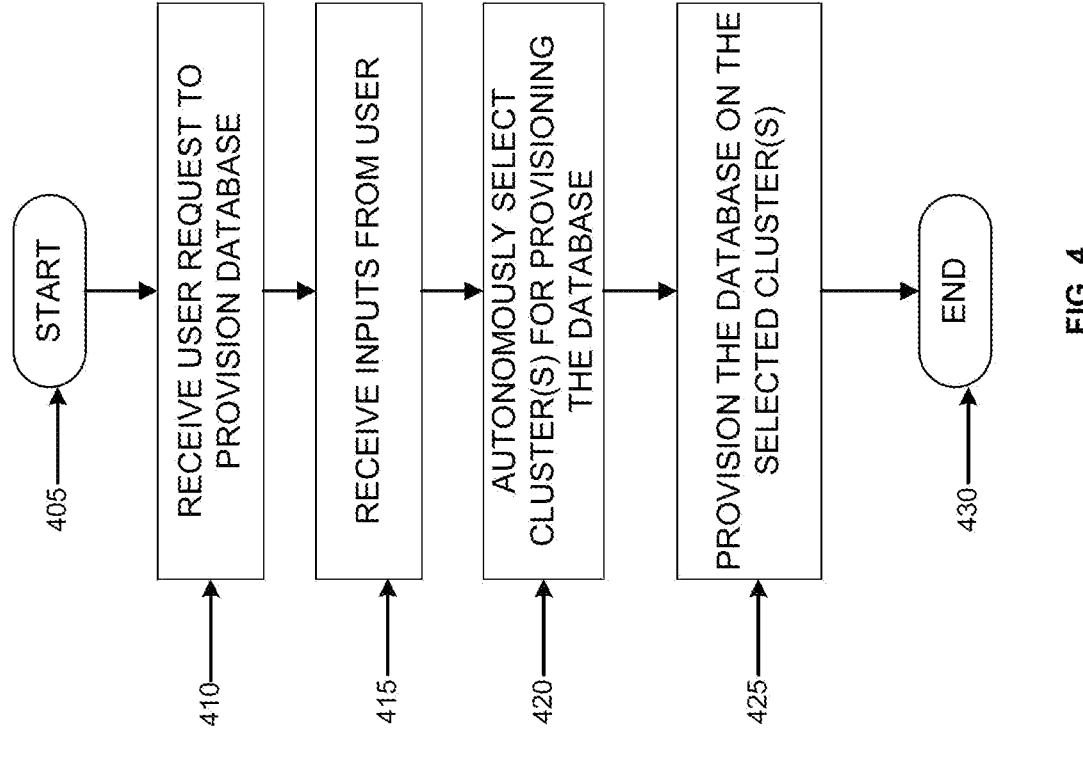
FIG. 4 is an example flowchart outlining operations of the database management system of FIG. 3 in autonomously deciding a location for provisioning a database, in accordance with some embodiments of the present disclosure.

Turning now to FIG. 4, an example flowchart outlining operations of a process 400 is shown, in accordance with some embodiments of the present disclosure. The process 400 may include other or additional operations depending upon the particular embodiment. The process 400 may be used to provision/register (collectively referred to herein as "provision") a database in the database system 100. Specifically, the process 400 may be used to autonomously select one or more clusters by the database management system 145 to provision the database. Although the process 400 is described with respect to database provisioning, in other embodiments, the process 400 may be used for other types of database management services that require the database management system 145 to select one or more clusters for performing the database management services. For example, in some embodiments, the process 400 may also be used for copy database management for protecting (e.g., cloning, backing up, restoring, etc.) database. When used for copy data management, in some embodiments, the process 400 may be used to autonomously select one or more clusters for cloning, backing up (e.g., replicating), restoring, etc. databases. Similarly, the process 400 may be used for other types of database management services in which selection of clusters is needed.

When provisioning a database, in some embodiments, a user may provide the identity (e.g., name, identifier, network location, etc.) of the cluster(s) (e.g., the datacenter 105 and/or the datacenter 110) where the user desires to provision the database. In some embodiments, the user selected clusters may not be entirely suitable for the database. For example, in some embodiments, the user may desire to provision a database of a certain size. If the user's selected clusters do not have sufficient storage to host the database of that size, the performance of the database may suffer (e.g., increased latency, etc.) or the database may be created of a smaller than desired size. In some embodiments, the user may desire to create a database of a specific database engine type (e.g., SQL, postgres, etc.). The user's selected clusters may not be optimal for that specific database engine type. For example, in some embodiments, each database engine type may require certain resources, protocols, processes, etc. for optimal performance. If the user's selected clusters are not specifically configured for that specific database engine, the performance of the database may suffer (or worse, the database may be unable to be provisioned or be provisioned using a database engine type that the user may not desire).

In some embodiments, a cost of running a database on a user selected cluster may be more than the cost of running the database on another cluster. In some embodiments, the location of the user selected cluster may not be optimal. For example, if the user is located in New York, but selects a cluster located in San Francisco for provisioning the database, the performance of the database may suffer (e.g., have increased latency). Likewise, in other embodiments, the user's selected clusters may not be optimal locations for hosting the database for other reasons.

Thus, in some embodiments, the database management system 145 (and particularly the database management server associated with the database management system) may be configured to autonomously select optimal clusters for provisioning a database. Specifically, in some embodiments, the database management system 145 may autonomously (e.g., without user input identifying the clusters) select one or more optimal clusters for provisioning a database. Upon starting at operation 405, the database management system 145 receives a user request to provision a database at operation 410. In some embodiments, the database management system 145 may receive the user request in any suitable way, for example, by way of a user interface (e.g., the dashboard 310). Again, although FIG. 4 is described for database provisioning, the process 400 may similarly be used for other database management services that require cluster selection.

Upon receiving the request to provision a database at the operation 410, the database management system 145 requests various parameters (e.g., inputs) from the user (e.g., via the dashboard 310) at operation 415. The types of input that the database management system 145 requests may depend upon the type of user request received at the operation 410. For example, in some embodiments, for a database provisioning user request, the database management system 145 may request a database engine type from the user that the user desires for the database being provisioned. In some embodiments, the database management system 145 may request a number of nodes (e.g., clusters) on which the database is to be provisioned. In some embodiments, the database management system 145 may request a size of the database that is desired. In some embodiments, the database management system 145 may also request a region in which the database is to be provisioned. In some embodiments, the database management system 145 may also request a name for the database and/or any other details that may be needed or desired to have in provisioning a database. In some embodiments, at a minimum, the database management system 145 may request a database engine type, a size of the database, and a region in which the database is to be provisioned for provisioning a database. In other embodiments, the database management system 145 may request other or additional inputs. In some embodiments, to request the inputs at the operation 415, the database management system 145 may present one or more user interfaces (e.g., via the dashboard 310) to the user.

At operation 420, the database management system 145 autonomously selects one or more optimal clusters for provisioning the database. The selection is considered "autonomous" because the user does not identify the clusters on which the database is to be provisioned. Rather, the database management system 145 automatically selects the clusters on which the database is to be provisioned. In some embodiments, the database management system 145 may select the clusters based at least on the inputs received from the user at the operation 415. In some embodiments, the database management system 145 may also be pre-programmed with various criteria to help the database management system select the clusters. For example, in some embodiments, the criteria may be based upon the size of the database, the database engine type of the database, the type of cloud environment (e.g., public cloud, private cloud, hybrid cloud) properties of the cloud, storage availability, availability of computing resources (e.g., CPU processing, latency, input/output operations per second), region where the database is desired, policies applicable to the user, location of the user, cost of operating the database, etc. In some embodiments, the database management system 145 may apply similar criteria to select a datacenter on which to provision the database. In some embodiments, the criteria may be applied to the user inputs received at the operation 415, pre-defined rules, or a combination thereof. The autonomous selection of the clusters is discussed in greater detail in FIG. 5 below.

Thus, in some embodiments, the database management system 145 may autonomously select whether to provision the database in the datacenter 105 or the datacenter 110. In some embodiments, upon deciding whether to provision the database in the datacenter 105 or the datacenter 110, the database management system 145 may also autonomously select the clusters within the selected one of the datacenters on which to provision the database. For example, in some embodiments, the database management system 145 may first autonomously select the datacenter 105 to provision the database. Then, the database management system 145 may select one or more clusters in the datacenter 105 to provision the database. In some embodiments, the clusters that are selected (in either the datacenter 105 or the datacenter 110) may be selected from amongst those clusters that are already registered with the database management system 145. A cluster is considered "registered" with the database management system 145 when that cluster has been configured specifically for management by the database management system. Registration of clusters is described in greater detail in U.S. application Ser. No. 17/325,757, filed on May 20, 2021, the entirety of which is incorporated by reference herein.

Upon selecting the datacenter(s) and/or cluster(s) for provisioning the database at the operation 420, the database management system 145 provisions the database at each of the selected datacenter(s) and/or cluster(s) at operation 425. In some embodiments, the database management system 145 may create a new database server virtual machine for the database (or use an existing database server virtual machine) on the datacenter(s)/cluster(s) on which the database is to be provisioned. A database server virtual machine is a virtual machine on which the provisioned database resides. In other words, the database server virtual machine may be associated with a storage device (e.g., virtual disk(s)) and the provisioned database may be stored within that storage device and accessible via the database server virtual machine.

In some embodiments, to provision a database, the database management system 145 may need one or more profiles. For example, in some embodiments, for each cluster, the database management system 145 may need a software profile, a network profile, a compute profile, and/or a database parameter profile to provision a database. In some embodiments, the database management system 145 may use default profiles for provisioning the database. In other embodiments, the database management system 145 may have previously stored profiles that the user desires to use for one or more of the profiles. For example, in some embodiments, the database management system 145 may identify the profiles that the user has previously used for provisioning databases, and present those identified profiles to the user. The user may either select one or more of those profiles or provide one or more new profiles. In some embodiments, the database management system 145 may present profiles to the user based on other considerations. For example, in some embodiments, the database management system 145 may determine suitable profiles based on the inputs received from the user at the operation 410. In other embodiments, the database management system 145 may ask the user to provide the profiles without identifying any profiles for user review.

A software profile defines the software and operating system parameters for the database engine type that is desired. For example, if the database engine type is selected as PostgreSQL, the software profile may include one or more software and operations system image profiles associated with PostgreSQL. Each software profile may define the rules that are to be applied in managing the database being created. In some embodiments, based on the database engine type input by the user at the operation 415, the database management system 145 may be configured to select a software profile by default. In some embodiments, the user may have previously selected and stored one or more desired software profiles for each database engine type that the user may provision databases for. Thus, based on the user input of the operation 415 indicating the database engine type, the database management system 145 may select the software profile corresponding to that database engine type. In some embodiments, the same software profile may be replicated and applied to each cluster on which the database is to be provisioned. In other embodiments, the database management system 145 may use separate software profiles for each cluster.

A network profile identifies the network location of the cluster and/or the database server virtual machine on the cluster. In some embodiments, upon selecting the cluster(s) on which to provision the database on, the database management system 145 may obtain the network locations of those cluster(s) for the network profile. In other embodiments, the database management system 145 may select the network locations of the selected cluster(s) in other ways. In some embodiments, the database management system 145 may have previously stored network profiles selected by the user.

A compute profile defines the size/configuration of the database server. For example, the compute profile may define the number of vCPUs, number of cores per vCPU, and memory capacity to be associated with the database server. In other embodiments, the compute profile may define other or additional configurational parameters. In some embodiments, the compute profile may be replicated across the various clusters. In other embodiments, the database management system 145 may use separate compute profiles for each cluster on which the database is to be provisioned. In some embodiments, the database management system 145 may select a default compute profile (e.g., based on the size of the database being provisioned or other factors), while in other embodiments, the database management system may use a compute profile previously received from the user. The database parameter profile may define the custom parameters that are applied to the database being created. Again, in some embodiments, the database management system 145 may select a default database parameters profile or use a database parameters profile previously stored by the user. The database parameter profile may be replicated across the clusters, or the user may provide a separate profile for each cluster.

In other embodiments, the database management system 145 may receive selection of one or more of the above profiles from the user at the time of provisioning the database.

In some embodiments, the database management system 145 may also present one or more user interfaces, via the dashboard 310, to request selection of parameters for creating an instance of a database protection system (e.g., the database protection system 325) for the database being created by the process 400. In some embodiments, the database protection system may be created/associated after provisioning the database. The database protection system may also be referred to as a "time machine" and may be used to protect databases. To create a time machine, the database management system 300 may request a name and description for the time machine, a level of a Service Level Agreement ("SLA"), and a protection schedule to define rules based on which the time machine operates. Additional details of the time machine, as well as the process for provisioning a database, are described in U.S. application Ser. No. 17/337,197, filed on Jun. 2, 2021, the entirety of which is incorporated by reference herein.

To create the database, the database management system 145 may request one or more of the agents to perform one or more operations. In some embodiments, the database management system 145 may send the request to the agent (s) located on the cluster(s) identified at the operation 420. In some embodiments, the agent(s) may initiate a series of operations upon receiving the request from the database management system 145. For example, the agent(s) may create one or more database server virtual machines on the respective cluster, convert the database size into a number of virtual disks associated with that cluster and that are needed to house the database, create a database profile having a database name, description, network information, etc., attach the software and parameters of the database engine type with the database, optionally create an instance of the time machine, and associate the SLA and protection schedule with the database protection system, designate storage for storing snapshots and transactional logs, etc. Once the database is created, database management services (e.g., copy data management services) may be applied to the database. Further, when the database is created, the time machine starts capturing snapshots and transactional logs from the database.

The process 400 ends at operation 530. Thus, the process 400 provides an easy and convenient mechanism to not only provision a database but also to improve the performance of the database. By selecting optimal locations (e.g., clusters) for creating the database, the database management system 145 ensures that the database is hosted at a location that maximizes the performance of the database. Upon receiving a minimal amount of information from the user, the database management system 145 intelligently decides which cluster(s) to provision a database on, automatically determines one or more of the network, computer, software, or parameter profiles, and other details for provisioning the database.

Figure 5:
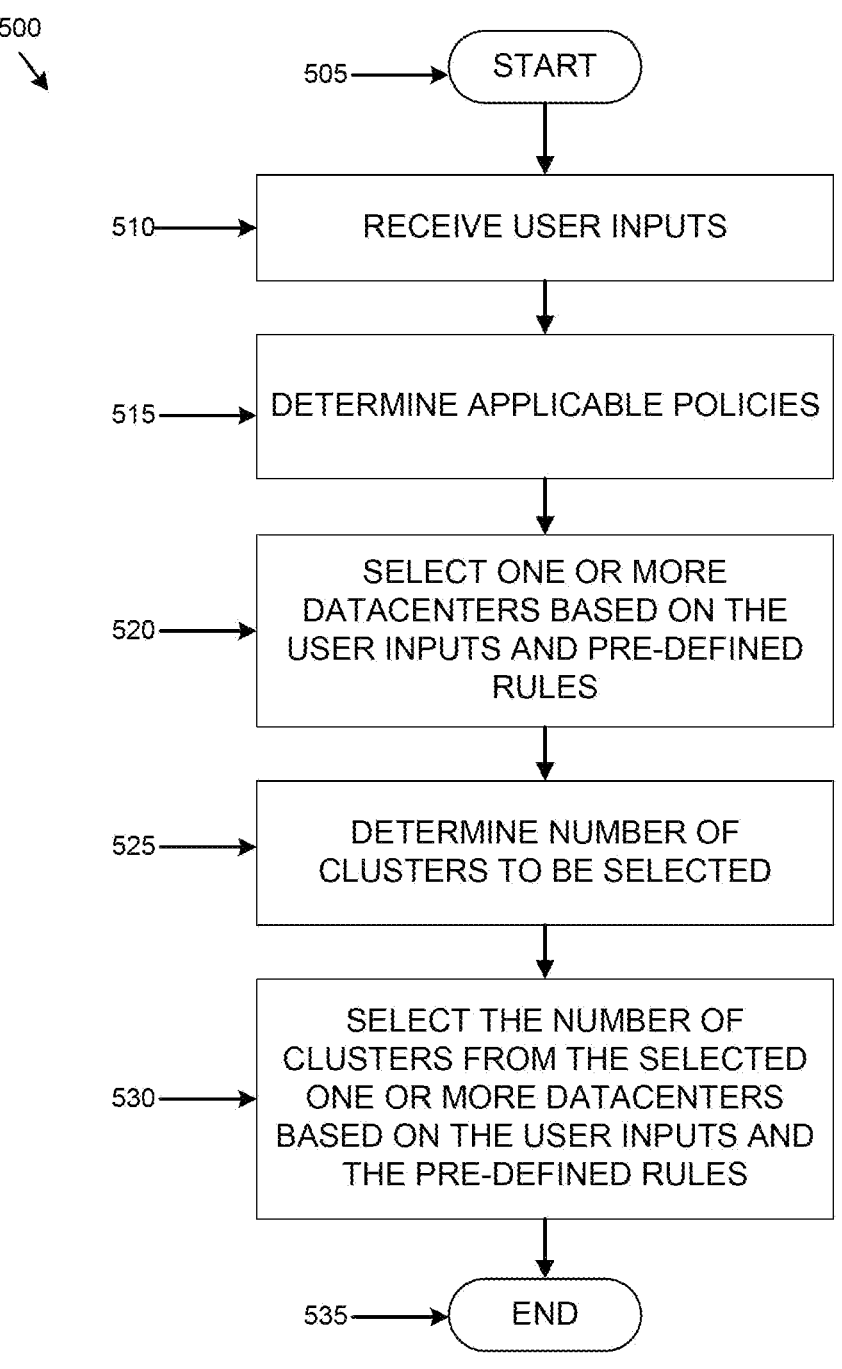
FIG. 5 is an example flowchart outlining operations of the database management system of FIG. 3 in autonomously selecting one or more clusters for a database, in accordance with some embodiments of the present disclosure.

Referring now to FIG. 5, an example flowchart outlining a process 500 is shown, in accordance with some embodiments of the present disclosure. The process 500 may include other or additional operations depending upon the particular embodiment. The process 500 may be implemented by the database management system 145 for autonomously selecting one or more clusters for performing a database management service (e.g., database provisioning). Upon starting at operation 505, the database management system 145 receives user inputs at operation 510. The inputs received at the operation 510 may be the same inputs that are received at the operation 415. At operation 515, the database management system 145 determines any applicable policies that may have been previously defined. In some embodiments, the database management system 145 store predefined rules that the database management system may consider in making the autonomous selection.

For example, in some embodiments, the pre-defined rules may specify a database engine type, a size of the database, whether the database is to be provisioned on the datacenter 105, datacenter 110, a public cloud, a private cloud, or a hybrid cloud, a number of nodes on which to provision the database, a location of the database (e.g., dependent on the location on the user), cost of operating the database, network latency, and any other criteria that may be needed or considered desirable to have for the database management system 145. In some embodiments, the pre-defined rules may be user specified. In other embodiments, the pre-defined rules may be default settings of the database management system 145. In other embodiments, the pre-defined rules may be a combination of default database management system settings and user defined rules. In some embodiments, no pre-defined rules may be used.

Based upon the user inputs of the operation 510 and/or the pre-defined rules of the operation 515, the database management system 145 selects one or more datacenters at operation 520. For example, in some embodiments, one of the user inputs at the operation 510 may specify a region in which the desired database is to be provisioned. At the operation 520, the database management system 145 may identify one or more suitable datacenters that fall within that region. For example, in some embodiments, if the user input specified a region of California, the database management system 145 may identify all datacenters that fall within the California region. In some embodiments, the region may be specified in the pre-defined rules. For example, in some embodiments, the pre-defined rules may specify provisioning a database in the North American region. In such cases, the database management system 145 may compare the pre-defined rules of the operation 515 with the user inputs of the operation 510 for any inconsistencies. Since California falls within the North American region, the database management system 145 may select the datacenters in California. Thus, in some embodiments, the database management system 145 may select the smaller or the more specific of the regions between the user inputs and the pre-defined rules (assuming the user inputs and pre-defined rules are not inconsistent).

In some embodiments, the pre-defined rules may be configured with a first region and the user inputs may desire a second region that does not overlap with the first region. For example, in some embodiments, the user may desire to provision a database in London and the pre-defined rules may specify a region of North America. Since London does not fall within North America, the database management system 145 may be configured to select either London or North America as the region. In some embodiments, the database management system 145 may be configured to prioritize the pre-defined rules during inconsistencies. In such cases, the database management system 145 may select North America as the region and identify suitable datacenters in North America. In some embodiments, the database management system 145 may issue a notification to the user informing that the database cannot be provisioned in London due to conflict with the pre-defined rules. In other embodiments, the database management system 145 may be configured to prioritize user inputs. In such cases, the database management system 145 may be configured to select London as the region and identify suitable datacenters in London.

In other embodiments, the database management system 145 may select the datacenters using other or additional criteria. For example, in some embodiments, the database management system 145 may select the datacenter that is closer to the location from where the database is to be accessed or where network latency is expected to be below a particular threshold. In some embodiments, the database management system 145 may select a datacenter based on a cost of operating the database at that datacenter. For example, in some embodiments, the database management system 145 may select a lower cost datacenter. In some embodiments, the database management system 145 may communicate with a cost estimation tool that provides an estimated cost of operating the database on various datacenters. Based on the cost estimate received from the cost estimation tool, the database management system 145 may select a suitable datacenter. In some embodiments, the user inputs and/or the pre-defined rules may indicate whether to provision the database on cloud, and particularly public, private, or hybrid cloud, or on-premise. The database management system 145 may then select a datacenter accordingly.

In some embodiments, upon identifying suitable datacenters, the database management system 145 may determine if the pre-defined rules specifically request provisioning databases on cloud or on-premise. For example, if the database management system 145 determines that the pre-defined rules specify provisioning databases on cloud, the database management system may select the datacenters in the appropriate region (e.g., London, California, etc.) that are part of the cloud environment. If the pre-defined rules do not specify a preference between on-premise and cloud, the database management system 145 may use other criteria to decide between on-premise and cloud. In some embodiments, the criteria to select specific clusters may result in the selection of on-premise or cloud, as discussed below.

Thus, at the operation 520, the database management system 145 identifies one or more suitable datacenters on which the database may be provisioned. At operation 525, the database management system 145 determines the number of clusters on which the database is to be provisioned. In some embodiments, the user inputs received at the operation 510 may define the number of clusters on which the database is to be provisioned. In other embodiments, the pre-defines rules may specify the number of nodes on which to provision the database. In some embodiments, if the user defined rules are consistent with the pre-defined rules, the database management system 145 may select the number of nodes received via the user inputs. For example, if the user desires to provision a 2-node database and the pre-defined rules indicate allowing the user to provision a database of no more than 4 nodes, since the user requested 2 nodes is a subset of the 4 nodes specified in the pre-defined rules, the database management system 145 may provision the database on 2 nodes (e.g., 2 clusters). In contrast, if the user inputs are inconsistent with the pre-defined rules, the database management system 145 may be configured to make a decision. For example, in some embodiments, the database management system 145 may be configured to prioritize the user inputs. In such cases, the database management system 145 may select the number of nodes specified in the user inputs regardless of the indication in the pre-defined rules.

On the other hand, if the database management system 145 is configured to prioritize the pre-defined rules, the database management system may select the number of nodes based on the pre-defined rules. For example, if the user desires a 3-node database and the pre-defined rules indicate no more than a 2-node database, the database management system 145 may select no more than 2 nodes for provisioning the database. The database management system 145 may be further configured with a default number to use within the constraint of the pre-defined rules in such cases. For example, since the pre-defined rules indicate no more than 2 nodes in the example above, the database management system 145 may select either a single node or two nodes to provision the database based on any default values pre-programmed therein. In other embodiments, the database management system 145 may be configured to select the number of clusters in other ways.

Further, in some embodiments, the operations 520 and 525 may be performed in any order or even simultaneously. At operation 530, the database management system 145 selects one or more clusters for provisioning the database. For example, if at the operation 525, the database management system 145 identified two clusters (e.g., for provisioning a 2-node database), then the operation 530 is configured to select two clusters in the one or more datacenters identified at the operation 520. The autonomous selection of the one or more clusters (e.g., the two clusters in the example above) may be based on one or more criteria applied to the user inputs and/or the pre-defined rules.

In some embodiments, size of the database may be a criteria for selecting the one or more clusters. As an example, the database management system 145 may determine (e.g., from user input or pre-defined rules) the size of the database to be provisioned. In some embodiments, at the operation 510, the user may specify a desired size of the database. In some embodiments, a size of the database may be specified in the pre-defined rules. In some embodiments, the database management system 145 may be further configured with a default size of the database. The database management system 145 may compare the size of the database in the user input and the size of the database in the pre-defined rules to decide a size of the database. As discussed above, in some embodiments, the size of the database in the user input may be consistent with (e.g., same as or a subset of) the size defined in the pre-defined rules. If so, the database management system 145 may select the size defined in the user input. If inconsistent, depending upon whether the user input or the pre-defined rules are prioritized higher, the database management system 145 may select the size noted in the higher prioritized one of the user input or the pre-defined rules. In some embodiments, if the pre-defined rules are selected but those rules don't specify a specific size (e.g., provide a size range instead), the database management system 145 may use the default size of the database or other use other criteria to decide on the specific size while remaining within the range of the pre-defined rules.

Upon selecting the size of the database, at the operation 525, the database management system 145 may identify one or more suitable clusters in the one or more datacenters identified at the operation 520 having sufficient space availability for provisioning a database of the selected size. In some embodiments, the database management system 145 may add a buffer to the selected size to obtain a preferred size of the database. The buffer may be a space of a pre-determined size to allow the database to increase in size without running into space constraints. The database management system 145 may then identify one or more clusters that have sufficient space availability for the database of the preferred size (e.g., desired size+buffer size).

In some embodiments, database engine type may be another criteria in selecting the one or more clusters. For example, in some embodiments, the user may specify a desired database engine type at the operation 510 for the database. In some embodiments, database engine type of the database may be specified in the pre-defined rules. In some embodiments, the database management system 145 may be further configured with a default database engine type of the database. The database management system 145 may compare the database engine type of the database in the user input and the database engine type of the database in the pre-defined rules to decide a database engine type of the database. In some embodiments, the database engine type of the database in the user input may be consistent (e.g., same as) with the database engine type defined in the pre-defined rules. If so, the database management system 145 may select the database engine type defined in the user input. If inconsistent (e.g., the user input and the pre-defined rules have different database engine types), depending upon whether the user input or the pre-defined rules are prioritized higher, the database management system 145 may select the database engine type noted in the higher prioritized one of the user input or the pre-defined rules. Upon determining the database engine type, the database management system 145 may select one or more clusters that are configured for the determined database engine type.

Similarly, the database management system 145 may apply other or additional criteria in selecting the desired number of clusters in the one or more suitable datacenters. Further, in some embodiments, the database management system 145 may be configured to apply a single criterion in deciding the one or more clusters. In other embodiments, database management system 145 may be configured to apply multiple criteria in deciding the one or more clusters. In some embodiments, and particularly in those embodiments in which multiple criteria are used, the multiple criteria may be ranked in an order of priority such that criterion having a higher priority is applied before a lower priority criterion. For example, if the criteria is based on a size of the database and the database engine type, with the database engine type having a higher priority than the database size, then database management system 145 may first identify one or more first clusters that are suitable for the database engine type. Then, the database management system 145 may apply the database size criteria to the one or more first clusters to identify one or more second clusters that satisfy the database size criteria. If database management system 145 is unable to find the number of desired clusters that satisfy both criteria, the database management system may then attempt to find one or more clusters that satisfy the database engine type criterion since the database engine type criterion is higher ranked then the database size criteria.

For example, if the database management system 145 is attempting to identify two clusters and the criteria is prioritized as above (e.g., database engine type being ranked higher priority than database size), the database management system may first attempt to identify clusters that satisfy both the criteria of size and database engine type. Say, the database management system 145 finds one cluster that satisfies both criteria. For the remaining cluster, the database management system may then identify a cluster that satisfies the database engine type criteria (since it is ranked higher). If the database management system does not find a cluster that satisfies the database engine type criteria, then the database management system may either only provision a one node database or provision the database on another a cluster configured for another database engine type but that satisfies the database size criteria.

Thus, at the operation 530, the database management system 145 identifies one or more suitable clusters in the one or more suitable datacenters. The selection of the one or more suitable datacenters and the one or more suitable clusters in the one or more suitable datacenters may be based on user input, pre-defined rules, and/or default values stored within the database management system. Although the process 500 is described for provisioning, the process 500 may be applied for other types of database management services using the user inputs suitable for that type of database management service and the pre-defined rules. The process 500 ends at operation 535.

Figure 6:
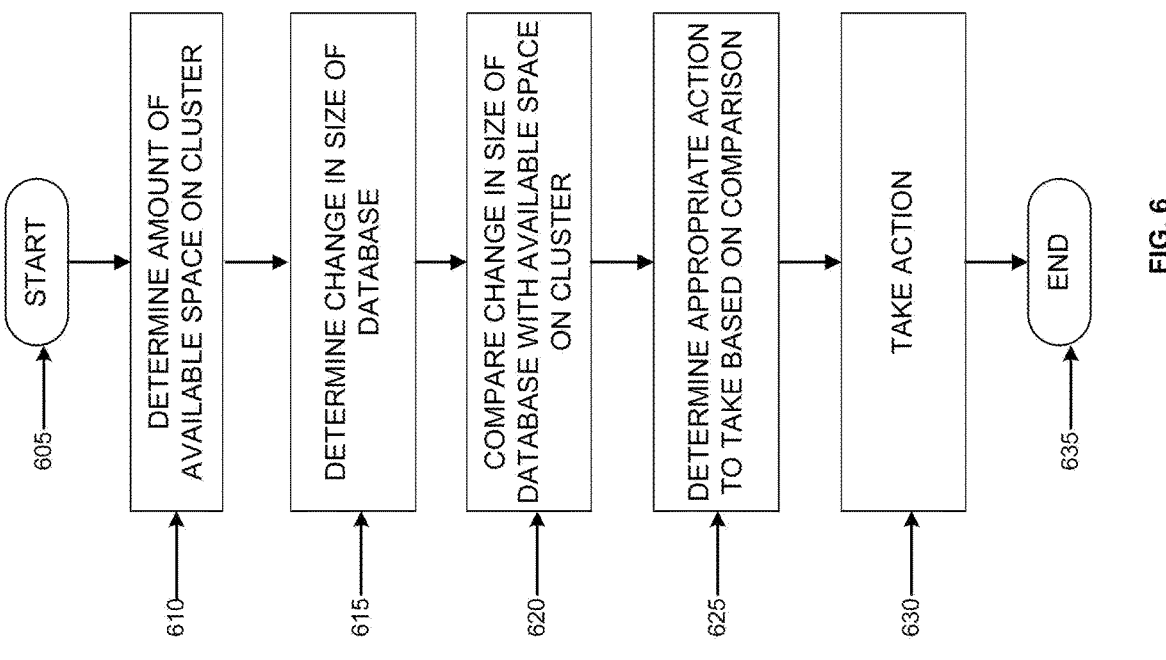
FIG. 6 is an example flowchart outlining operations of the database management system of FIG. 3 in autonomously monitoring the suitability of a cluster for a particular database, in accordance with some embodiments of the present disclosure.

Turning now to FIG. 6, an example flowchart outlining operations of a process 600 is shown, in accordance with some embodiments of the present disclosure. The process 600 may include other or additional operations depending upon the particular embodiment. In some embodiments, as a database that was created using the process 400 is used, the size of that database may change from the size when the database was originally created. For example, as more data is stored is within the database, the size of the database may increase. Thus, in some embodiments, although the database may have been provisioned with a size A, the size of that database may change to a size B, which may be greater than the size A. In such cases, although the cluster on which the database is located may have been an optimal location for the database at the time of provisioning, due to the growing size of the database, that cluster may no longer be an optimal location for the database. In other embodiments, the cluster on which the database has been provisioned may become non-optimal for other reasons. For example, in some embodiments, the cost of operating the database on that cluster may become higher. In some embodiments, the network latency of operating the database may become higher. In some embodiments, the available resources on the cluster may change making the cluster sub-optimal.

The process 600 may be used to monitor the database and the cluster, and take action based on the monitoring. For example, the process 600 may be used to monitor the size of the database and take action based on a pattern of database usage and available space on the cluster. While the process 600 has been described based on monitoring a size of the database, in other embodiments, the process 600 may be applied for other conditions of the database and/or the cluster being monitored. In some embodiments, the process 600 may be implemented by the database management system 145 (and particularly by the database management server associated with the database management system).

Thus, the process 600 starts at operation 605 with the provisioning of a database on one or more clusters, as discussed in the process 400 above. At operation 610, the database management system 145 continues to monitor the amount of space available on the cluster on which the database is located. In some embodiments, the database management server of the database management system 145 may send one or more operations to the agent located on the cluster on which the database is hosted. The agent may continuously or periodically check the current amount of storage on the cluster. Since the cluster may host other databases or applications, the amount of space on the cluster may change even if the size of the database is not changing. Upon detecting a change in the amount of space on the cluster, the agent may send the information to the database management server. In some embodiments, the agent may be configured to reach out to the database management server only if the amount of space on the cluster reduces or reduces by a certain threshold. In some embodiments, the agent may be configured to reach out to the database management server upon identifying any change in the amount of space available on the cluster.

At operation 615, the database management system 145 also monitors a pattern of usage of the database. Specifically, the database management system 145 may monitor a pattern of how the size of the database changes. In some embodiments, the database management server of the database management system 145 may send one or more operations to the agent of the cluster on which the database is hosted to monitor the change in size of the database relative to the original size of the database when the database was provisioned. In some embodiments, when the agent detects a change in the size of the database (e.g., a change greater than a predetermined threshold), the agent may notify the database management server. Thus, through the agent, the database management server monitors both—the current size of the database, including the change in size, and the amount of space available on the cluster on which the database is located. In some embodiments, by virtue of continuously monitoring the size of the cluster and the size of the database, the database management system 145 may determine a pattern of how the size of the cluster changes and how the size of the database changes.

At operation 620, the database management system 145 compares a current size of the cluster (e.g., amount of space on the cluster) with the current size of the database. Specifically, at the operation 620, the database management system 145 determines if the cluster is still suitable for the database. In some embodiments, if the database management system 145 determines that the amount of space on the cluster is less than a pre-defined percentage, the database management system may determine that the cluster is no longer suitable for the database. In some embodiments, the database management system 145 may compare a pattern of usage of the database with the amount of space available on the cluster. For example, if the database management system 145 determines that the size of the database is changing at a rate of X % and that the database is expected to run out of space on the cluster based on the current amount of space on the cluster, the database management system may determine that the cluster is soon going to become unsuitable for the database. Upon determining that the cluster has become unsuitable or is expected to become unsuitable for the database, at operation 625, the database management system 145 decides an appropriate action to take.

For example, at the operation 625, in some embodiments, the database management system 145 may decide to add additional storage to the cluster on which the database is located. In some embodiments, the database management system 145 may decide to move the database to another cluster. In some embodiments, the database management system 145 may notify the user that the database has run out of space or is to expected to run out of space soon. The database management system 145 may then receive input from the user instructing the database management system to take specific action (e.g., move the database, add more storage to the cluster, do nothing, etc.).

At operation 630, the database management system 145 takes the action that was decided at the operation 630. For example, upon determining that the database needs to be moved to a new location, the database management system 145 determines a new location for moving the database (e.g., using the process 500) and moves the database to that new location. The new location may be another cluster in the same datacenter or another datacenter. If the database management system 145 is to add more storage to the cluster, the database management system may take action to facilitate adding additional storage. The process 600 ends at operation 635.

In some embodiments, the database management system 145 may decide whether to move the database to another datacenter and/or cluster if the database management system determines that another more suitable cluster is available. In some embodiments, if the database was created on a particular datacenter and another datacenter becomes available that is closer to the location of access of the database, the database management system 145 may decide to move the database to the new datacenter. For example, if the database was initially created on a datacenter in New York but was being accessed from San Francisco, if a datacenter becomes available near San Francisco, the database management system 145 may move the database to that datacenter near San Francisco to reduce network latency, particularly if the other criteria for an optimal database are also satisfied (e.g., datacenter has suitable clusters as discussed above).

In some embodiments, the database management system 145 may move the database to another cluster based on the cost of operating the database on the cluster. For example, if the database is provisioned on Cluster A and the cost of operating the database on Cluster A is X, when the database management system 145 determines that Cluster B has a cost of operation Y that is lower than X and satisfies other criteria for which Cluster A was initially selected, the database management system may move the database to Cluster B. In other embodiments, the database management system 145 may similarly decide to move the database to other optimal clusters based on other conditions.

Thus, the present disclosure provides an easy and convenient mechanism to provision databases in a manner that increases the efficiency and performance of the databases. Furthermore, the databases are monitored to ensure that the databases continue to operate optimally after provisioning. If decrease in the performance of a database is identified or anticipated, the database may be moved to a different location where the database may continue to operate optimally. Further, by selecting an appropriate location for the database, the present disclosure avoids the need for the user to determine the proper location of the database. The user need not worry about whether the cluster on which the database is to be provisioned will have enough storage space and resources or not.

Specifically, the present disclosure provides mechanisms for database automation and lifecycle management natively integrated into the database management system. With the present disclosure, databases may be defined via simple blueprints (e.g., pre-defined rules) that may be easily created using industry standard skills and control all aspects of the database's lifecycle, such as provisioning, copy data management, scaling, and cleanup. These blueprints may be created through the dashboard or via code (e.g., using a Python-based DSL), including seamless conversion. Once created, a blueprint may be easily published to end users, instantly transforming a complex provisioning process into a simple one-click request. The present disclosure, thus, provides a single language for database modeling with flexibility to integrate with each team's tool of choice unified management and governance across clouds, on-premise, and datacenters, removes bottlenecks by turning specialized operations into push-button automation, provides automated self-service for users to easily and conveniently build and manage databases.

The present disclosure also simplifies the set-up and management of databases by incorporating all elements of each database, including relevant VMs, configurations, and related binaries, into an easy-to-use blueprint that is managed by the users. The blueprints may be easily managed (e.g., edited) via the dashboard (e.g., GUI or command line interface), depending on a user's preference. By making the deployment and lifecycle management of databases both automated and easily repeatable, users may eliminate the hours and days currently devoted to routine database management. In some embodiments, the present disclosure may provide pre-defined blueprints that the user may select from to create the pre-defined rules. In other embodiments, the blueprints may be custom defined from scratch or pre-defined blueprints may be modified to suit a user's purposes. Thus, blueprints or pre-defined rules may provide a framework or template to describe one or more steps for provisioning and otherwise managing databases. Therefore, the blueprints streamline the provisioning and management of databases.

The present disclosure may be used to empower different groups in an organization to provision and manage their own databases, thereby providing powerful, database-centric self-service capabilities with role-based access control. All activities and changes may be logged for end-to-end traceability, aiding security teams with key compliance initiatives. The present disclosure provides the tools required to modernize databases without losing control of policy. The present disclosure automates the provisioning of databases not only across datacenters, but also across multi-cloud architectures, scaling both multi-tiered and distributed databases across different cloud environments. The present disclosure allows tracking and monitoring the overall utilization and true cost of consumption at a glance providing the information required to make deployment decisions with confidence. The present disclosure converts database management into a resilient, software-defined solution with rich machine intelligence. The result is predictable performance, cloud-like infrastructure consumption, robust security, and seamless application mobility for a broad range of databases.

By autonomously selecting optimal locations for databases and continuously monitoring and taking actions based on the monitoring, the present disclosure provides intelligent resource sizing and accurate visibility into cloud metering and chargebacks, while ensuring continuous optimal performance of the databases. The present disclosure allows users to gain visibility into the database usage pattern to precisely identify performance bottlenecks. In some embodiments, the database management system may leverage machine learning and artificial intelligence to provide real-time visibility in the database usage pattern across various datacenters and platforms (e.g., on-premise, cloud, multi cloud, hybrid cloud, etc.). Thus, in some embodiments, the present disclosure provides a unified visibility across various datacenters and platforms, along with automated database management.

Thus, the present disclosure empowers a user to deliver and manage production ready databases with push-button simplicity while preserving native user experience. The present disclosure provides visibility into database usage pattern at an aggregate and granular level. The database management system automatically identifies usage anomalies and provides optimization of database performance by providing recommendations to easily right-size database resources. The database management system may use machine intelligence to continuously suggest optimal locations for databases. In some embodiments, the database management system may enable setting database usage pattern policies that continuously track the database usage provide alerts to users when the usage exceeds a threshold. In some embodiments, the database management system may generate usage report for user review. In some embodiments, the database management system may project or predict (e.g., using machine learning/artificial intelligence) usage of a database for the upcoming predetermined time period (e.g., next week, next months, etc.). In some embodiments, the database management system may consider historical database usage patterns in predicting future usage patterns. For example, in some embodiments, the database management system may consider the last X days of usage in projecting a usage pattern for the next Y days.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
receiving, by a processor of a database management system, a user request for provisioning a database;
receiving, by the processor, one or more user inputs after receiving the user request; and
in response to the one or more user inputs:
autonomously selecting, by the processor, a datacenter for provisioning the database based at least on a first pre-defined rule and the one or more user inputs;
autonomously selecting, by the processor, a host location in the datacenter based at least on a second pre-defined rule and the one or more user inputs without further user input identifying the host location;
autonomously provisioning, by the processor, the database at the host location;
executing, by the processor, a machine-learning model using as input size data of the provisioned database to generate a predicted database size;
comparing the predicted database size to an amount of available space on the host location;

determining the predicted database size exceeds a prede-
termined threshold relative to the amount of available
space on the host location;

in response to the predicted database size exceeding the
predetermined threshold relative to the amount of avail-
able space on the host location, autonomously deter-
mining, by the processor, a new host location for the
database based on ranked database criteria including
database size; and autonomously provisioning, by the processor, the data-
base at the new host location.

2. The method of claim 1, wherein the datacenter that is
selected is part of an on-premise environment.

3. The method of claim 1, wherein the datacenter that is
selected is part of a cloud environment.

4. The method of claim 1, wherein the one or more user
inputs are indicative of a first region of where the database
is to be provisioned, and wherein the method further com-
prises selecting, by the processor, the datacenter that is
located in, or closest to, the region.

5. The method of claim 1, wherein the one or more user
inputs are indicative of a first region of where the database
is to be provisioned, and wherein the method further com-
prises:

identifying, by the processor, a second region from the
first pre-defined rule; and selecting, by the processor, the datacenter located in (a)
the first region upon determining that the second region
encompasses the first region; or (b) the second region
upon determining that the second region does not
encompass the first region.

6. The method of claim 1, further comprising selecting, by
the processor, the host location based on a criteria applied to
the second pre-defined rule and the one or more user inputs.

7. The method of claim 6, wherein the criteria comprises
at least one of a size of the database or a database engine
type desired for the database.

8. The method of claim 6, wherein the criteria comprises
a database engine type, wherein the one or more user inputs
are indicative of a first database engine type for the database,
and wherein the method further comprises:

identifying, by the processor, a second database engine
type from the second pre-defined rule; and selecting, by the processor, the host location that is
suitable for (a) the first database engine type upon
determining that the first database engine type is same
as the second database engine type; or (b) the second
database engine type upon determining that the first
database engine type is different from the second
database engine type.

9. The method of claim 6, wherein the criteria comprises
a size of the database, wherein the one or more user inputs
are indicative of a first size of the database, and wherein the
method further comprises:

identifying, by the processor, a second size of the database
from the second pre-defined rule; and selecting, by the processor, the host location that (a) has
an amount of available space for provisioning the
database of the first size upon determining that the
second size encompasses the first size; or (b) has an
amount of available space for provisioning the database
of the second size upon determining that the second
size does not encompass the first size.

10. The method of claim 1, further comprising determin-
ing, by the processor, a number of host locations including
the host location on which to provision the database based
at least on a third pre-defined rule.

11. The method of claim 1, further comprising:

automatically monitoring, by the processor, a usage pat-
tern of the database on the host location upon provi-
sioning; and taking action, by the processor, based upon the usage
pattern.

12. The method of claim 11, wherein the action comprises
adding additional storage to the host location or moving the
database to another host location.

13. The method of claim 11, wherein taking action com-
prises:

identifying, by the processor, another host location for the
database based on a criteria; and migrating, by the processor, the database to the another
host location.

14. The method of claim 1, further comprising:

predicting, by the processor, a usage pattern of the data-
base on the host location based on a historical usage
pattern; and taking action, by the processor, based on the predicted
usage pattern.

15. The method of claim 14, wherein taking action
comprises:

identifying, by the processor, another host location for the
database based on a criteria; and migrating, by the processor, the database to the another
host location.

16. The method of claim 1, wherein the host location is at
least one cluster.

17. A system comprising:

a memory having computer-readable instructions stored
thereon; and a processor of a database management system executing
the computer-readable instructions to:

receive a user request to provision a database;

receive one or more user inputs after receiving the user
request; and in response to the one or more user inputs;

autonomously select a datacenter to provision the data-
base based at least on a first pre-defined rule and the
one or more user inputs;

autonomously select a host location in the datacenter
based at least on a second pre-defined rule and the
one or more user inputs without further user input
identifying the host location;

autonomously provision the database at the host loca-
tion;

execute a machine-learning model using as input size data
of the provisioned database to generate a predicted
database size;

compare the predicted database size to an amount of
available space on the host location;

determine the predicted database size exceeds a prede-
termined threshold relative to the amount of avail-
able space on the host location;

in response to the predicted database size exceeding the
predetermined threshold relative to the amount of
available space on the host location, autonomously
determine a new host location for the database based
on ranked database criteria including database size;
and autonomously provision the database at the new host
location.

18. The system of claim 17, wherein the datacenter is part
of an on-premise environment.

19. The system of claim 17, wherein the datacenter is part
of a cloud environment.

20. The system of claim 17, wherein the one or more user inputs are indicative of a first region where the database is to be provisioned, and wherein the processor further executes computer-readable instructions to select the datacenter that is located in, or closest to, the region.

21. The system of claim 17, wherein the one or more user inputs are indicative of a first region where the database is to be provisioned, and wherein the processor further executes computer-readable instructions to:

identify a second region from the first pre-defined rule; and select the datacenter located in (a) the first region upon determining that the second region encompasses the first region; or (b) the second region upon determining that the second region does not encompass the first region.

22. The system of claim 17, wherein the processor further executes computer-readable instructions to select the host location based on a criteria applied to the second pre-defined rule and the one or more user inputs.

23. The system of claim 22, wherein the criteria comprises at least one of a size of the database or a database engine type desired for the database.

24. The system of claim 22, wherein the criteria comprises a database engine type, wherein the one or more user inputs are indicative of a first database engine type for the database, and wherein the processor further executes computer-readable instructions to:

identify a second database engine type from the second pre-defined rule; and select the host location that is suitable for (a) the first database engine type upon determining that the first database engine type is same as the second database engine type; or (b) the second database engine type upon determining that the first database engine type is different from the second database engine type.

25. The system of claim 22, wherein the criteria comprises a size of the database, wherein the one or more user inputs are indicative of a first size of the database, and wherein the processor further executes computer-readable instructions to:

identify a second size of the database from the second pre-defined rule; and select the host location that (a) has an amount of available space for provisioning the database of the first size upon determining that the second size encompasses the first size; or (b) has an amount of available space for provisioning the database of the second size upon determining that the second size does not encompass the first size.

26. The system of claim 17, wherein the processor further executes computer-readable instructions to determine the host location on which to provision the database based at least on a third pre-defined rule.

27. The system of claim 17, wherein the processor further executes computer-readable instructions to:

automatically monitor a usage pattern of the database on the host location upon provisioning; and take action based upon the usage pattern.

28. The system of claim 27, wherein the action comprises adding additional storage to the host location or moving the database to another host location.

29. The system of claim 27, wherein to take action, the processor further executes computer-readable instructions to:

identify another host location for the database based on a criteria; and migrate the database to the another host location.

30. The system of claim 17, wherein the processor further executes computer-readable instructions to:

predict a usage pattern of the database on the host location based on a historical usage pattern; and take action based on the predicted usage pattern.

31. The system of claim 30, wherein to take action, the processor further executes computer-readable instructions to:

identify another host location for the database based on a criteria; and migrate the database to the another host location.

32. The system of claim 17, wherein the host location is at least one cluster.

33. A non-transitory computer-readable medium comprising computer-readable instructions stored thereon that when executed by a processor of a database management system cause the processor to:

receive a user request to provision a database;

receive one or more user inputs after receiving the user request; and in response to the one or more user inputs:

autonomously select a datacenter to provision the database based at least on a first pre-defined rule and the one or more user inputs;

autonomously select a host location in the datacenter based at least on a second pre-defined rule and the one or more user inputs without further user input identifying the host location;

autonomously provision the database at the host location;

execute a machine-learning model using as input size data of the provisioned database to generate a predicted database size;

compare the predicted database size to an amount of available space on the host location;

determine the predicted database size exceeds a predetermined threshold relative to the amount of available space on the host location;

in response to the predicted database size exceeding the predetermined threshold relative to the amount of available space on the host location, autonomously determine a new host location for the database based on ranked database criteria including database size; and autonomously provision the database at the new host location.

34. The non-transitory computer-readable medium of claim 33, wherein the datacenter is part of an on-premise environment.

35. The non-transitory computer-readable medium of claim 33, wherein the datacenter is part of a cloud environment.

36. The non-transitory computer-readable medium of claim 33, wherein the one or more user inputs are indicative of a first region where the database is to be provisioned, and wherein the processor further executes computer-readable instructions to select the datacenter that is located in, or closest to, the region.

37. The non-transitory computer-readable medium of claim 33, wherein the one or more user inputs are indicative of a first region where the database is to be provisioned, and wherein the processor further executes computer-readable instructions to:

identify a second region from the first pre-defined rule; and select the datacenter located in (a) the first region upon determining that the second region encompasses the first region; or (b) the second region upon determining that the second region does not encompass the first region.

38. The non-transitory computer-readable medium of claim 33, wherein the processor further executes computer-readable instructions to select the host location based on a criteria applied to the second pre-defined rule and the one or more user inputs.

39. The non-transitory computer-readable medium of claim 38, wherein the criteria comprises at least one of a size of the database or a database engine type desired for the database.

40. The non-transitory computer-readable medium of claim 38, wherein the criteria comprises a database engine type, wherein the one or more user inputs are indicative of a first database engine type for the database, and wherein the processor further executes computer-readable instructions to:

identify a second database engine type from the second pre-defined rule; and select the host location that is suitable for (a) the first database engine type upon determining that the first database engine type is same as the second database engine type; or (b) the second database engine type upon determining that the first database engine type is different from the second database engine type.

41. The non-transitory computer-readable medium of claim 38, wherein the criteria comprises a size of the database, wherein the one or more user inputs are indicative of a first size of the database, and wherein the processor further executes computer-readable instructions to:

identify a second size of the database from the second pre-defined rule; and select the host location that (a) has an amount of available space for provisioning the database of the first size upon determining that the second size encompasses the first size; or (b) has an amount of available space for provisioning the database of the second size upon determining that the second size does not encompass the first size.

42. The non-transitory computer-readable medium of claim 33, wherein the processor further executes computer-readable instructions to determine the host location on which to provision the database based at least on a third pre-defined rule.

43. The non-transitory computer-readable medium of claim 33, wherein the processor further executes computer-readable instructions to:

automatically monitor a usage pattern of the database on the host location upon provisioning; and take action based upon the usage pattern.

44. The non-transitory computer-readable medium of claim 43, wherein to take action, the processor further executes computer-readable instructions to:

identify another host location for the database based on a criteria; and migrate the database to the another host location.

45. The non-transitory computer-readable medium of claim 33, wherein the action comprises adding additional storage to the host location or moving the database to another host location.

46. The non-transitory computer-readable medium of claim 33, wherein the processor further executes computer-readable instructions to:

predict a usage pattern of the database on the host location based on a historical usage pattern; and take action based on the predicted usage pattern.

47. The non-transitory computer-readable medium of claim 46, wherein to take action, the processor further executes computer-readable instructions to:

identify another host location for the database based on a criteria; and migrate the database to the another host location.

48. The non-transitory computer-readable medium of claim 33, wherein the host location is at least one cluster.

* * * * *